May 12, 1959

G. PLUNKETT 2,886,238

SHORT-CUT MULTIPLYING MECHANISM

Filed Nov. 18, 1955

May 12, 1959 G. PLUNKETT 2,886,238
SHORT-CUT MULTIPLYING MECHANISM
Filed Nov. 18, 1955 19 Sheets-Sheet 2

May 12, 1959 G. PLUNKETT 2,886,238
SHORT-CUT MULTIPLYING MECHANISM
Filed Nov. 18, 1955 19 Sheets-Sheet 5

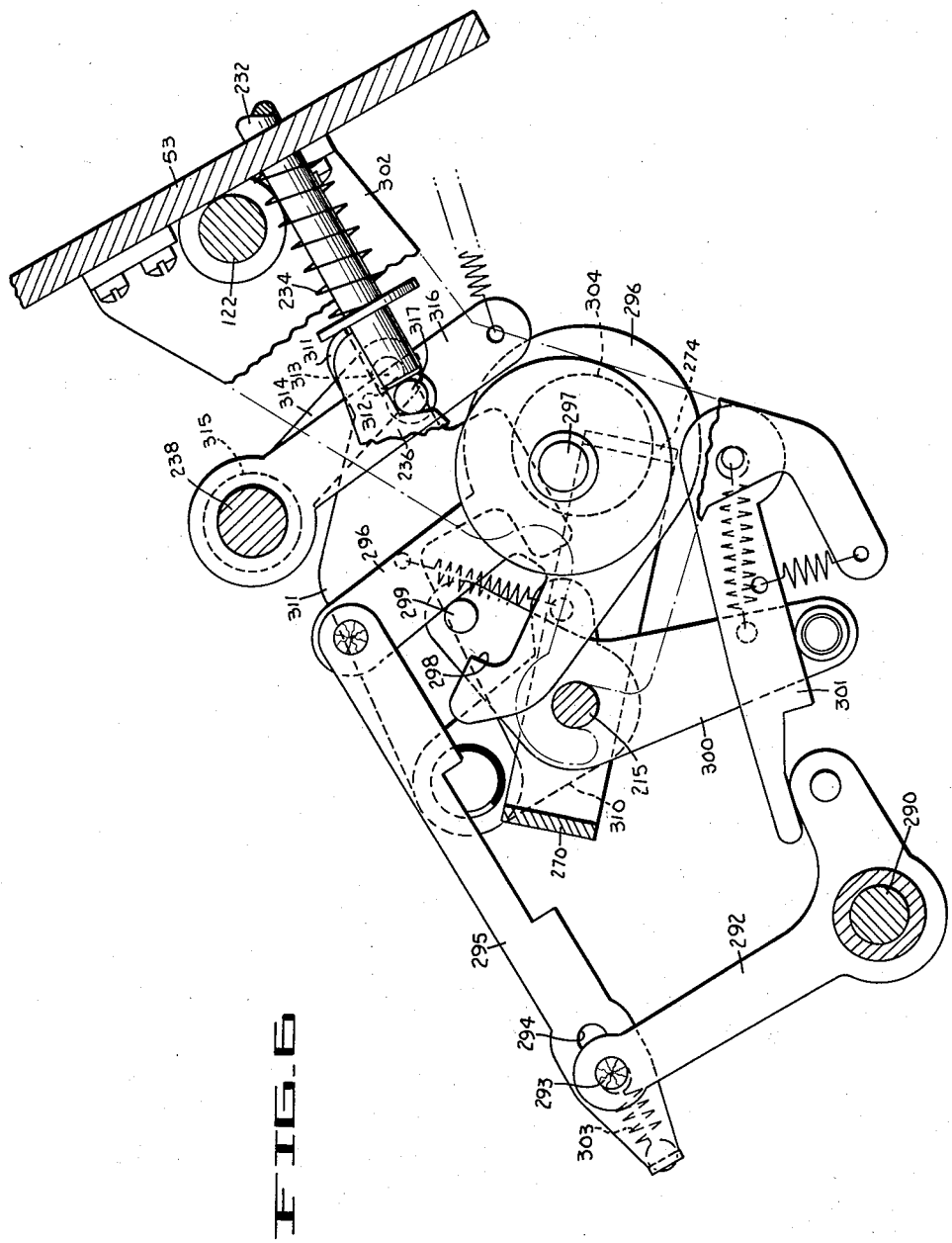

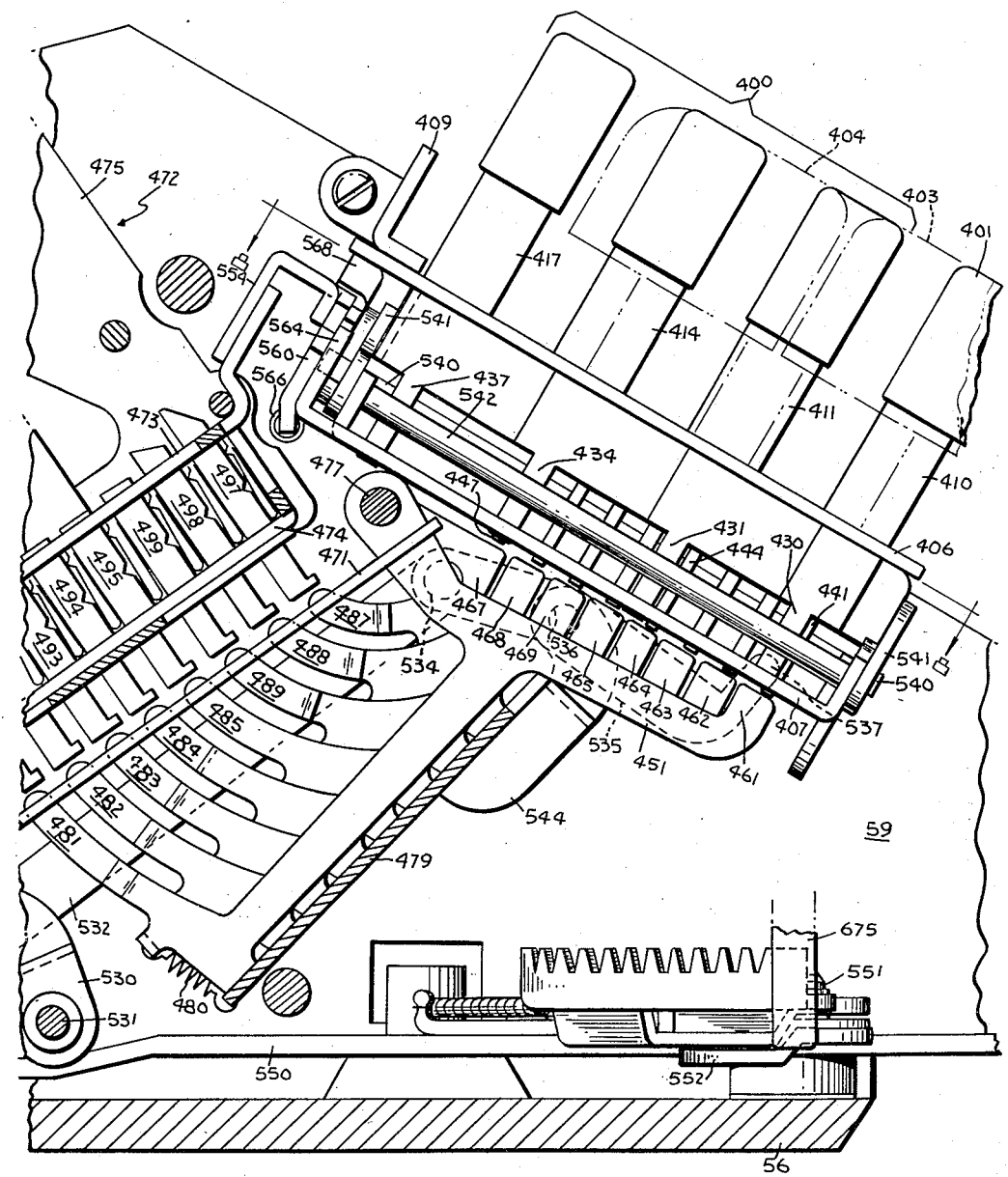
FIG_7

May 12, 1959 G. PLUNKETT 2,886,238
SHORT-CUT MULTIPLYING MECHANISM
Filed Nov. 18, 1955 19 Sheets-Sheet 8
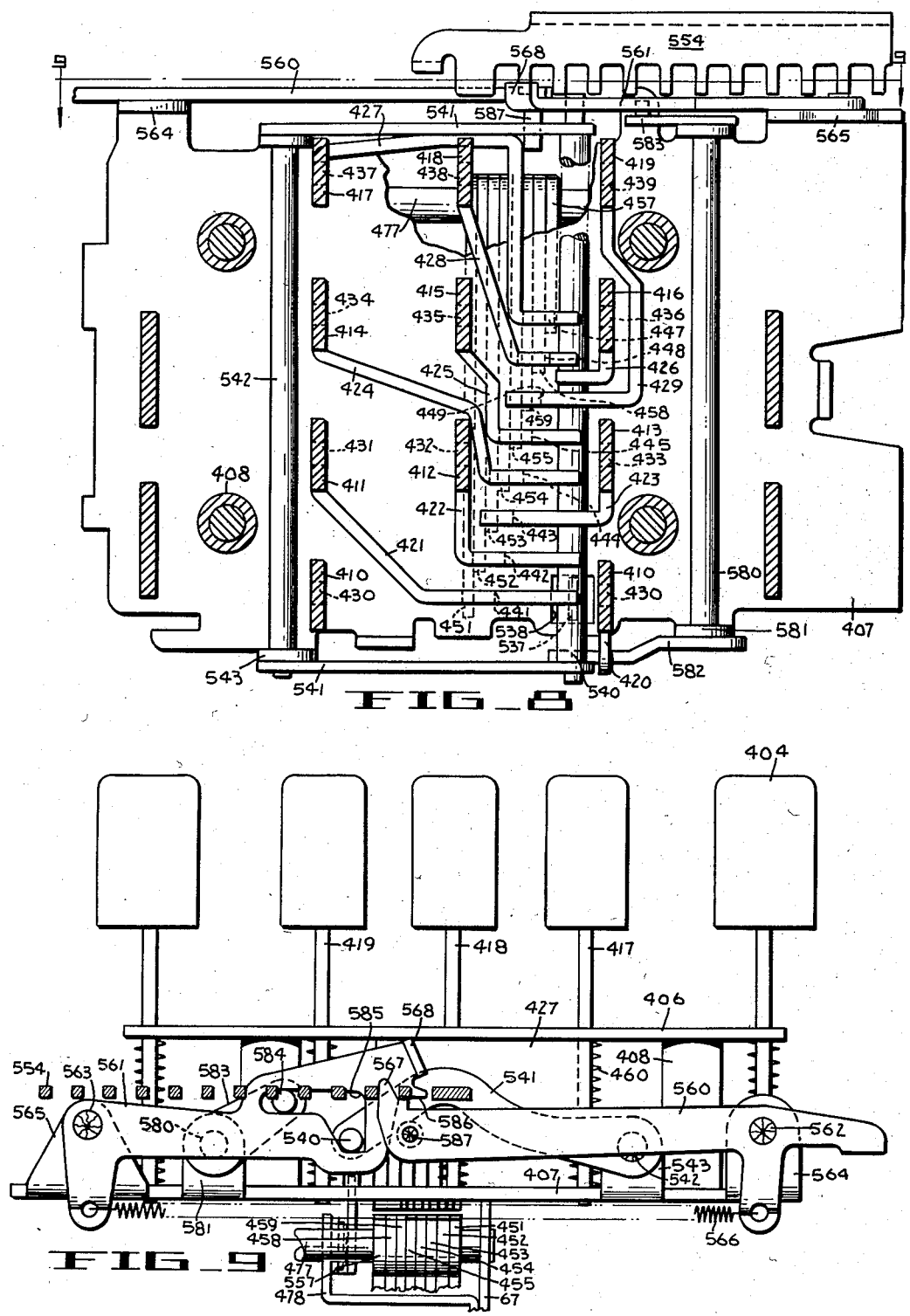
FIG_8
FIG_9

May 12, 1959 G. PLUNKETT 2,886,238
SHORT-CUT-MULTIPLYING MECHANISM
Filed Nov. 18, 1955 19 Sheets-Sheet 9
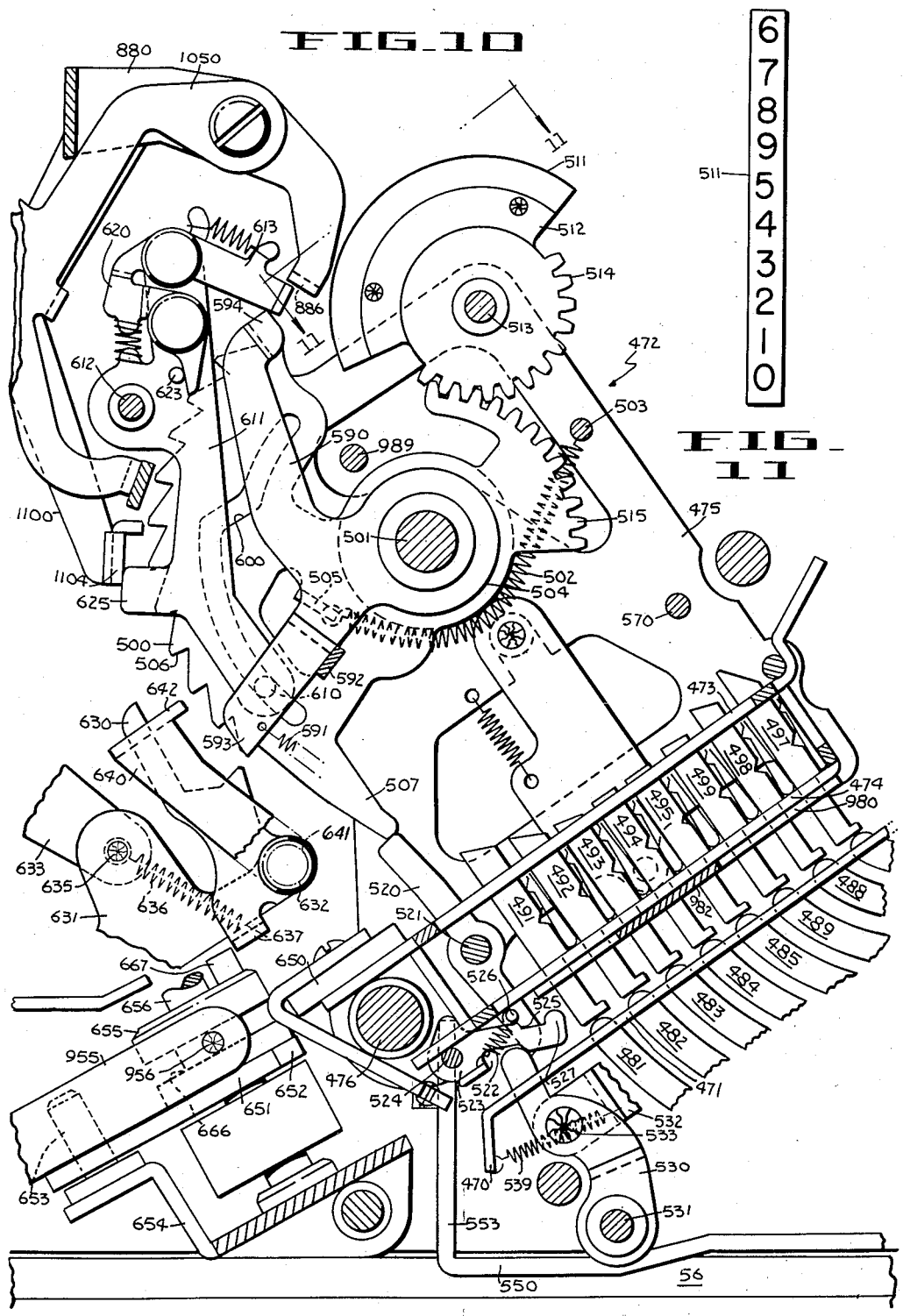

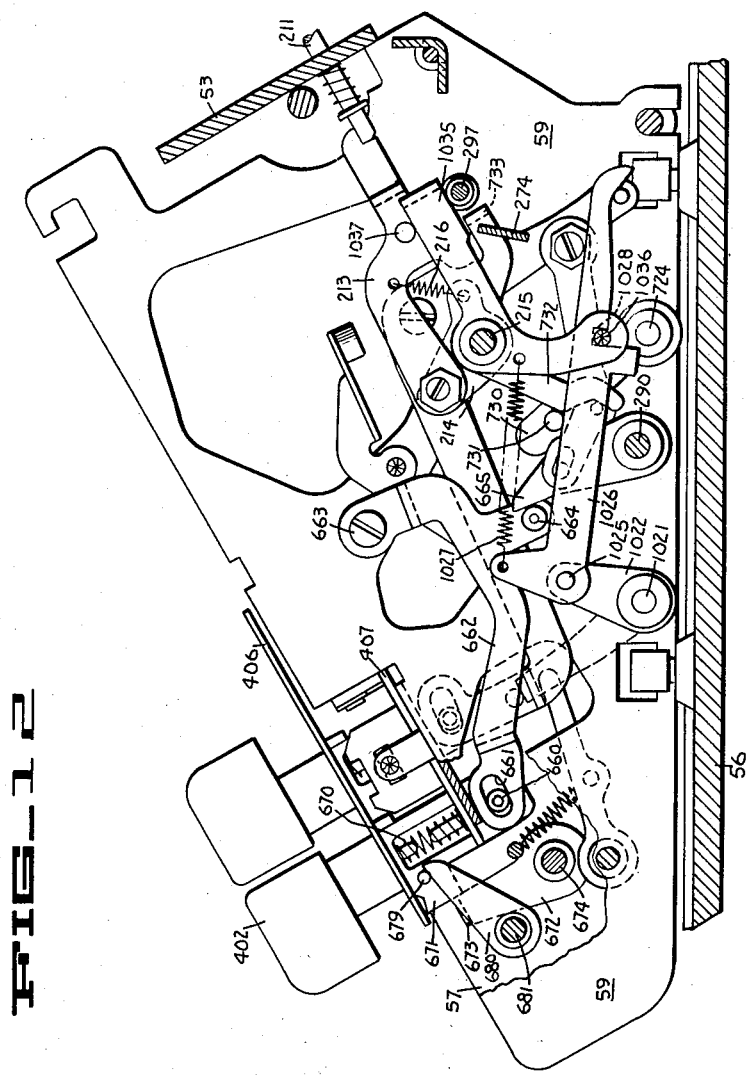

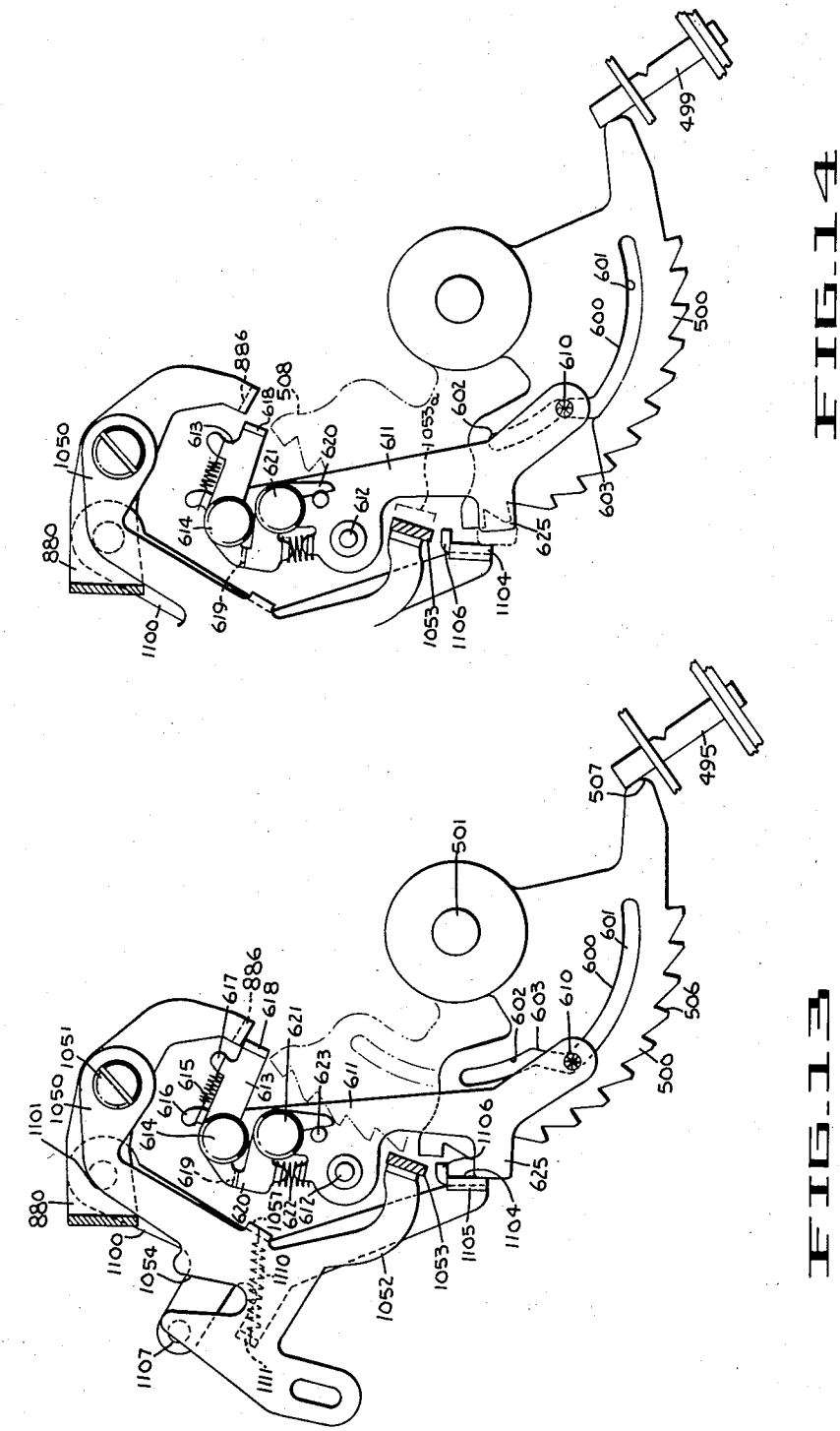

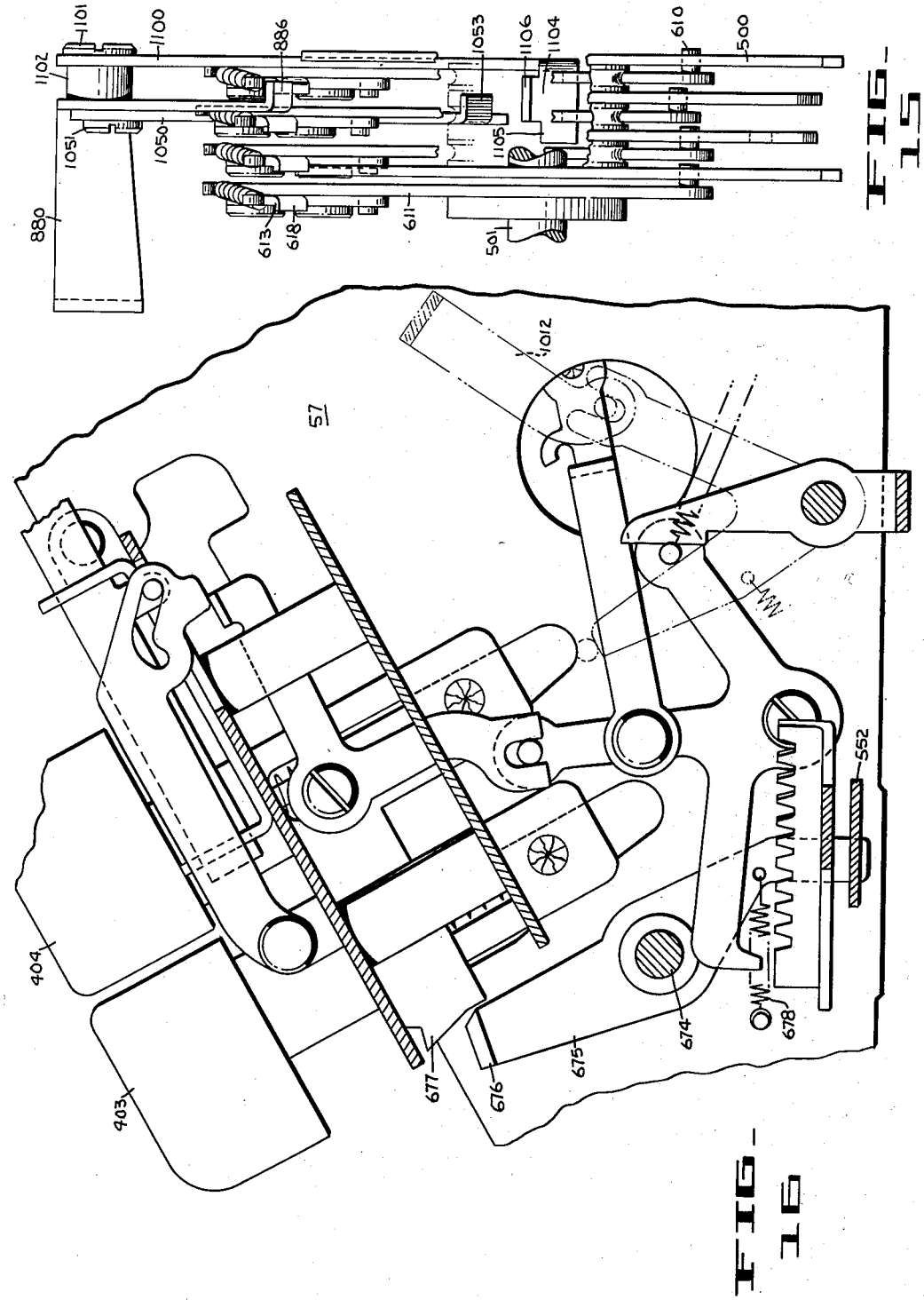

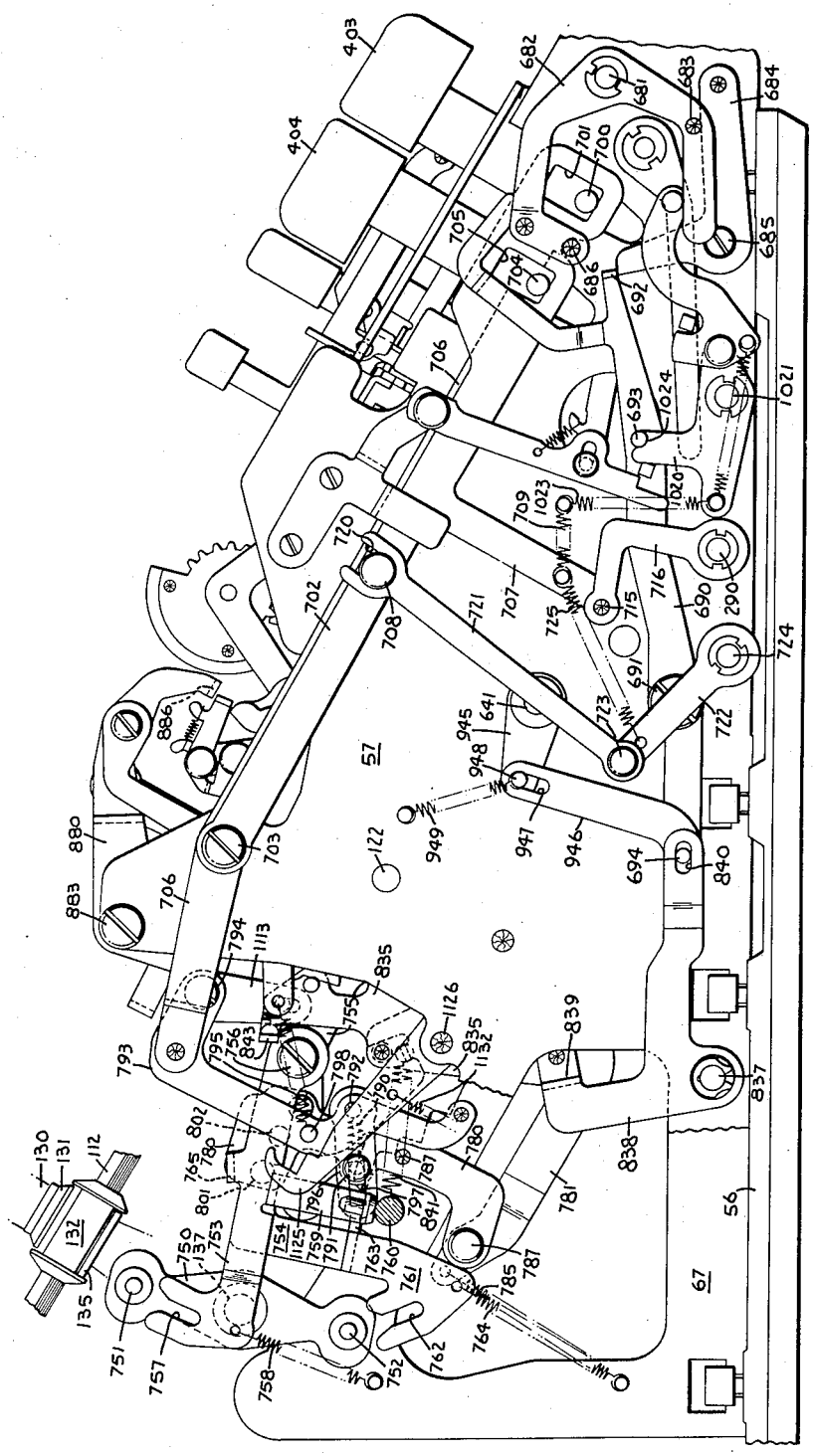

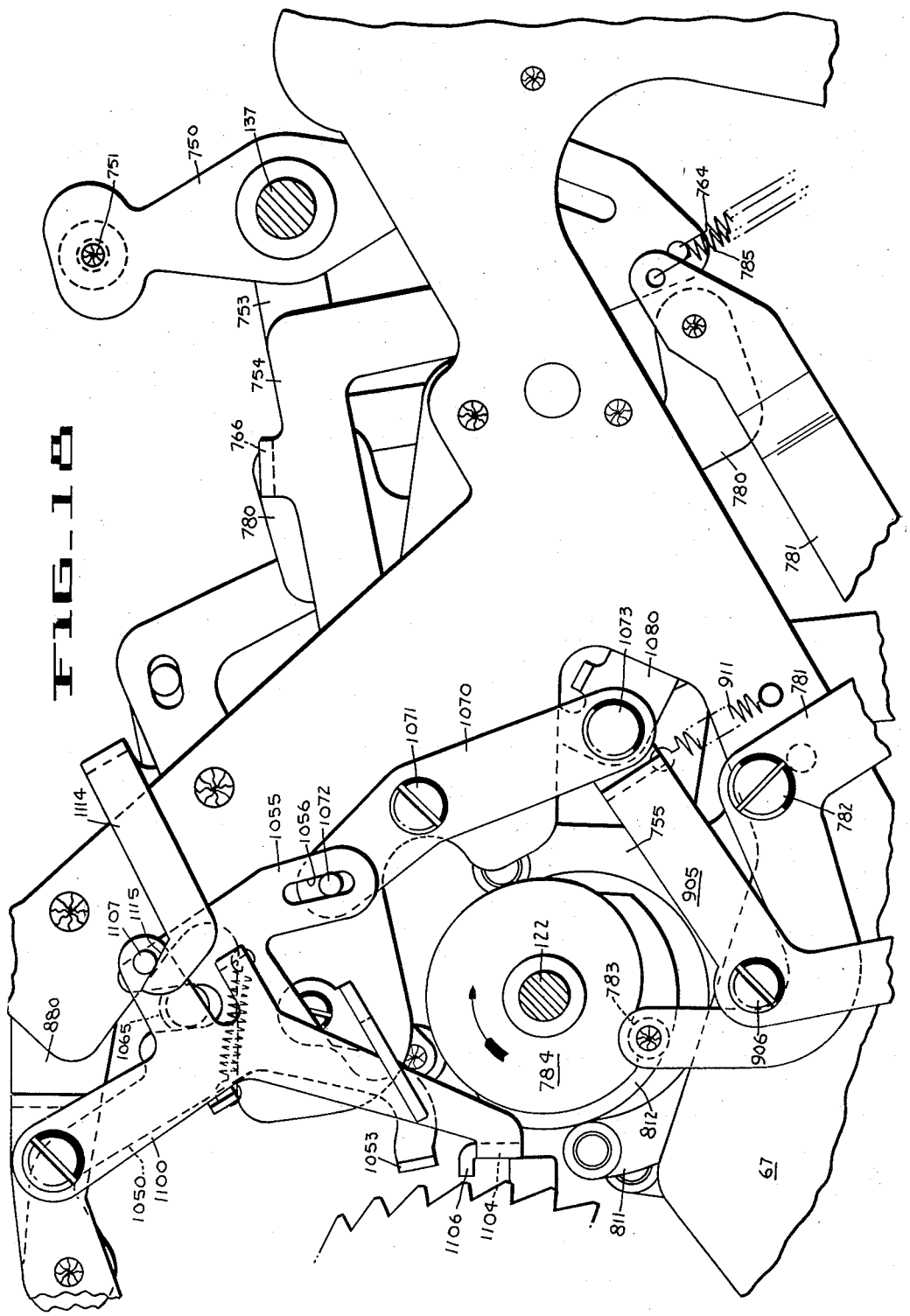

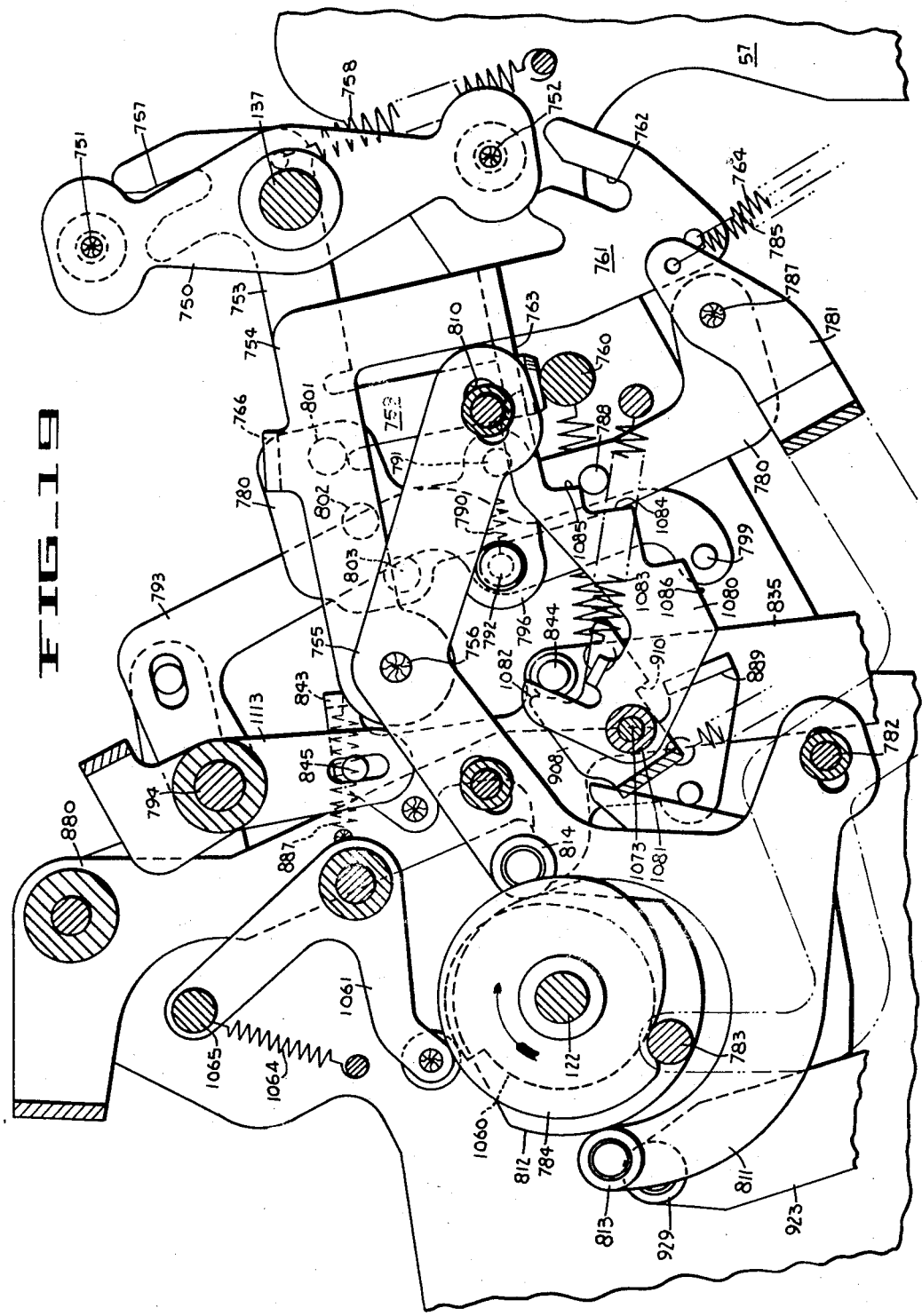

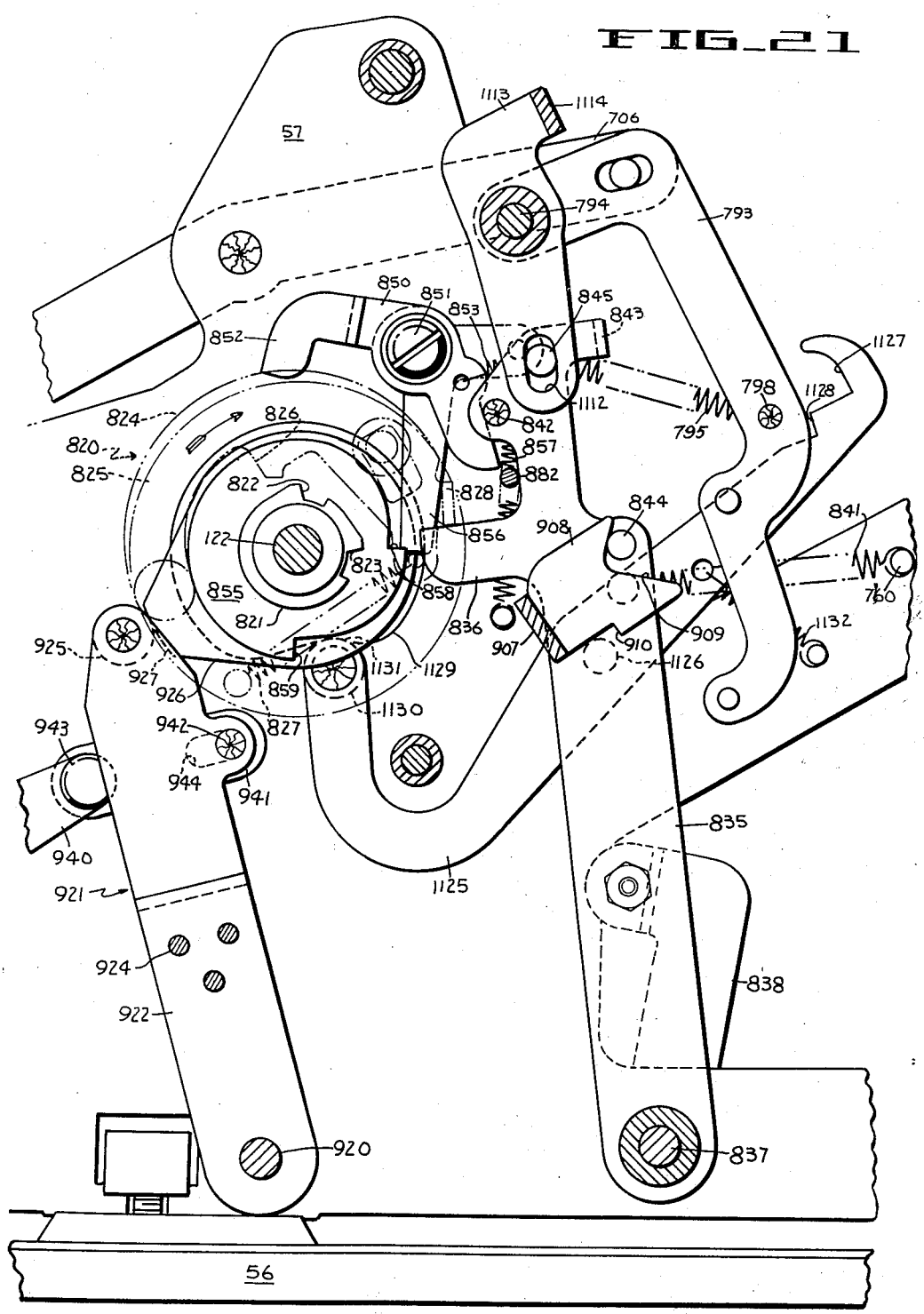

May 12, 1959 G. PLUNKETT 2,886,238
SHORT-CUT MULTIPLYING MECHANISM
Filed Nov. 18, 1955
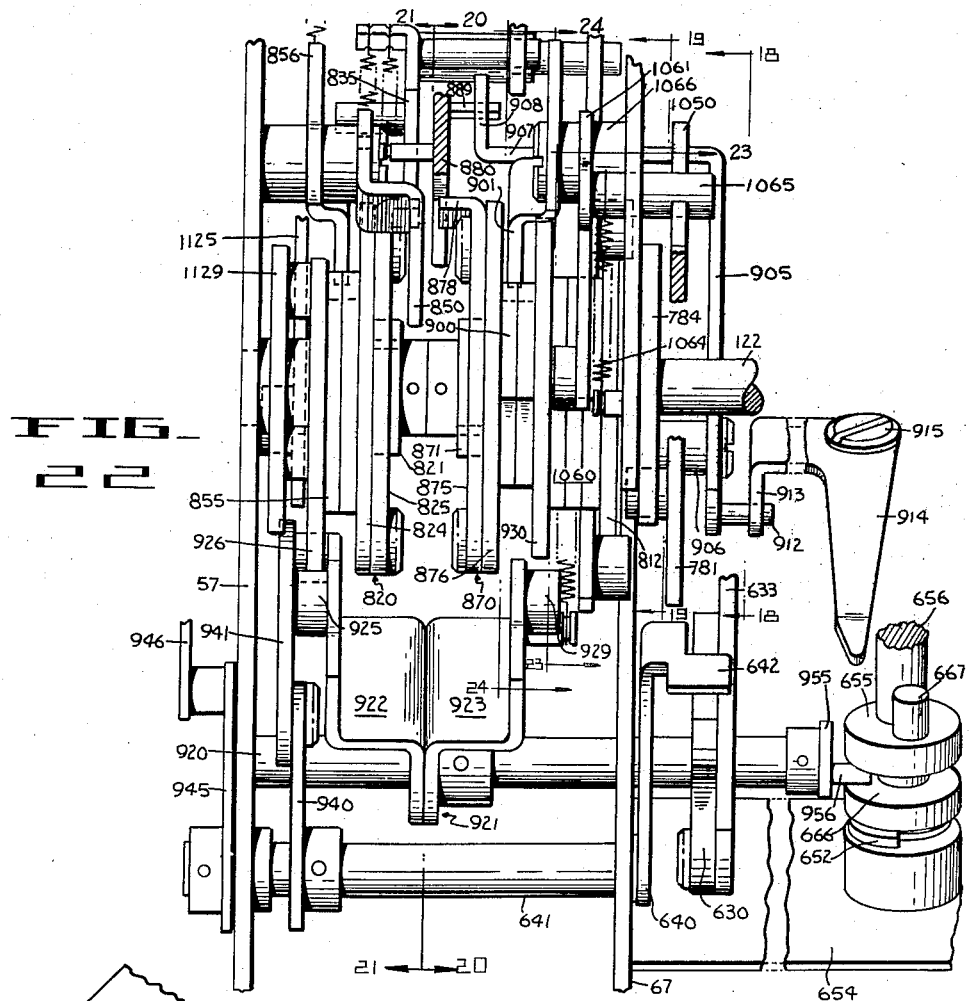
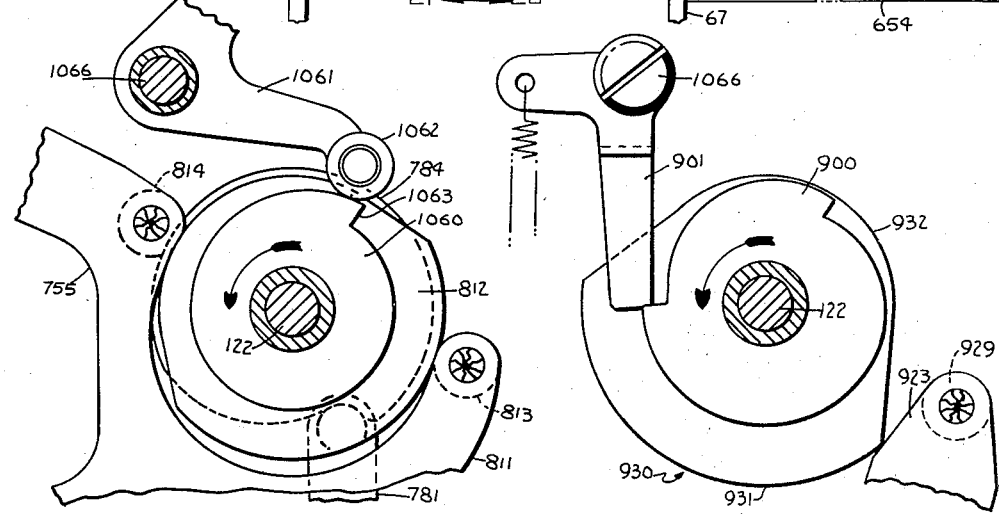

May 12, 1959 G. PLUNKETT 2,886,238
SHORT-CUT MULTIPLYING MECHANISM
Filed Nov. 18, 1955 19 Sheets-Sheet 19
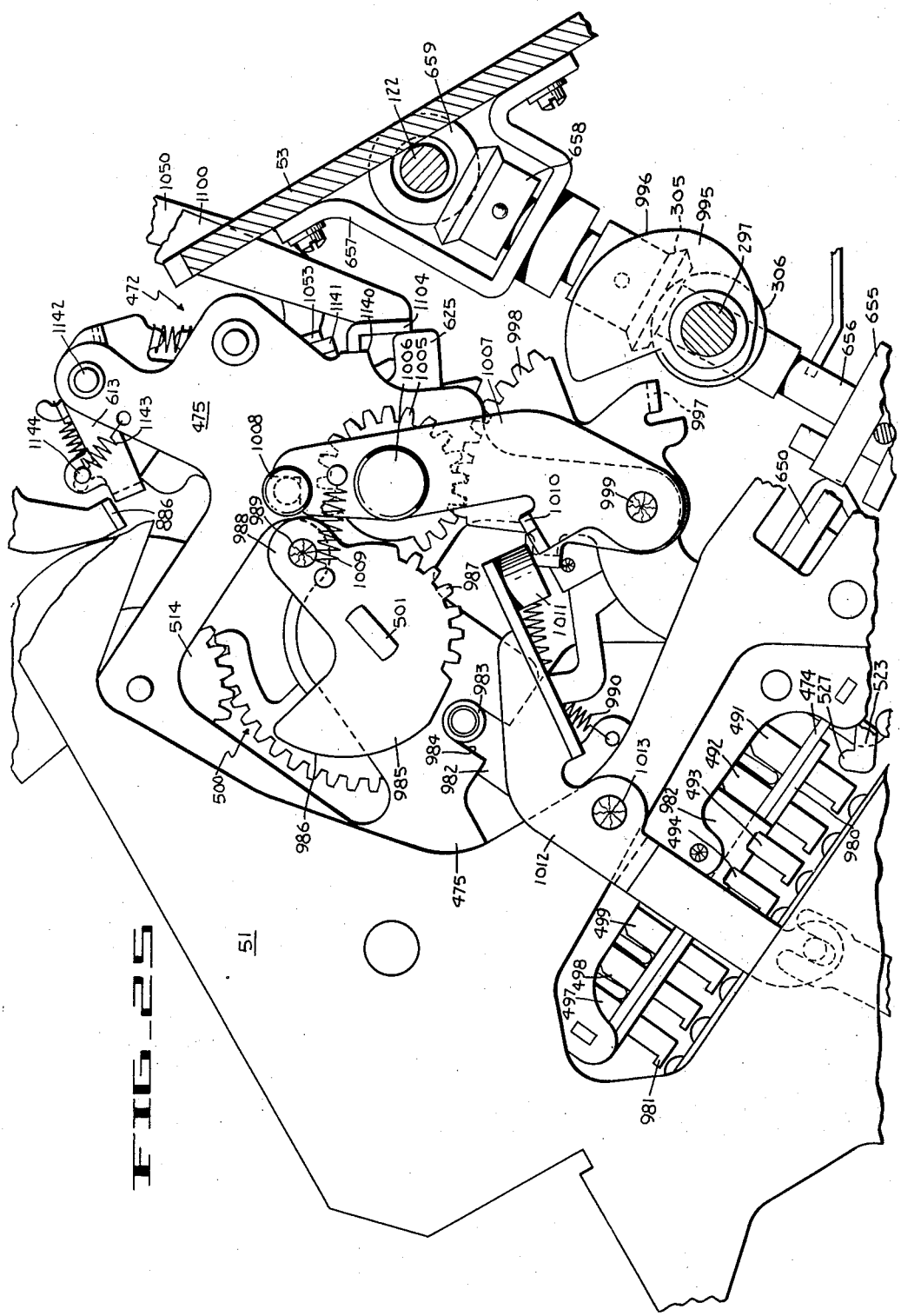
FIG_25

United States Patent Office 2,886,238
Patented May 12, 1959

2,886,238

SHORT-CUT MULTIPLYING MECHANISM

Gilman Plunkett, San Leandro, Calif., assignor to Friden, Inc., a corporation of California Application November 18, 1955, Serial No. 547,804

10 Claims. (Cl. 235—63)

INDEX

| | Column |
|---|---|
| 1. General Aspects of Operation | 5 |
| 2. Machine Frame | 7 |
| 3. Carriage | 7 |
| 4. Tens-Transfer Mechanism | 7 |
| 5. Selection Mechanism | 8 |
| 6. Accumulator Drive | 9 |
| 7. Counter actuator | 10 |
| 8. Register Clearing Mechanisms | 11 |
| 9. Carriage Shift | 12 |
| 10. Left Shift Terminating Mechanism | 13 |
| 11. Shift and Clear Programming Mechanism | 14 |
| 12. Multiplier Keyboard | 16 |
| 13. Multiplier Control Segments | 18 |
| 14. "0" Latch | 21 |
| 15. Multiplier Carriage Escapement Mechanism | 23 |
| 16. Segment Feed Mechanism | 25 |
| 17. Multiplier Carriage Shifting Mechanism | 26 |
| 18. Multiplier Control Keys | 27 |
| 19. Preliminary Shifting and Clearing Controls | 29 |
|    (1) Enable Segment Feed Pawl | 32 |
|    (2) Enable Multiplier Control Mechanism | 32 |
| 20. Computation Control Mechanism | 36 |
| 21. Shortcut Operation Controls—General | 45 |
|    A. Normal Operating Controls | 47 |
|    B. Extra Cycle Mechanism | 51 |
|    C. Cycle Reducing Mechanism | 52 |
|    D. Final Corrective Cycle Mechanism | 53 |
|    E. Successive Zeroes in a Multiplier Factor | 55 |
| 22. Restoring Mechanism | 55 |
| 23. Operation | 58 |

This invention relates to calculating machines and is concerned particularly with the provision of an improved mechanism for performing plural order multiplication operations automatically.

It is a primary object of the present invention to provide an improved and faster automatic mechanism for performing plural order multiplication problems, using what is commonly known as the "shortcut" method. Most automatic calculating machines utilize the "repeated addition" system of multiplication in which a factor is added a number of times in each order corresponding to the multiplier digit value for that order. Thus, if the multiplier is "92," the multiplicand is added twice with the register in its home, or units order, position; the carriage shifted one order; and the multiplicand then added nine times in the next ordinal position. While this method is the most simple, and therefore generally provides the most trouble-free operation, it is subject to the drawback that a multiplier factor of "9" requires nine cycles of operation, a multiplier value of "8" requires eight cycles of operation, etc. Expert calculator operators long ago, in the days of manual operation antedating the automatic multiplying machines now available, learned to multiply by the "shortcut" method in which values of "6" or greater were handled by subtracting the tens-complement of the value in the particular order and then adding a value of "1" in the next higher order. In this system, a multiplier factor of "92" would be handled by two additive cycles in the lowest order, shifting the carriage one order, then subtracting once in the second, or tens, order, shifting the carriage to the third, or hundreds, ordinal position, and finally adding once. Various inventors have endeavored to adapt the shortcut method to the automatic multiplication machines, but the resultant mechanisms have been very complicated and often required very careful adjustment with consequent heavy manufacturing and upkeep costs. My invention is directed to a new and improved mechanism for automatic shortcut multiplication which can be constructed as simply and sturdily as the "repeated addition" systems of the past, but which will complete a multiplication problem in a shorter interval incidental to shortcut operation.

Another object of the present invention is to provide a shortcut multiplication mechanism which provides automatically an additional cycle of operation in the higher order whenever the multiplier value in the adjacent lower order requires operation in the reverse direction (conventionally a value of "6" to "9") and the value in the higher order necessitates operation in the selected direction (conventionally "1" to "5") or is "0"; which drops a cycle of operation in the higher order whenever the multiplier values in two adjacent orders require operation in the reverse direction in both orders (for example, multiplying by "88" requires two subtractive cycles in the lowest order; a single subtractive cycle in the next higher, or tens, order; and a single additive cycle in the third, or hundreds, order); and enables the correct number of cycles in the higher order whenever the multiplier value in the adjacent lower order necessitates operation in the selected direction, regardless of whether operation in the higher order is in the selected direction or in the reverse direction. That is, one of the objects of the present invention is to provide a mechanism which automatically adds an additional cycle of operation in a higher order whenever the machine changes from operation in the reverse direction (generally subtraction) to operation in the selected direction (usually addition); which eliminates a cycle of operation in the higher order whenever the operation in both orders is in the reverse direction; and which neither adds nor subtracts a cycle of operation in the higher of any two orders whenever operation in the lower of the two requires operation in the selected direction.

Another important object of the present invention is to provide an improved shortcut multiplication mechanism which is operable in either positive or negative multiplication—these terms being used, respectively, as indicating conventional multiplication by repeated additive cycles in order to add one product to another, and the reverse operation of repeated subtraction when it is desired to subtract a second product from the first. It will be recognized that in positive multiplication the values "1" to "5" will cause adding, or positive, operation while the larger values of "6" to "9" will cause subtractive operation a number of times corresponding to the tens-complement of the multiplier value, and that the result gives the true product of the factors multiplied; and that negative operation involves the repeated subtraction for the lower multiplier values of "1" to "5" and addition (equal to the tens-complement of the digit) for the larger values of "6" to "9". In each case, a single cycle in the selected direction is required in the order above the highest multiplier digit whenever operation in that highest order is in the direction opposite to that selected, i.e., when operation in the highest order is subtractive in a conventional, or positive, multiplication operation; or additive in a negative one. It will be understood that a shortcut multiplication mechanism for positive multiplication only would be much simpler than one which is adapted to perform both positive and negative multiplication. In the first system, it is merely necessary to set the machine for addition or subtraction according to the multiplier value of a particular order (invariably operate additively for multiplier values of "1" to "5" and invariably operate subtractively for multiplier values of "6" to "9"). On the other hand, in a machine for both positive and negative multiplication, the setting must be the result of two factors: the operator selected control key and the automatic selection from the multiplier value, for the machine runs in an additive direction when the multiplier value is "1" to "5" for conventional (additive) multiplication and when the multiplier value is "6" to "9" in negative (subtractive) multiplication; and in the negative direction whenever the multiplier value is "6" to "9" in conventional multiplication or the multiplier value is "1" to "5" in negative multiplication.

Another important object of the present invention is to provide a "shortcut" mechanism for a multiplier unit of the type disclosed in the patents to Friden, No. 2,371,752 of March 20, 1945 and No. 2,399,917 of May 7, 1946.

A further object of the present invention is to provide an improved multiplying mechanism for a rotary calculating machine, which multiplying mechanism embodies a plural order multiplier mechanism operative to control the entry of the product into a product register either additively or subtractively at the will of the operator.

Another important object of the present invention is to provide an improved multiplying mechanism in which the character of the operation (in a selected or in the reverse direction) is determined by the entry of the multiplier value into the multiplier mechanism (at the time the value is entered); and the selected direction (positive for the entry of the true product, or negative for the entry of the complement thereof) is determined by the operation of control keys thereafter. It can be mentioned that the program of operations in either positive or negative multiplication, by the shortcut method of my invention, is the same regardless of whether the true product or the complement thereof is desired, and this program is set in the machine by the entry of the multiplier value; and the sign character of the completed operation is determined by the operator by the depression of the positive or negative multiplier control keys.

Another object of the present invention is to provide an improved calculating machine capable of carrying out the foregoing objects and in which all of the power-driven operations are performed by a single train of power flow from a motor, and utilizing unidirectional actuating means, whereby the machine can operate continuously and uninterruptedly throughout the calculating operation.

Another aspect of the present invention is to provide an improved means for setting the tens-complement of selected values in a multiplication mechanism, automatically from the depression of selected value keys, and simultaneously setting a control means to effect a reverse operation of the machine during operation in that order; and to provide means for automatically modifying the setting so made in an order by the setting of the value in the next lower order of the multiplication mechanism when such modification is required by the nature of the multiplier digits.

Another important object of the present invention is to provide means for modifying the operation of a multiplier control segment, such as shown in the patents to Friden, Nos. 2,371,752 and 2,399,917, by a single step in order to reduce the cycles of operation in the new order when required by the nature of the problem, as in operation in a reverse direction in both of two adjacent orders.

Another important object of the present invention is to provide means for modifying operation of a multiplier control segment of the type just mentioned in order to secure an additional cycle of operation in the new order when required in certain operations, as in operation in a selected direction following an order in which reverse operation was utilized.

Another object of the present invention is to provide an automatic mechanism operative to supply an additional cycle of machine operation after return of the multiplier mechanism to its home, or inoperative, position whenever operation in the highest order was in the reverse direction.

These and other objects of the invention will be apparent from a consideration of the following description, which will be readily understood by reference to the drawings forming a part hereof and in which:

Fig. 6 is an enlarged, detail view of the power-operated shift initiating mechanism preferably associated with the present invention, taken along the longitudinal vertical plane indicated by the lines 6—6 of Fig. 4.

Fig. 7 is a left side view of the multiplier mechanism of the present invention, showing particularly the value keys, pin setting arms and value pins.

Fig. 8 is a plan view of the multiplier value and control keys taken on a plane lying immediately below the top plate of the multiplier keyboard frame, such as along the plane indicated by the line 8—8 of Fig. 7.

Fig. 9 is a rear view of the multiplier keyboard frame and keys, showing particularly the escapement mechanism controlling the positioning of the multiplier carriage.

Fig. 10 is a left side view of the multiplier carriage of the present invention.

Fig. 11 is a development of the check dial associated with each multiplier segment.

Fig. 12 is a right side view of an intermediate frame plate, and the parts mounted thereon, such as taken along the plane indicated by the line 12—12 of Fig. 4.

Fig. 13 is a left side view, on an enlarged scale, of a multiplier segment standing in the "5" position, and the control mechanism immediately associated therewith.

Fig. 14 is a left side view, on an enlarged scale, of a multiplier segment standing in the "9" position, and is therefore similar to Fig. 13, except that the multiplier segment has been moved one value step from the position shown in Fig. 13.

Fig. 15 is a partial front view, on an enlarged scale, of the multiplier segments and their related control mechanisms.

Fig. 16 is a right side view, on an enlarged scale, of the leftmost multiplier control keys, such as taken along the plane indicated by the line 16—16 of Fig. 1.

Fig. 17 is a left side view of the left-hand control plate, showing various multiplier control mechanisms.

Fig. 18 is a right side view, on an enlarged scale, of the multiplier control assembly taken immediately to the right of a second intermediate frame plate, such as along a plane indicated by the line 18—18 of Figs. 4 and 22.

Fig. 19 is a view substantially the same as Fig. 18, being taken on a plane immediately to the left of Fig. 18, with frame plate removed, such as a view taken along the plane indicated by the line 19—19 of Fig. 22.

Figure 20:
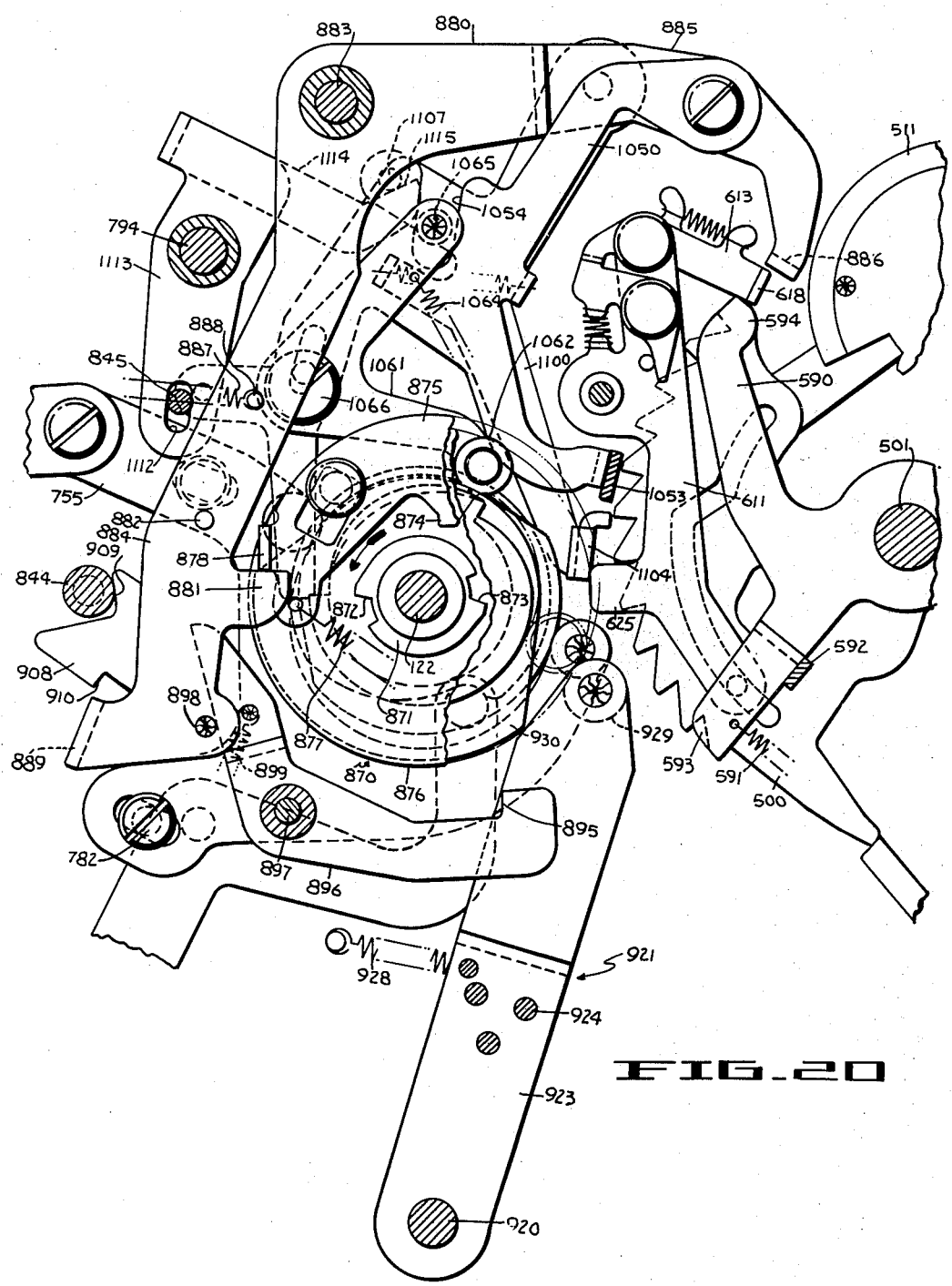

Fig. 20 is a left side view, on an enlarged scale, of one of the multiplier control clutches, such as along the central plane indicated by the broken line between the arrows 21 and 20 of Fig. 22, looking in the direction of the arrows 20—20.

Fig. 21 is a right side view, on an enlarged scale, of the other multiplier control clutch, looking to the left from the same plane as Fig. 20, as indicated by the arrows 21—21 of Fig. 22.

Fig. 22 is a plan view, on an enlarged scale, of the multiplier control mechanisms associated with the present invention and shown in side views in Figs. 19, 20, and 21.

Fig. 23 is a detail of some of the control cams associated with the clutch shown in Fig. 20, being taken along the plane indicated by the line 23—23 of Fig. 22.

Fig. 24 is a detail of the backlash detent and another multiplier control cam associated with the clutch shown in Fig. 20, such as taken along the plane indicated by the line 24—24 of Fig. 22.

Fig. 25 is a right side view of the right side of the multiplier carriage, showing particularly the means for restoring the multiplier segments and pins to their normal "0" positions.

1. General aspects of operation

In my invention, the shortcut multiplication mechanism operates either additively or subtractively with equal facility. In additive operation, a true product is secured which will be added to any value previously standing in the accumulator, or product register. In subtractive operation, the tens-complement of the product is secured, which is most often used to subtract a product from a value previously standing in the product register, as when it is desired to take discounts from a previous accumulation. In normal, or additive, operation, multiplier values of "1" to "5" are handled by repeated addition from one to five times, respectively, while values of "6" to "9" are handled by repeated subtraction a number of times corresponding to the tens-complement of the multiplier value and adding once in the next higher order. For example, a multiplier value of "95" would be handled by five cycles of addition in the lower order followed by a single subtraction in the second, or tens, order, and that, in turn, is followed by a single additive cycle in the third, or hundreds, order. It will be understood that "95" is the equivalent of 100—10+5.

Conversely, in negative operation, the machine operates in repeated subtraction for multiplier values of "1" to "5" and in repeated addition for multiplier values of "6" to "9." Thus, if the product of "95" and any multiplicand value is to be subtracted from a previous accumulation, then the complement of the product is desired, and, in the machines described in the patents abovementioned, the negative multiply key would be depressed. In such a subtractive, or negative, multiplication, the "5" value of the multiplier is handled by repeated subtraction of the multiplicand for five cycles of operation in the lowest order, followed by a single additive cycle in the second, or tens, order, and that, in turn, is followed by a single negative, or subtractive, cycle of operation in the third, or hundreds, order—the —95 being the equivalent of —100+10—5.

In either event it will be noted that the values of "1" to "5" are handled by repeated cycling of the machine with the accumulator, or product register, set for the accumulation of values in the selected direction, i.e., the direction determined by the control key depressed (additively or subtractively, respectively); and that values of "6" to "9" are handled by repeated cycling of the machine a number of times equivalent to the tens-complement of the multiplier value, with the accumulator set for operation in the reverse direction (for subtraction or addition, respectively), followed by a corrective operation in the next higher order. In view of the fact that this machine is designed for both positive and negative multiplication, it would be confusing to refer to multiplication of values from "1" to "5" as additive cycles and those of from "6" to "9" as subtractive cycles, for those designations would be true only of positive multiplication. Therefore, in order to avoid confusion, the term "selected direction" will be used to indicate the operation controlled by the "1" to "5" multiplier values (which will be addition in positive multiplication and subtraction in negative multiplication); and "reverse direction" will be used to indicate the operation controlled by the multiplier values of "6" to "9" (which will be subtraction in positive multiplication and addition in negative multiplication).

This shortcut system of multiplication requires certain automatic controls for controlling the corrective operation in the next higher order above-mentioned, which corrective opeartion varies according to the various situations that may arise. Specifically, the following situations arise where adjustment of the normal multiplier controls is required:

(1) An extra cycle must be taken in any order in which operation is in the selected direction when operation in the preceding order was in the reverse direction (i.e., must add "1" in positive multiplication when operation in the preceding order was subtraction of a complement, and vice versa in negative multiplication).

(2) On the other hand, the machine must take one less cycle than the tens-complement of the multiplier value when operating in the reverse direction and operation in the preceding order was also in the reverse direction (i.e., must drop a subtractive count in subtraction when the operation of the previous order was subtraction in positive multiplication, and the reverse in negative multiplication). For example, in positive operation, for multiplying by a value of "189," the machine must subtract once in the lowest order, must subtract once in the second order, and must add twice in the third order.

(3) The machine must shift and operate for a single cycle in the selected direction when the highest order of operation was in the reverse direction, but must not do so when the operation in the highest order was in the selected direction (in positive multiplication, the machine must shift and add once when the highest multiplier value is "6" to "9," but must not do so when the value is "1" to "5").

(4) In order to handle these various conditions, a "0" must be considered as a positive number so that a "0" in the order above a value of "1" to "5" is handled in the conventional way of shifting the carriages an additional step without operating the accumulator. However, when the value in the order below the "0" is "6" to "9," an extra count is required, as indicated in the example of multiplying by a value of "95" above-mentioned.

It is, therefore, necessary in the present invention to provide devices incorporated in the multipler mechanism of the type described in the above-mentioned patents, for entering the value repeatedly a number of times corresponding to the value set (additively for the smaller values of "1" to "5" and subtractively for the larger values of "6" to "9"); for controlling the entry of a multiplicand value an extra time in any order whenever an operation is in a selected direction and in the adjacent lower order was in the reverse direction; and to automatically omit a cycle of operation in the reverse direction whenever the operation in the preceding order is in the reverse direction: As mentioned above, it is necessary to treat "0" as a positive value, and thus we secure a shift of the product and multipler carriages an additional step when a "0" stands in the multiplier factor if the operation in the preceding order was in the selected direction, but enter the multiplicand value once in the selected direction if the operation in the next lower order was in the reverse direction.

The present invention is shown, for purposes of exemplification, as applied to the present Friden automatic calculating machine, which machine is constructed, essentially, in accordance with the patent to Carl M. Friden No. 2,229,889 of January 28, 1941, as modified by a multiplying mechanism shown and described in the patents to Carl M. Friden Nos. 2,371,752 of March 20, 1945 and 2,399,917 of May 7, 1946, but utilizing the program controls of my copending application S. N. 401,780, filed January 4, 1954, and the patent to Plunkett et al. No. 2,824,695, issued February 25, 1958.

2. Machine frame

Figure 1:
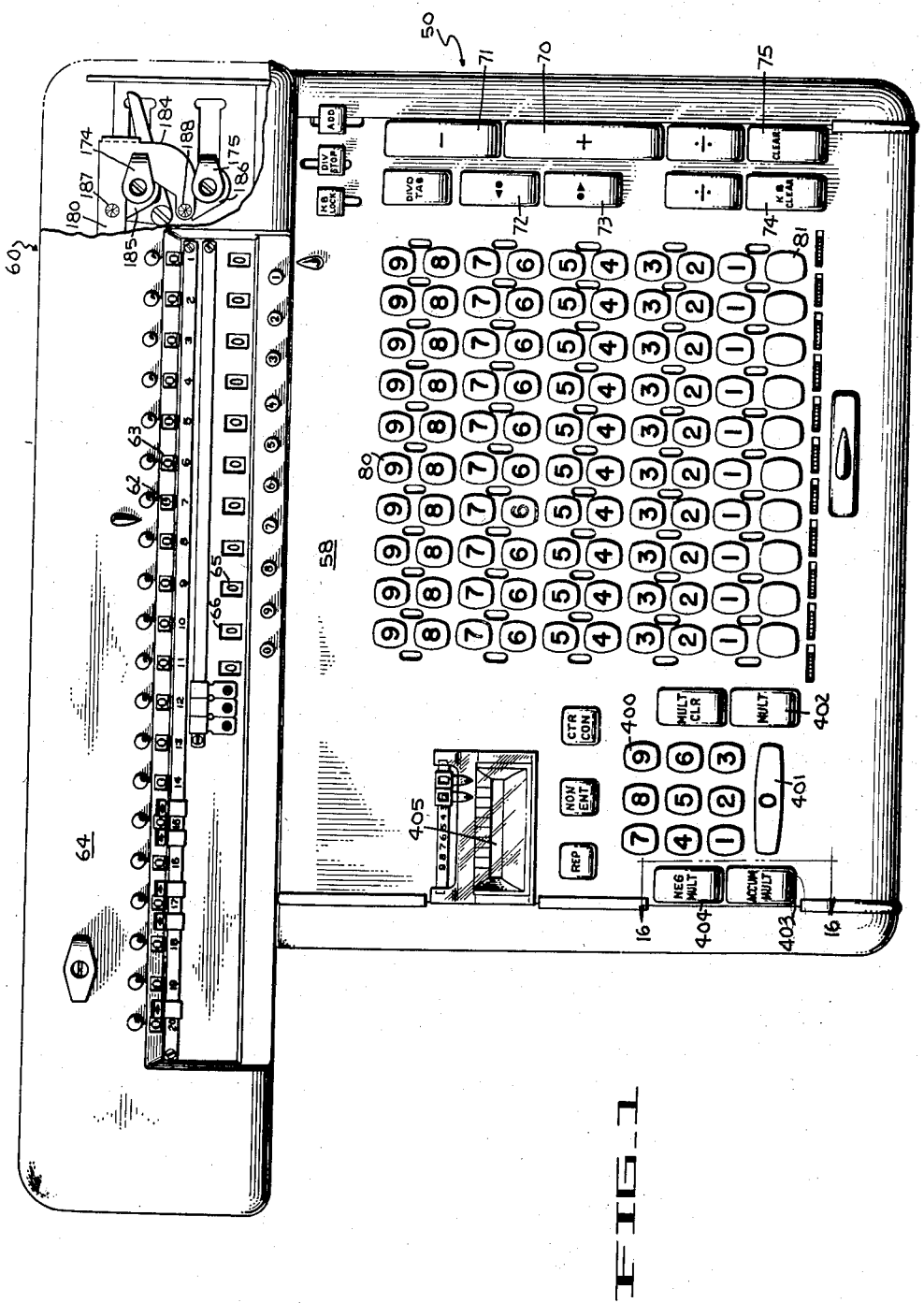
Fig. 1 is a plan view of the preferred form of the machine of the present invention, with a portion of the carriage cover removed to show a portion of the register clearing mechanism.
Figure 3:
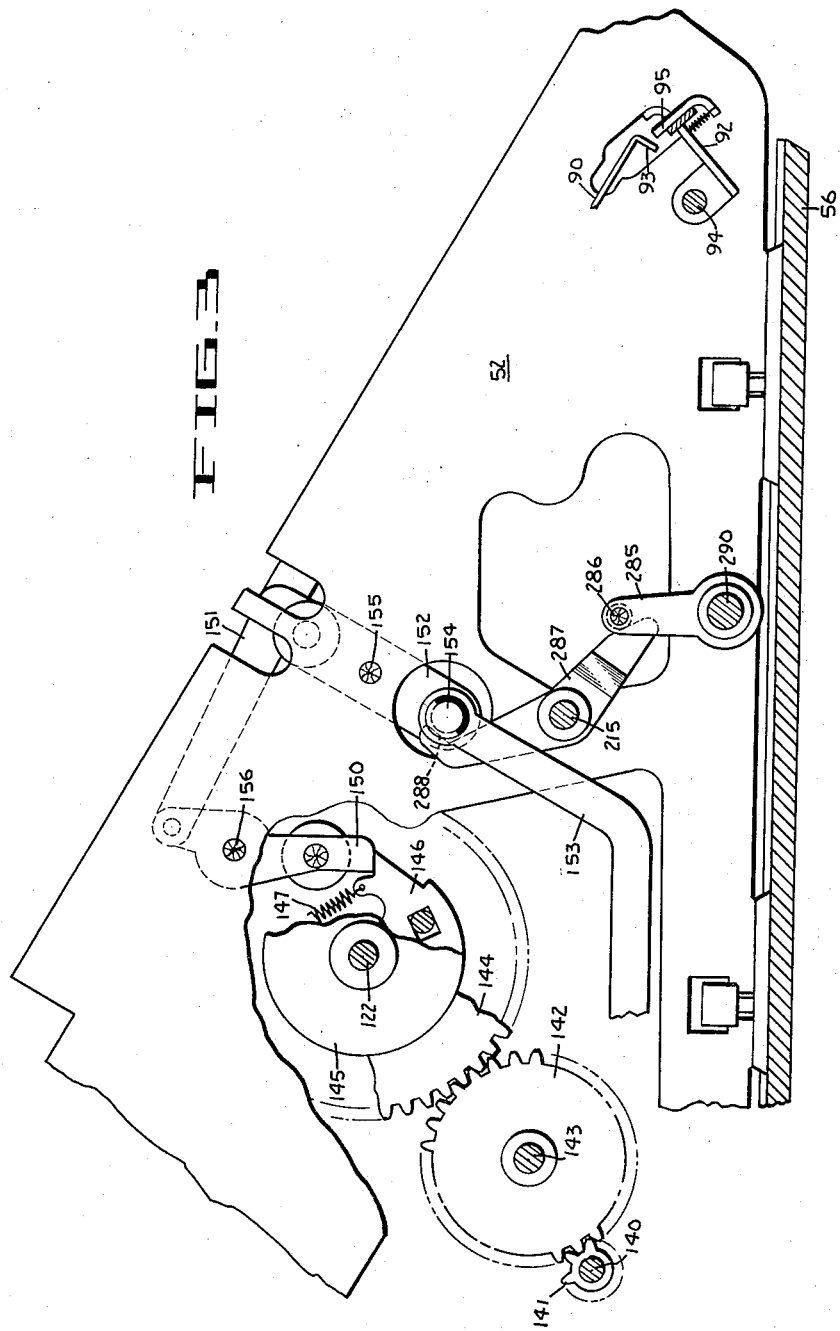
Fig. 3 is a left side view of the right side frame plate of the machine of the present invention, showing particularly the conventional clutch and motor switch controls associated with the present invention.
Figure 4:
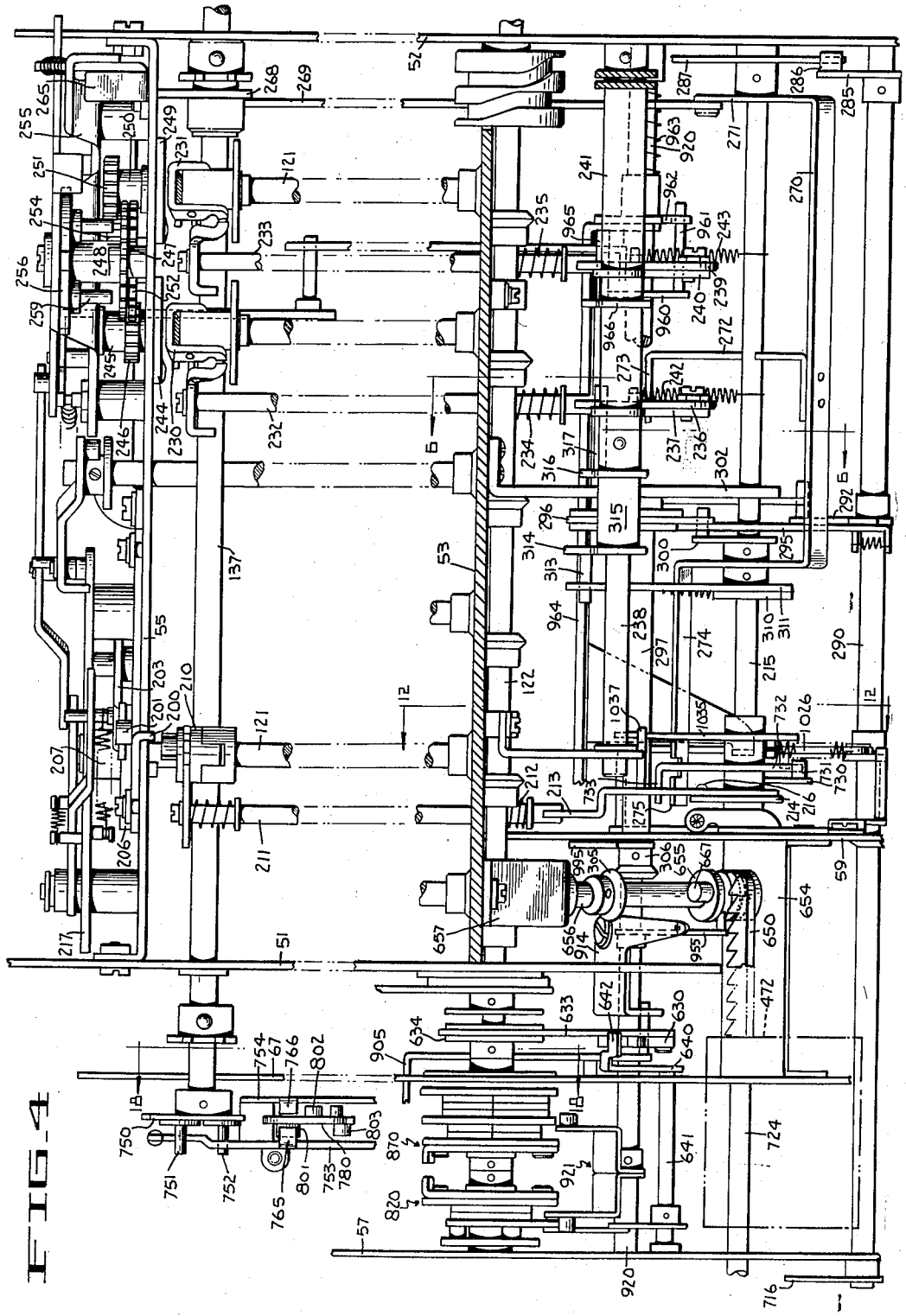
Fig. 4 is a plan view taken on a plane immediately below the selection bars and parallel to the keyboard and actuator shafts of the machine.

The calculating machine used for exemplification, and the one with which my invention is preferably associated, is shown in Fig. 1. This machine, as is conventional in calculating machines, is generally divided into a body, or frame portion, 50 and a shiftable carriage 60. The frame conventionally consists of a base plate 56 (see Figs. 3 and 7) upon which are rigidly mounted a left side frame plate 51 (Figs. 2 and 4) and a right side frame plate 52 (Figs. 3 and 4). The various operating mechanisms, such as the motor and drive, the actuating mechanism, the keyboard, the selection mechanism, the controls for the positive or negative operation of the accumulator, the shifting mechanism, the multiplier mechanism, and the like, are mounted in or upon the frame portion 50, all of them, with the exception of the tops of the keyboard and control keys, being enclosed within a cover 58. As shown in Fig. 1, the value keys 80, the multiplier value keys 400 or 401, and the various control keys project upwardly through suitable apertures in the cover 58.

The frame plates 51 and 52 cooperate with a number of cross-members, such as the crossbars 53, 54, and 55 (see Figs. 2 and 4), to rigidly brace the frame and also to support many of the operating parts.

3. Carriage

Figure 2:
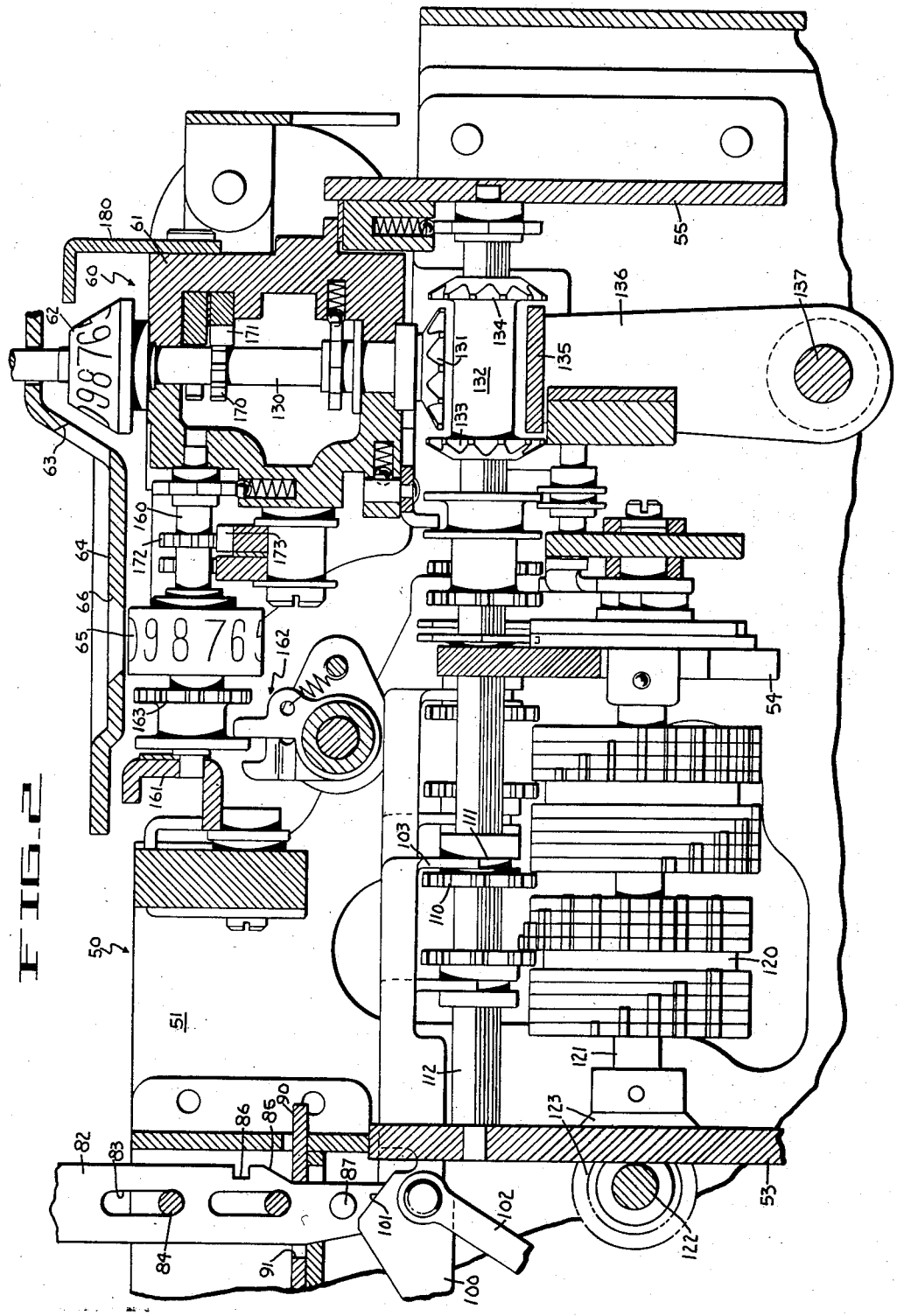
Fig. 2 is a cross-sectional view of a conventional Thomas-type actuator, selection mechanism, and accumulator register.

The carriage 60, which is shiftable longitudinally upon the frame 50, is primarily constructed upon a main hollow frame bar 61 (see Fig. 2). The accumulator, or product register, comprising a plurality of ordinally arranged dials 62, is mounted in the carriage, the dials being visible through windows, or apertures, 63 in the carriage cover 64. A counter register, comprising a plurality of ordinally arranged counter dials 65, viewable through apertures, or windows, 66 in the carriage cover, is also mounted in the carriage. The counter dials are utilized to count the cycles of operation and thereby register a quotient in division operations or to show the multiplier value at the end of a multiplication operation.

4. Tens-transfer mechanism

It will be understood that both the accumulator, or product register dials 62 and the counter dials 65 are provided with tens-transfer mechanisms operative to effect necessary tens-transfer between the various dials as required. The tens-transfer mechanisms shown in Fig. 2 are conventional in the machine mentioned and are fully shown and described in the patent to Friden No. 2,229,889.

In a machine utilizing the shortcut principle of multiplication, it is necessary to have a full capacity tens-transfer for the accumulator, or product register, 62. In the preferred embodiment of my invention, I utilize the full-carry mechanism shown and described in the patent to Machado, No. 2,597,507, issued May 20, 1952. It is therefore believed unnecessary to describe this portion of the conventional machine, although it can be mentioned that it is essential to effect tens-transfers to the full width of the accumulator register as the first cycle of multiplication operation may be a subtractive one. Such a subtractive operation would, of course, register "9's," as far as the tens-transfer was effective. If this transfer were effective only part way across the register, the later shifting of the register as the multiplication progressed might cause an error, for values then might be entered in orders which stood at "0" instead of "9." It will be obvious to those skilled in the art that any full-carry mechanism would be operable in connection with my invention, the one mentioned being preferred for use in the machine described in the patents heretofore mentioned.

5. Selection mechanism

Values are entered into the machine by means of a keyboard, which, in its preferred embodiment, consists of ten orders of value keys 80 progressively arranged for the values "1" to "9," inclusive—the keys 80 also being arranged in banks, or transverse rows, of keys of like value, as shown in Fig. 1. Aligned with each order of keys 80 is a single "0," or ordinal clear, key 81, as shown. A number of control keys are arranged to the right of the main keyboard and include a plus bar 70, a minus key 71, a left shift key 72, a right shift key 73, a keyboard clear key 74, and a register clearing key 75.

The value keys 80 are mounted on the upper ends of identical key stems 82 (see Fig. 2). The key stems are slidably mounted in the machine frame, as by means of slots 83 in the key stems embracing crossbars 84 of a keyboard frame assembly. These key stems are individually biased to their raised position by any resilient means, such as springs, not shown. The keys can be latched in a depressed position, to control the entry of values into the machine upon cycling thereof, by a suitable ordinal latch slide 90 associated with each order of keys. Each latching slide 90 is individually biased to a forward position (to the left in Fig. 2) by resilient means, not shown; and each is provided with a series of slots 91, which embrace the respective key stems 82. These slides cooperate with cam faces 85 formed on the rear edge of each key stem 82, whereby the depression of the key stem cams the latching slide 90 to the rear. When a key stem 82 is depressed to its operative position, a notch 86 formed in the rear edge of the key stem, lies opposite the ordinal latching slide, whereupon the latter is snapped into the notch 86 by its resilient means to hold the key stem latched in the operative position. A key so latched in its operative position is released by the depression of another key in that order or by operation of the ordinal clear key 81, the stem of which is provided with a cam 85 but contains no notch 86. All of the latching slides 90 can be moved rearwardly to unlatch all operative keyboard keys by depression of the keyboard clear key 74. This key operates through conventional means, not shown, to rock a bail 92 (see Fig. 3), the rearwardly extending flange 95 of which is adapted to engage the turned-down ears 93 formed on the forward end of each of the latching slides 90. The bail 92 is mounted on a transverse shaft 94 and thus rocks freely although biased to an inoperative position (clockwise in Fig. 3) by means of a spring, not shown. When the bail 92 is rocked, as by depression of key 74, it engages all of the ears 93, and moves all of the slides rearwardly, thereby clearing the entire keyboard.

Each of the key stems 82 is provided with a pin 87 adjacent its lower end, each pin being adapted to engage the associated differentially angled cam face 101 of a selection, or V-notch, bar 100. The selection bars 100 are mounted for free longitudinal movement, as by pivotally mounting them on a pair of parallel arms 102 (only one of which is shown in Fig. 2). The rear ends of each of the selection bars 100 is provided with a perpendicularly extending yoke 103 which engages an annular slot 111 formed in the hub of a selection gear 110. The various selection gears are slidably mounted on longitudinally extending square, or selection, shafts 112, which shafts are journalled in the crossbars 53, 54 and 55, as shown in Fig. 2. There is one selection shaft 112 for each order of the keyboard, and it is conventional in the machine above-mentioned to provide two selection slides 100 and two selection gears 110 for each order of the machine. It is conventional in the machine above-mentioned to have the "1" to "5" keys cooperate with one slide 100, thereby moving the selection gear 110 on the rear end of that slide forwardly a differential amount determined by the key depressed; and to provide a second slide for the "6" to "9" keys of that order, which slide will differentially translate the second selection gear 110 forwardly an amount determined by the key depressed.

The selection gears, and the square shafts 112 on which they are mounted, are given differential increments of rotation determined by the longitudinal position of one or the other selection gear 110 on the shaft, by means of a conventional Thomas-type actuator 120. The actuator drums 120 are rigidly mounted on actuator shafts 121, which are driven in unison from a common transverse drive shaft 122 rotatably mounted in the machine, the various actuator shafts 121 being driven by pairs of miter gears 123, as shown. The actuator drums 120 are provided with two sets of stepped, or mutilated, teeth, one set serving the "1" to "5" selection gear and the other associated with the "6" to "9" gear. As shown in Fig. 2, the first group (the left-hand group in that figure) has five teeth of differential length, and the second group (the rear group in Fig. 2) has six teeth of equal length and three additional teeth of differentially progressive shorter length. Obviously, the differential translation of one or the other of the selection gears 110 along its square selection shaft 112, resulting from operation of a pin 87 upon its associated V-notch, will place the gear in the plane of a number of teeth on the actuator drum corresponding to the value of the key 82 depressed.

6. Accumulator drive

The accumulator, or product register, dials 62 are severally mounted on accumulator shafts 130 journalled in the hollow frame bar 61, as shown in Fig. 2. An accumulator drive gear 131 is rigidly attached to the lower end of each accumulator shaft 67. The gear 131 is driven, selectively in either direction, by means of a spool, or sleeve, 132 slidably mounted on the rear end of the ordinally aligned square, or selector, shaft 112. The spool 132 is provided with a plus, or additive, drive gear 133 and a minus, or subtractive, drive gear 134, each of which is adapted to mesh with the gear 131 when the spool is shifted rearwardly or forwardly, respectively, on the shaft 112. Normally, the spool 132 lies in the intermediate position shown in Fig. 2, so the carriage 60 may be shifted ordinally with respect to the actuating mechanism without engaging either drive gear; however, it (the spool 132) can be shifted in either direction to control additive or subtractive operation of the machine by means of a computation control gate 135. The gate 135 extends transversely of the machine, being mounted upon a pair of arms 136 affixed to a control shaft 137. The shaft 137 can be rocked in either direction by various means, such as the add bar 70 or subtract key 71 (which rock the shaft clockwise or counter-clockwise, respectively, in Fig. 2) to cause engagement of either the add gear 133 or the subtract gear 134 with the accumulator gear 131. The subsequent rotation of the drive shaft 122 and actuators 120, and the consequent differential rotation of selection gears 110 and square shafts 112, drive the accumulator shafts and dials in incremental amounts in the selected direction for addition or subtraction. The conventional mechanism for so controlling the operation of the computation control shaft 137 and consequently gate 135 from the keys 70 and 71 is not here pertinent and will not be described, but it can be mentioned in this connection that the shaft 137 will be selectively rocked by the multiplying mechanism hereafter to be described to provide for either additive or subtractive multiplication and also to provide for operation in the selected direction for the multiplier values "1" to "5," inclusive, and in the reverse direction for the values "6" to "9," inclusive.

The machine is preferably driven by a motor, not shown, through a conventional unidirectional clutch. The driving mechanism includes the motor shaft 140 (see (see Fig. 3) upon which is mounted a pinion 141. The pinion meshes with an idler gear 142, rotatably mounted on a stub shaft 143; the idler also meshing with a large clutch gear 144 which is rotatably mounted on the power shaft 122. The large gear 144 carries an integral ratchet, not shown, and constitutes the driving side of the clutch. The driven side of the clutch comprises a plate 145 keyed on, or otherwise rigidly secured to, the power shaft 122. The plate 145 carries a clutch dog 146 adapted to mesh with the ratchet, not shown, on the driving gear 144—the clutch dog being resiliently biased into engagement with the ratchet by a suitable spring 147. Normally, the clutch dog 146 is held away from engagement with its cooperating ratchet by a clutch control lever 150 pivotally mounted on the frame plate 52 by any suitable means, such as stud 156. The clutch control lever 150 pivotally supports the rear end of a clutch control link 151, the forward end of which is pivotally mounted on a two-armed lever 152. The two-armed lever 152 is likewise pivotally mounted on the frame plate 52 by any suitable means, such as pivot stud 155. The lower end of the control lever 152 carries a long pin 154 which extends through an aperture in the frame plate 52, on which pin is mounted the forward end of a switch control link 153. Forward movement of the link 153 closes the motor control switch, not shown, to energize the motor, likewise not shown. Operation of the motor, of course, drives the pinion 141, idler 142, and clutch gear 144. Simultaneously with the operation of the switch control link 153, the clutch control lever 150 will be rocked (counter-clockwise in Fig. 3) to release the clutch dog 146 and permit it to engage the ratchet, and thereby rotate the drive shaft 122. It is conventional in the machine herein described to provide a single cycle means which normally disengages the clutch and opens the motor switch at the end of a full-cycle of rotation of drive shaft 122, but which holds the clutch engaged and the switch open until the full-cycle position is reached.

The control assembly here described, including the clutch control lever 150 and the switch control link 153, and their interconnecting link 151 and lever 152, are operated by various control keys by means not here pertinent and which, therefore, will not be described. However, it can be noted that forward rocking of the long pin 154, by means of the rocking of lever 287, closes the motor switch through link 153 and enables engagement of the clutch, thereby rotating drive shaft 122, and that this rotation will continue so long as the pin is held in the forward position.

7. Counter actuator

The counter dials 65 (Fig. 2) are mounted on a plurality of parallel shafts 160 mounted in the carriage frame 61 and the carriage rail 161, as shown. The counter dial 65 aligned with the lowest, or units, order of the keyboard is operated by a counter actuator 162 of conventional construction. This actuator is adapted to engage a gear 163 affixed to each of the counter shafts 160 to impart to the gear and dial an angular movement equivalent to a value of "1," with each cycle of machine operation. The construction and operation of the counter actuator 162 and the counter register is of no particular importance in the instant invention and will therefore not be described—reference being made to the Patent No. 2,229,889 for a full disclosure of this mechanism.

8. Register clearing mechanisms

A conventional means for clearing the accumulator register dials 62 or the counter register dials 65 is illustrated in Fig. 2. Such mechanisms may comprise mutilated clearing gears 170 mounted on each of the accumulator shafts 130 and similar mutilated gears 172 mounted on the counter shafts 160. Preferably, these mutilated gears are staggered on their respective shafts, as shown. Associated with the clearing, or mutilated, gears 170 and 172 are clearing racks 171 and 173, respectively. The respective dials are returned to their "0," or clear, position by longitudinal translation of the racks 171 and 173, respectively, as fully shown and described in the patent to Friden No. 2,229,889 already mentioned. These racks can be actuated manually by means of knobs 174 and 175, respectively (shown in Fig. 1). The clearing racks, or either of them, can also be operated by power, as by depression of the clear key 75, or automatically in certain operations (one of which operations will be mentioned hereafter) by a mechanism which now will be described.

Figure 5:
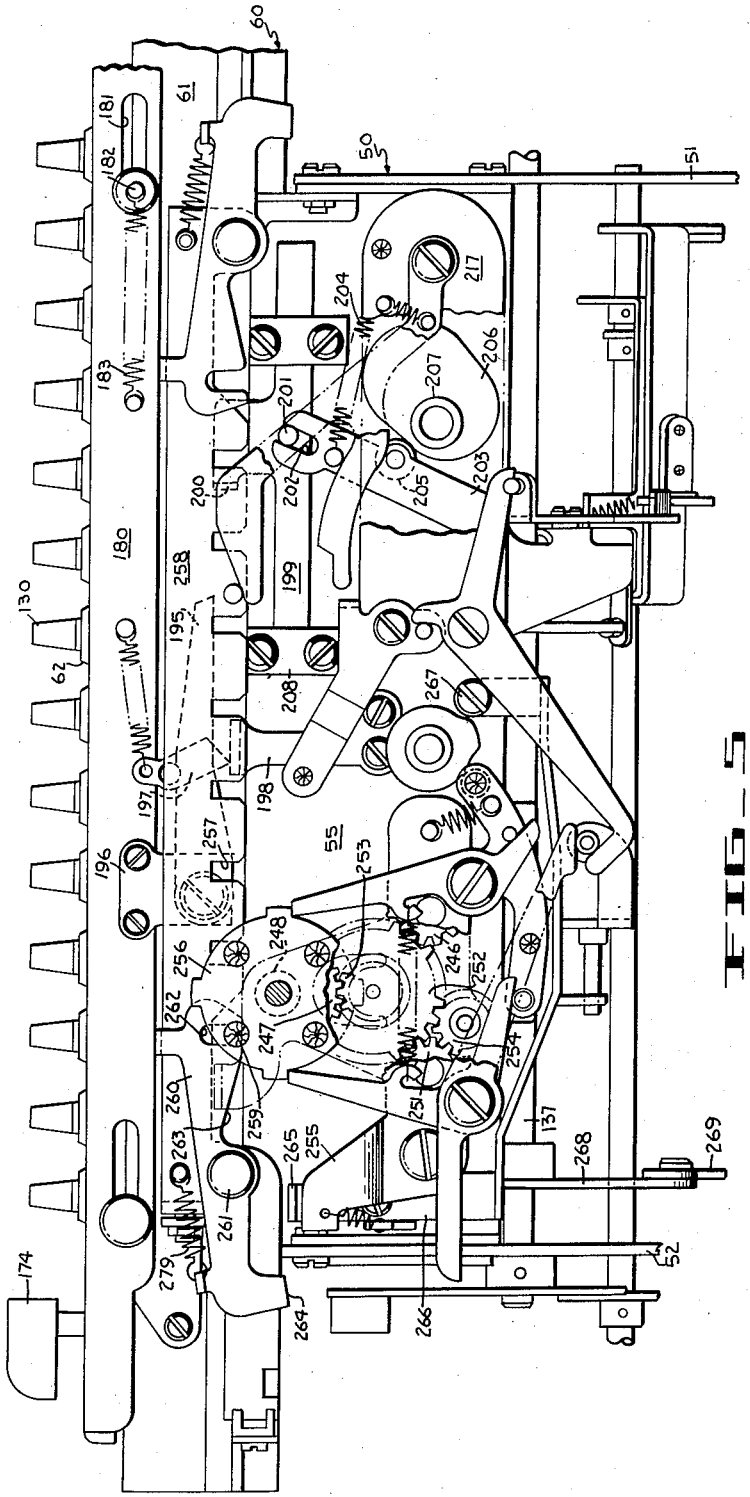
Fig. 5 is a rear view, with the cover removed, of a preferred form of the machine of the present invention.

The power clearing mechanism comprises a power-operated bar 180 slidably mounted on the rear of the carriage frame plate (see Fig. 5). Preferably, the power bar 180 is mounted by a conventional pin-and-slot mounting which includes slots 181 in the bar embracing pins 182 mounted in the carriage frame bar 61. It is conventional to bias the bar to its left-hand (to the right in Fig. 5), or inoperative, position by a suitable tension spring 183, as shown. The right end of the power bar 180 (as shown in Fig. 1) carries an integral bracket 184 upon which are riveted, or otherwise rigidly secured, pins 187 and 188. Interponent arms 185 and 186, rigidly connected to the knobs 174 and 175, respectively, enable the operator to selectively connect the clearing racks 171 and 173 to the bracket 184, so as to clear their respective registers upon operation of the power bar 180.

The power bar 180 is operated, i.e., translated to the right against the tension of spring 183, by means of an interponent 195 (see Fig. 5) pivotally mounted on a bracket 196 affixed to the rear side of the bar 180. Preferably, the interponent 195 is provided with a live pawl 197 which is adapted to engage a bracket 198 mounted on the rear of the cross-member 55 and which is operative to lift the interponent above the path of travel of the operating ear 200 on slide 199 as the carriage approaches the extreme left-hand position, and holds the interponent in an elevated, or inoperative, position until the extreme position is reached. The slide 199 is slidably supported on the rear cross-bar 55 by any suitable means, such as brackets 208, and is provided with a perpendicularly extending ear 200 which is adapted to engage the end of the interponent 195 when the carriage is in the extreme left-hand position.

The slide is operated by means of an operating arm 203 pivotally mounted on the rear crossbar 55, the slide and arm being connected by means of a pin-and-slot connection comprising the pin 201 on the slide 199 and the slot 202 in the upper end of the operating arm 203. The operating arm 203 is normally biased to its inoperative position by a suitable tension spring 204, as shown, and is rocked to its operative position by means of a cam 206, the periphery of which engages a follower roller 205 on the arm 203. The cam 206 is rigidly mounted on a sleeve member 207 (see also Fig. 4) rotatably journalled on the extended rear end of the extreme left-hand actuator shaft 121, the sleeve extending rearwardly from the rear cross plate 55 to an auxiliary plate 217 spaced therefrom.

A clutch member 210 (Fig. 4) mounted adjacent the rear end of the left-hand actuator shaft 121, is adapted to connect that shaft to the sleeve 207 for clearing operations, although normally disengaged therefrom. The clutch is controlled by a clutch control rod 211 extending longitudinally in the machine, which control rod is biased to its forward, or inoperative, position by a conventional spring 212. The clutch rod 211 can be translated rearwardly to place the clutch 210 in operative position by means of a pusher link 213 which is pivotally mounted on an arm 214 (see Figs. 4 and 12) rigidly affixed to a transverse shaft 215. The pusher 213 is resiliently biased into engagement with clutch rod 211 by any suitable means, such as spring 216. It is obvious that the rocking of the shaft 215 (clockwise when viewed from the right, as in Fig. 12) will be effective, among other things, to translate the pusher, or interponent, 213 rearwardly and thereby move the clutch control rod rearwardly to place the clutch 210 in an operative condition. Thereupon the sleeve 207 rotates with the shaft 121 on which it is journalled, and will consequently rotate the cam 206 to rock arm 203, and this, in turn, operates slide 199 to cause clearing operation of the power bar 180 as soon as the carriage 60 reaches its extreme left-hand position.

9. Carriage shift

The carriage 60 can be shifted in either direction, either automatically in certain operations or under control of the shift keys 72 and 73. The shifting mechanism (best shown in Fig. 4) comprises a left shift clutch 230 and a right shift clutch 231, which are mounted on the two right-hand actuator shafts 121, which two shafts are extended to a point adjacent the rear cross plate 55. The operation of each of these clutches is controlled by means of clutch control rods 232 or 233. The two rods are biased to their forward, or inoperative, positions by means of compression springs 234 and 235, respectively, which springs encompass the forward end of the rods and are compressed between the forward crossbar 53 and collars secured to the rods. The left shift control rod 232 can be moved rearwardly to place the left shift clutch 230 in its operative position by means of a pusher link 236 pivotally mounted on an arm 237, the arm being rigidly secured to a transverse shaft 238. Similarly, the right shift clutch control rod 233 can be moved rearwardly to place the right shift clutch 231 in operative position by means of a pusher link 239 pivotally mounted on an arm 240, the arm being rigidly secured to a sleeve 241 journalled on shaft 238. The two pusher links 236 and 239 are respectively urged into engagement with their respective pusher control rods 232 and 233 by suitable tension springs 242 and 243, as shown.

Movement of the left shift clutch control rod 232 causes a jaw member on the clutch 230 to be moved rearwardly into engagement with the clutch disk 244, whereby the rotation of the actuator shaft 121 will simultaneously rotate the plate 244 and the sleeve 245 on which it is mounted. The sleeve 245 is rotatably journalled in the rear crossbar 55 and a bracket 255 on the rear thereof. A gear 246 rigidly mounted on the sleeve, drives a shift gear 247 integral with a sleeve 248 by means of a gear train including large idler gear 252 (see Fig. 5) and a pinion 253 affixed thereto and meshing with gear 247. The sleeve 248, upon which shift gear 247 is mounted, is also journalled in the rear crossbar 55 and the bracket 255 mounted thereon. Similarly, movement of the right shift clutch control rod 233 rearwardly causes a jaw member on the right shift clutch 231 to move into engagement with the driven plate 249 associated therewith. The plate 249 is mounted on a sleeve 250, likewise journalled in the crossbar 55 and bracket 255. A gear 251 rigidly mounted on the sleeve 250, also drives the shift gear 247 by means of a train containing gear 252 and wide idler 254 between it and gear 252. It is obvious, therefore, that rotation of the actuator shafts 121, and their respective clutch plates 244 or 249 (all of which rotate in the same direction), will be effective to cause reversible rotation of the gear 247 and the sleeve 248 on which it is mounted. The sleeve 248 carries a shift plate 256 upon which are mounted a number of drive pins 259 adapted to engage notches 257 formed in a rack 258 mounted on the rear of the carriage frame bar 61. Thus, movement of rod 232 to the rear causes operation of the shift plate 256 in one direction (counter-clockwise when viewed from the front, or clockwise when viewed from the rear as in Fig. 5), while operation of the rod 233 causes reverse operation of the shift plate 256 (clockwise when viewed from the front or counter-clockwise when viewed from the rear as in Fig. 5).

It can be mentioned that in its preferred form the gear trains, including the driven gear 247, have a gear ratio of 4 to 1 so that the gear 247 and plate 256 are rotated through an angle of ninety degrees for each full cycle of operation of the actuator shafts 121 (which have a 1 to 1 gear ratio with the drive shaft 122 and clutch plate 145 attached thereto). Thus, a single cycle of operation of the machine will cause a shifting of the carriage an amount equal to the space between successive notches 257 in the rack 258, the spacing being such as to cause a shift of one ordinal position of the carriage, or the distance between successive dials 62.

10. Left shift terminating mechanism

It is conventional in the machine described to provide means for terminating an automatic shift in either extreme position. The power-operated clearing mechanism heretofore described operates when the carriage is in the extreme left-hand position, and as some of the automatic operations initiate the programmed series in that order, it is necessary that the clearing operation also be immediately terminated. This can best be accomplished by disabling the clear clutch by the shift terminating mechanism. Such is required in a multiplication operation, for example, for the carriage is conventionally shifted to the extreme left-hand position, the registers are then cleared, and multiplication begins in the same order. It is therefore essential to operate the clearing mechanism once and once only. Termination of operation of both the left shift clutch and the clear clutch are controlled by an attempted overshifting of the carriage beyond the terminal position, by means which will now be described.

An override pawl 260 (see Fig. 5) is pivotally mounted adjacent the right end of the rack 258, being pivoted on a suitable stud 261 riveted to rack 258. The left end of the pawl 260 is slotted, as at 262, to form the terminal slot of the rack 258, as shown. The lower edge of the pawl 260, adjacent the slot 262, is formed with a cam face 263 adapted to be engaged by a pin 259 when the shift mechanism is operated to attempt a left-hand shift of the carriage (to the right in Fig. 5) beyond the terminal position. The engagement of a pin 259 with the cam face 263 rocks the pawl 260 against the tension of its spring 279 which biases the pawl to its normal position. The right end of the pawl 260 is provided with a nose 264 which, when the carriage is in the extreme position, overlies an ear 265 formed on the upper end of the vertical extension of an angular arm, or L-shaped lever, 266. The arm 266 is pivotally mounted on the rear crossbar 55, as by screw 267. The rocking of the pawl 260, during the attempted overdrive of the carriage shifting mechanism, obviously rocks the arm 266 (counter-clockwise in Fig. 5).

The vertical extension of the angular lever 266 overlies the horizontal arm of a bellcrank 268, which is pivoted on any suitable shaft, such as computation control shaft 137. The vertical arm of the bellcrank pivotally supports the rear end of a forwardly extending link 269 (see also Fig. 4), the forward end of which is pivotally supported by an upstanding arm 271 of a bail 270 rotatably mounted on the shaft 215 upon which the clear clutch control arm 214 is mounted. The bail 270 carries a rearwardly extending arm 272 which is formed to pass beneath shaft 215 and then upwardly to adjacent the left shift pusher link 236. The arm 272 is provided at its rear end with an angularly extending projection, or ear, 273 which underlies the pusher link 236. Thus the rocking of the bail 270, from operation of the override pawl 260, is effective to lift the pusher link 236 against the tension of its spring 242, so that it becomes disengaged from the clutch control rod 232—thereby permitting the spring 234 thereof to translate the rod forwardly to its inoperative position.

The bail 270 carries an extension 274 which projects to the left to the plane of the clear clutch pusher link 213, as shown in Fig. 4. This extension terminates in a nose 275 which underlies the link 213. This link, as previously mentioned, controls the positioning of the clear clutch control rod 211. Thus, the rocking of the bail 270 simultaneously disables the left shift clutch 230 and the clear clutch 210—the bail always rocking whenever a shift of the carriage 60 is attempted beyond the extreme left-hand position.

It can be mentioned that the extension 274 also underlies a pusher link 311 which controls operation of a power-operated programming mechanism described in the next section. The operation of the bail 270, therefore, disables the link 311. Also, the rocking of bail 270 is effective to initiate the operation of the multiplier mechanism, as will be described hereafter.

It can be noted that although the rocking of the bail 270 is momentary, so that the pusher links 213, 236 and 311 controlled thereby will be permitted to return to their normal positions immediately, such return will not re-engage the respective clutches. The respective links 213 and 236 will have been lifted above the respective control rods 211 and 232, permitting the rods to be biased forwardly by their respective springs, so that when the bail returns to its normal position, the pusher links 236 and 213 will ride upon the top of the control rods and will not engage the ends thereof. Thus, the left shift clutch and the clear clutch cannot become re-engaged until after the operation is terminated and the respective controls (which were latched in their operative position) are returned to their normal inoperative positions.

It may be noted in Fig. 5 that the machine shown for purposes of exemplification has a similar override pawl mounted on the left end of the carriage. The operation of this pawl has no connection with the multiplication mechanism herein described, and a description of its construction and operation can be omitted.

11. Shift and clear programming mechanism

It is convenient, in the machine herein shown for purposes of exemplification, to initiate all operations which include an initial left shift of the carriage, followed by a clearing of the registers in the extreme left-hand position thereof, by a single, power-operated mechanism. For this purpose I prefer to use the mechanism shown and described in the patent to Machado, No. 2,650,761 of September 1, 1953, a side view of which mechanism is illustrated in Fig. 6. The operation of this mechanism is controlled by the rocking of a shaft 290 (also shown in Fig. 4) suitably supported in the machine, such as by bearings, not shown, in left side auxiliary, or control, plate 57, and right frame plate 52. This shaft is rocked (clockwise in Fig. 6) by depression of any multiplier control key, as will hereinafter be explained, as well as by depression of other control keys, such as clear key 75, not here pertinent.

The shaft 290, at its right end, as shown in Fig. 3, carries a vertical arm 285 rigidly mounted thereon. A stud 286 on the free end of the vertical arm, engages the forward end of a two-armed lever 287 which is rotatably mounted on the transverse shaft 215. A hook 288 on the rear end of the lever, engages the pin 154 which connects the switch control link 153 to the clutch control lever 152. Thus, the rocking of shaft 290 (clockwise in Fig. 6 and counter-clockwise in Fig. 3) causes the forward translation of the switch control link 153 to initiate operation of the motor and rocking of clutch lever 152 and clutch pawl 150 to engage the clutch, and thereby initiates machine operation.

The shaft 290 (see Figs. 4 and 6) carries a bellcrank member 292 rigidly secured thereto in a plane intermediate the side frames 51 and 52. The upper arm of this bellcrank is provided with a pin 293 embraced within a slot 294 formed in the front end of a rearwardly extending link 295—the bellcrank and link being held in a retracted position by means of spring 303. The rear end of the link 295 is pivotally connected to one arm of an eccentrically mounted bellcrank member 296 which is rotatably mounted on an eccentric 304 carried by a shaft 297. A hook 298 is formed on the other arm of the bellcrank 296 to form a hook member which is reciprocated in a radial direction by its eccentric mounting and is also rockable about shaft 297. The shaft 297, which is journalled in bearings carried by an intermediate frame plate 59 and a bracket 302 affixed to crossbar 53, rotates in synchronism with the main drive shaft 122, by the drive means shown in Figs. 4 and 25. This drive comprises miter gears 659 and 658 which connect drive shaft 122 to an auxiliary shaft 656, and miter gears 305 and 306 which connect shaft 656 to shaft 297. Thus the bellcrank 296 reciprocates continuously when the machine is in operation. Normally, the hook arm 298 travels in a path in which it is ineffective, so that such constant reciprocation is mere idle movement. However, when the shaft 290 is rocked (clockwise in Fig. 6) and the hook arm 298 is likewise rocked (in the same direction) on its eccentric mounting, the hook arm will engage a pin 299 on the rear arm of a rocker 300. In this adjusted position of the bellcrank 296, the first cycle of operation thereafter will rock the rocker 309 (clockwise in Fig. 6). The rocker 300 is rigidly affixed to the shaft 215 previously mentioned which, among other things, carries the arm 214 associated with the clearing mechanism heretofore described (see Fig. 4). The rocker arm 300 is latched in the rocked position by a suitable latch 301, which is released only by the return of shaft 290 and its bellcrank 292 to their original positions shown in Fig. 6. Thus, the control shaft 215 is maintained in its operative position until the bellcrank 292 is returned to its inoperative position (which occurs upon termination of a multiplication operation by the automatic release of the multiplier control key).

The shaft 215 also carries an arm 310 (see Figs. 4 and 6) which is rigidly mounted thereon. A pusher link 311, similar in configuration to the pusher link 213 previously mentioned, is pivotally supported on the arm 310. The rear end of the link 311 is provided with a shoulder 312 which is adapted to engage a pin 313 mounted on the lower end of an arm 314. The arm is rigidly affixed to a sleeve 315 (see also Fig. 4) which is rotatably mounted on the left shift control shaft 238. The right end of the sleeve 315, as shown in Figs. 4 and 6, carries a second arm 316, and the arm 316 carries a long pin 317 at its lower end, which pin also engages the forward end of the left shift control rod 232.

The rocking of the shaft 290, upon depression of a multiplier control key, as will hereinafter be described, is effective to rock eccentrically mounted bellcrank 296 so that the hook 298 thereof, in its reciprocation, will engage the pin 299. Thereupon the bellcrank 300 and shaft 215 are rocked (clockwise in Fig. 6) to rock clear clutch arm 214 and shift clutch arm 310, both of which are rigidly secured to the shaft 215. The rocking of shaft 215 enables both the clear clutch 210 and the left shift clutch 230. The mechanism is latched in its operative position by the latch 301 and is held in that position until the multiplier key is released at the end of the multiplying operation. Thus, the carriage 60 will be shifted to the left, and the clear clutch will be effective to rotate the clear cam 206 until the carriage reaches the extreme left-hand position. In that ordinal position, the clearing cam 206 will be effective, through the linkage described, to reciprocate power bar 180 and thereby clear the registers. Simultaneously the shifting mechanism will attempt to shift the carriage beyond its terminal position, and this attempted overshift will cause pawl 260 to be rocked, thereby rocking bail 270. Thereupon the extension 274 lifts pusher link 311 to disengage the left shift clutch 230 and lifts link 213 to disengage the clear clutch 210. At this point the operation of the multiplier mechanism will be tripped and the machine will proceed in the multiplication operation, as will hereinafter be described.

12. Multiplier keyboard

It will be seen, by reference to Fig. 1, that the machine with which my invention is preferably associated, has a multiplier, or auxiliary, keyboard located in the lower left-hand corner of the machine. This keyboard comprises the multiplier value keys 400 for the values "1" to "9," inclusive; a "0" value key 401; and the three multiplier control keys: 402 (for clearing the registers prior to an additive multiplication operation), 403 (for additive multiplying without clearing the registers), and 404 (for multiplying in a subtractive direction to give the complement of the true product, and therefore subtract one product from another). It is conventional in the machine of this make, as shown in this figure, to arrange the multiplier value keys in a small 3 x 3 square for the value keys 400, with the large "0" key 401 in front of the group, and to place the control keys immediately adjacent thereto on either side of the value keys.

It can be mentioned that the multiplier selection mechanism includes check dials, which, when a value is inserted in the unit and the multiplier carriage shifted to the left, as will hereinafter be described, appear through a window 405 located above the value keys 400. It will be understood that these check dials ordinarily do not appear through the window, but are shifted to the left under the window as values are inserted in the mechanism, so that they become visible as a value is inserted in the multiplier keyboard.

The keyboard frame in which these keys are mounted comprises upper plate 406 and lower plate 407 (as shown in Figs. 7 and 9), held in spaced relationship by spacing studs 408. The frame is properly supported in the machine by any suitable means, such as by bolting to the intermediate plate 59 and the left side auxiliary, or control, plate 57, and braced by a bracket 409 (Fig. 7) connecting the intermediate and auxiliary plates.

The keys 400 are mounted on key stems 411 to 419, inclusive, as shown particularly in Fig. 8 (the last digit in these reference characters indicating the value of the respective keys). The "0" key 401 is mounted on a pair of key stems 410 aligned with the "1" and the "3" keys, as shown in this figure. Each of the key stems extends through a registering slot formed in an upper plate 406, and is provided with a downwardly extending guide stem 430 to 439, inclusive, respectively, which extend through smaller registering slots in the lower frame plate 407. Each of these guide pins is encompassed by a suitable compression spring 450 (shown only in Fig. 9) which biases the respective key upwardly to its inoperative position, thereby holding its respective bracket, or shoulder, against the upper frame plate 406.

The right-hand "0" key stem 410 is provided with a short, forwardly projecting shoulder 420 and each of the value key stems 411 to 419, inclusive, are provided with laterally extending bracket members 421 to 429, inclusive, respectively. The shoulder and these bracket members are so located that they abut against the lower face of the upper plate 406 when the respective keys are in their raised, or inoperative, positions. These bracket members are formed as shown in Fig. 8—the shapes being selected so as to enable each bracket to overlie an escapement rod 540 and also to enable the brackets 421 to 425, and 429 to 427 to overlie the forward ends of a series of setting arms 451 to 455, and 459 to 457, respectively. These setting arms lie immediately below the lower frame plate 407 and, as shown in Fig. 8, are of progressively decreasing length from "1" to "5" and from "9" to "7." Each of the bracket members 421 to 425 and 429 to 427 carries a depending projection, or stem, 441 to 445 and 449 to 447, respectively, which pass through a registering slot in the lower frame plate 407 and engage the forward ends of the respective setting arm. The bracket 426 of the "6" key (as shown in Fig. 8) is only long enough to engage the escapement bar 540—there being no setting arm for the value of "6," as will hereinafter be described.

The series of eight value setting arms 451 to 455 and 459 to 457, respectively, are mounted in the machine, independently of the keyboard mechanism but immediately below the lower frame plate 407 (see Figs. 7 and 9). These arms are rotatably mounted on a short transverse shaft 477 and lie immediately adjacent each other, as shown in Figs. 8 and 9. The shaft 477, incidentally, is mounted in, and extends between, a second intermediate frame plate 67 and a bracket 478 mounted on the plate 67 (as shown in Fig. 9). The arms 451 to 455 and 459 to 457 (as shown in Fig. 7) are provided with upturned noses 461 to 465 and 469 to 467, respectively. These noses are adapted to be engaged by the downwardly extending projections, or stems, 441 to 445 and 449 to 447, respectively, which stems extend downwardly through frame plate 407 from the brackets 421 to 425 and 429 to 427, respectively, of the "1" to "5" and "9" to "7" keys, respectively, as previously mentioned.

It will be noticed that the arms of 451 to 455 and 459 to 457, as shown in Figs. 7 and 8, are of progressively decreasing length and that the respective noses 461 to 465 and 469 to 467 are spaced differentially, in inverse order, a radial distance from the shaft 477. These arms are similar in shape and size to the setting arms shown in the patents to Friden Nos. 2, 371,752 (where they appear as bellcranks 216) and 2,399,917 (where they appear as bellcranks 304) but differ therefrom in their effect upon the setting of the actuator segments to be hereinafter described. The values set into these segments run from "1" to "5" in consecutive order, as shown in Fig. 11, which is a development of the check dial associated with the segment, and then run in inverse order from "9" to "6." It can be mentioned that the "6" value is the last one on the segment and that value position is determined by a stop bar in the multiplier carriage. Thus, that the "6" key need only release the "0" latch and the escapement mechanism, for it does not set a value pin, or segment stop. For this reason, the arms 451 to 455 and 459 to 457 are of the progressively decreasing length shown in Fig. 7 particularly.

The control arms 451 to 455 and 459 to 457 are shaped as bell cranks hinged on an offset elbow, each being provided with a downwardly and rearwardly directed extension which terminates in a rearwardly and upwardly projecting nose 481 to 485 and 489 to 487, respectively, as shown particularly in Fig. 7. Normally, these extensions are held against a supporting bracket 479 by springs 480 tensioned between ears on the respective noses and the bracket 479. The extensions of the arms are bent, or formed, so that their respective noses terminate in a single longitudinal plane and project through a slot, not shown, in guide plate 471 rigidly mounted between the control plate 59 and the intermediate plate 67.

The setting arms 451 to 455 and 459 to 457, and particularly their respective noses 481 to 485 and 489 to 487, are adapted to set pins of a selection pinboard or conventional construction. These pins are similar to the setting pins shown in the patents to Friden Nos. 2,317,752 (where they appear as pins 251 in Fig. 21) and 2,399,917 (where they appear as pins 302 in Fig. 10). In the patents above-mentioned, eight such pins were utilized for the values "1" to "8," inclusive. In the present invention, the same number of pins are used, and they are arranged in the same manner; but are used for the values of "1" to "5" and then are reversed for values of "9" to "7"—there being no pin needed for a value of "6." These pins are mounted in base plates 473 and 474 of a multiplier carriage 472, the carriage also comprising end plates 475 and suitable tie rods, not identified. This carriage is substantially the same as that shown in the patents just mentioned, as will be obvious to those familiar with the patents or the machine manufactured in accordance therewith. The multiplier carriage 472 is shiftable transversely in the machine, between the left-hand frame plate 51 and a left-hand auxiliary, or control, plate 57, being mounted on a pair of rods, or rails, 476. It can be mentioned at this point that the carriage 472 is resiliently biased to the left by means which will shortly be described and normally is latched in its right-hand position, to the right of the window 405, but is permitted to escape to the left step-by-step with the insertion of values into the multiplier keyboard 400, 401.

13. *Multiplier control segments*

It will be understood that the multiplier carriage 472 will contain several orders of multiplier control mechanisms (ten being conventional in the machines manufactured in accordance with the teaching of the patents above-mentioned). It thus follows that there will be a like plurality of orders of the setting pins 491 to 495 and 499 to 497. In this connection it will be understood that there is only one set of value setting arms 451 to 455 and 459 to 457, and that each of those arms has only one operating nose 481 to 485 or 489 to 487, and that these arms, although rotatable, are not shiftable in the machine. The carriage 472, on the other hand, is shiftable laterally from a position immediately adjacent the intermediate bracket 59 to adjacent the control, or auxiliary, plate 57 (being indicated in Fig. 4 in the leftmost position). Normally, the carriage is latched in its rightmost position in which the leftmost order of pins of the carriage 472 overlie the operative noses of the selection arms. The depression of a value key 400 will operate the respective arms 451 to 455 or 459 to 457, whereby its respective nose lifts the respective pin 491 to 495 or 499 to 497 to its operative position, this operation taking place in the lefthand order of the pin box. Thereupon, the carriage 472 is permitted to escape one step to the left by an escapement mechanism which will shortly be described, and thereafter the noses underlie the respective pins of the adjacent order to the right, and so on.

It will be understood that each order of pins 491 to 495 and 499 to 497 of the multiplier carriage is associated with a corresponding ordinal selection segment, or rack, 500 (see Fig. 10). These segments 500 are journalled in immediately adjacent relationship upon a common shaft 501 that is mounted in the end plates 475 of the carriage, which shaft, preferably, will form one of the tie rods of the carriage frame. These segments are individually biased to an operative position (counterclockwise in Fig. 10) by means of springs 502 tensioned between a crossbar, or tie rod, 503 between the end plates 475, around the hub 504 of the segment and to a seat 505 on one of the spokes of the segment 490.

The various segments 500 are normally latched in the clockwise and inoperative position shown in Fig. 10 by individual "0" latches 520, adapted to engage a shoulder 507 on the forward lower portion of each segment. All of the "0" latches are mounted on a common shaft 521, which may also serve as a tie rod for the multiplier carriage frame 472—one of these "0" latches being aligned with each segment. The "0" latch aligned with the operating arms is operated by depression of any of the value keys 400, including the "6" key, as will shortly be explained, whereupon the segment aligned with the setting mechanism is released and becomes free to rotate under the force of its spring 502. The operation of the "0"

latch 520 follows immediately after the setting of one of the pins 491 to 495 or 499 to 497 of that order, so that the segment 500 is free to rotate until further rotation is blocked by whichever one of these pins had been elevated to its effective, or blocking, position (or in the event the "6" key was depressed until the segment 500 engages a stop bar 570). The angular position of these segments is determinative of the number of cycles of operation to take place in that order of the multiplier—the values "1" to "5" being represented by five successive steps, while the values "6" to "9" are arranged in their inverse order, for "9" requires a single cycle in the reverse direction (corresponding to a value of "1," a value of "8" requires two cycles in the reverse direction, etc.). It will be understood that upon return of a segment 500 to its normal position (except when modified as hereinafter explained), the shoulder 508 (see Fig. 14) at its upper end will be effective to terminate operation in that order and shift both the accumulator and multiplier carriages to the next ordinal position.

Preferably, each segment has associated therewith a dial member 511 upon which is engraved, or otherwise set, the digits "0" and "1" to "5" and "9" to "6" in that order (see Fig. 11). In the multiplier patents mentioned above, these numerical values appear in consecutive order. However, in the present invention I prefer to utilize a modified form of dial which will now be briefly described. The modified form comprises an auxiliary segment 512 upon which is rigidly secured the dial 511 representative of the multiplier value. The auxiliary segment 512 is rotatably mounted on a tie rod 513, which serves as a shaft for the dials. Each of the auxiliary, or dial, segments 512 is provided with an integral gear segment 514, the teeth of which mesh with a corresponding gear segment 515 integral with the associated selection segment 500. The rotation of the selection segment 500 to one of its value positions, will therefore rotate the dial segment 512 a corresponding amount. Normally, the "0" on each dial 511 is aligned with the window 405—and lies to the right thereof. As the value is inserted into the multiplier unit, the carriage is permitted to escape one step to the left, whereupon the dial just operated by the selection mechanism appears in the right-hand space of the window 405. The depression of the "0" key 401, while operating the escapement mechanism, to be described shortly, does not operate the "0" latch 520. Whenever the carriage 472 is stepped one step to the left by the depression of the "0" key 401, the selection segments 500 and dials 511 remain latched in the position shown in Fig. 10—thereby registering a "0" in the window 405. If, on the other hand, one of the value keys 400 is operated, the keys, with the exception of the "6" key, operate their respective setting arms and thereby set the respective pins 491 to 495 or 499 to 497. Simultaneously with this operation, the "0" latch 520 is released by all of these value keys, including the "6" key, so that the ordinally aligned segment 500 can rotate (counter-clockwise in Fig. 10), until stopped by the respective value pin or stop bar 570. Such rotation of the segment 500 rotates the dial 511 a corresponding amount, so that the dial displays the respective value through the window 405.

The segments 500 are provided with a series of teeth 506 on the rear edges thereof, as shown in Fig. 10, which are adapted to be engaged by the feed pawl 630 for the step-by-step return movement of the segments from their adjusted position to their "0" position. In many respects these segments are similar to the segments of the Friden multiplier patents mentioned. It will be noted, however, that these segments have one outstanding difference when compared to the segments of the previously mentioned patents. Each segment is provided with a slot 600 (see Figs. 10, 13, and 14). Each slot is formed of a major arcuate portion 601 drawn around the axis of shaft 501 as a center, and extending from the "0" and "1" to the "5" positions of the segment; a shorter arcuate section 602, drawn about the axis of shaft 501 as a center, but with a smaller radius than that of section 601 extending from the "9" to "6" positions of the segment; and a short diagonal portion 603 connecting the "5" and "9" positions of the slot. This slot, its shape and its location in each segment, is shown clearly in the figures mentioned.

Each slot embraces a pin 610 riveted to, or otherwise rigidly secured on an arm 611 which lies to the left of each segment 500, between it and the segment of the next higher order. The arms 611 are pivotally mounted on a tie rod 612 which, in this instance, serves as a shaft to rotatably mount the respective arms 611. These arms 611, therefore, assume one angular position when the related segment stands at a position of "0" (Fig. 10) or any of the values up to and including "5" (Fig. 13), and another position for the values "9" (Fig. 14) to "6." The arms are utilized to determine operation in the selected direction or in the reverse direction, as will hereinafter be described in detail.

It should be noted, however, that each arm 611 carries an interponent 613 pivotally mounted on the upper end of the arm by any suitable means, such as pivot stud 614. A spring 615 tensioned between an ear 616 formed on the upper end of the arm 611 and a complementary ear 617 formed on the forward end of the interponent 613, biases the forward end of the interponent upwardly (counter-clockwise in Figs. 10, 13 and 14). The forward end of the interponent carries an ear 618 turned toward the left (see Fig. 15), so as to overlie the upper shoulder 508 of the segment 500 of the adjacent higher order, when that segment is in its "0" position. The interponent 613 also carries a small ear 619 on its rear end which engages the upper edge of a centralizing interponent 620, likewise pivotally mounted on the arm 611 by a suitable stud 621. A compression spring 622, positioned over noses on the upper section of the arm 611 and a lower portion of the centralizer, biases the centralizer 620 (clockwise in Figs. 10, 13, and 14) against the ear 619 on the interponent 613. A small pin 623 on the arm prevents overrocking of the centralizer 620 and thereby prevents the spring 622 from overcoming the spring 615 between the interponent and the arm 611. While the purpose and operation of the interponent 613 will be described in detail hereafter, it can be noted that when the interponent 613 is in its normal position shown in Figs. 10 and 13, it causes the lifting of the shift control lever 880 when the segment returns to its "0" position. However, if the segment of the next lower order has been set for a value of "6" to "9," then the arm 611 controlled by the lower order is rocked (counter-clockwise to the position shown in Fig. 14) by the engagement of pin 610 with sections 603 and 602 of the slot 600. Such rocking of the arm 611 withdraws the interponent rearwardly (to the left in these figures), so that its forward ear 618 no longer lies between the segment 500 of the adjacent higher order and the shift control lever 880, just mentioned, in which case the segment 500 must rock one additional step before it can operate the shift control lever. This is necessary when operation in any particular order is in the selected direction (corresponding to a value "1" to "5") and operation in the previous order was in the reverse direction (caused by a value of "6" to "9").

The arm 611 is provided with a rearward projection 625 (shown in Figs. 10, 13 and 14) which is operative to control the operation of the shift control arm 880 when operation in a particular order is in the reverse direction, corresponding to a value of "6" to "9" standing in the operative segment, as will hereinafter be described in detail.

It should be noted that there is an auxiliary segment 599 (see Fig. 10) to the left of the highest order segment 500. This auxiliary segment effective to control operation of the multiplier unit in the order above the highest order, in the event that it is necessary because of operation in the reverse direction in the highest order of the multiplier factor. This segment is pivotally mounted on the shaft 501 and is biased in a downward direction (counter-clockwise in Fig. 10) by a spring 591 tensioned between it and the multiplier carriage frame to hold it against a "0" stop ear 592 carried by the left frame plate 475 of the multiplier carriage. The upper end of the arm 590 is provided with a shoulder 594, which lies in the "0" position of the shoulder 508 of a segment, being held against the stop ear 592 by the force of spring 591. If the highest order segment 500 registered a value of "0" or "1" to "5," then the interponent 613 controlled by the highest order segment will lie in the normal position shown in these figures. In that event, the operation of the machine, in the cycle immediately following the shifting from the carriage position in which the highest order is in its operative position (which position is one ordinal step to the left of the home position of the carriage), causes the interponent 613 to engage the shift control lever 880 to initiate the final shifting of the carriage which terminates the operation. If, on the other hand, the highest order segment registered a value of "6" to "9," then the interponent 613 would be retracted, whereupon the shift control lever 880 can drop to its inoperative position and will cause an operation of the segment feed pawl 630, which will shortly be described. This feed pawl will engage a bellcrank extension 593 of the auxiliary segment 590, rocking it through one value space and causing its upper end 594 to engage the shift control lever 880, and thus initiate the shift that terminates machine operation.

14. "0" latch

It has been mentioned that the various multiplier control segments 500 are latched in their inoperative, or "0," positions (in which the "0" on the dial 511 is aligned with the window 405). The segment of the highest inoperative order (i.e., the first order to the right of the window) is released by the operation of any of the value keys 400 representing the values "1" to "9," inclusive, but is not released by the depression of the "0" key 401. The segment latch and its releasing mechanism will now be described, the mechanism therefor being shown primarily in Figs. 10 and 7. There is one such latch 520 (Fig. 10) for each of the segments 500, the latches being in the same plane as the associated segment and all of them being rotatably mounted on a cross shaft 521. The "0" latches 520 are individually biased to their latching position (clockwise in Fig. 10) by individual springs 522 tensioned between a pin 526 on the respective latch member and a seat in a related latch member 523, one for each of the "0" latches (the construction and purpose of which will be described shortly).

The "0" latch 520 aligned with the noses 481 to 485 and 489 to 487 of the operating arms 451 to 455 and 459 to 457, respectively, is operated by means of a latch-releasing arm 530 (see Fig. 10) which is in the same longitudinal plane as the noses. The arm 530 extends through a slot, not shown, in the guide plate 471, which slot is either an extension of, or is aligned with, the guide slot (likewise not shown) for the noses of the selection arm. This arm 530 is pivotally mounted on a pivot stud 531 (actually attached to the adjacent auxiliary plate 67, although the mounting of the stud is not shown in the drawings). The upper end of the arm 530 lies immediately behind the lower end of the latch 520 (as shown in Fig. 10), when the mechanism is in its normal, or inoperative, position. The arm 530 supports the lower and rearwardly extending end of a link 532, to which it is pivotally attached by means of a pin, or other suitable pivotal stud 533. The forward end of the link 532 (see Fig. 7) is pivotally connected to a two-armed lever 535 by any suitable means, such as pin 534. The two-armed lever 535 is pivotally mounted on a stud 536 mounted in bracket 544 integral with the plate 479. The forward end of the two-armed lever 535 is provided with a nose 537 which lies within a slot 538 in the lower frame plate 407 (see Fig. 8), the nose 537 extending a short distance above the upper face of the frame plate 407, as is shown in Fig. 7. The entire assembly, including latch-releasing arm 530, link 532, and lever 535, is held in its operative (rearward) position shown by a suitable spring 539 tensioned between a seat formed in the link 532 and a seat in a downwardly turned extension, or bracket, 470 formed on the rear edge of guide plate 471.

A "0" latch release, or operating, bar 540 cooperates with the nose 537 of the two-armed lever 535. The operating bar 540 is mounted in the free ends of a pair of arms 541 (see Figs. 7, 8 and 9) located at the front and rear of the base plate 407. These arms, preferably, are rigidly mounted on a longitudinally extending shaft 542 which is journalled in brackets 543 of the lower frame plate 407, the rigid mounting on shaft 542 being preferred so that the whole assembly will rotate without twisting, regardless of the key depressed. The bar 540 is held in its elevated position (the bar 540 and arms 541 are biased clockwise when viewed from the rear, as in Fig. 9) by a spring 566 associated with the escapement mechanism, which will hereinafter be described. The bar 540 underlies the lower edges of the various brackets 421 to 429 of the value keys "1" to "9," respectively, whereby the depression of any of these keys is effective to depress the bar 540. The depression of the bar 540 causes it to engage the nose 537 of lever 535, with some lost motion, thereby rocking the lever 535 (clockwise in Fig. 7) to translate the link 532 forwardly and rock the latch release arm 530 (clockwise in Figs. 7 and 10). Such rocking of the arm 530 rocks the latch 520 (counter-clockwise in these figures) to release the associated segment, allowing it to assume the position determined by one of the projected pins 491 to 495 or 499 to 497.

The latch members 523 for the "0" latches 520 (see Fig. 10) are pivotally mounted on a tie rod 524, which, in this case, serves as a shaft for rotatably mounting the latches 523. It will be understood that there is one latch 523 for each of the "0" latches 520 just mentioned. Each of the latch members 523 is provided with a shoulder 525 adapted to engage the pin 526 whenever the "0" latch 520 is rocked to its releasing position (counter-clockwise from the position shown in Fig. 10). It is obvious that the latch 523 is biased to a latching position (counter-clockwise in Fig. 10) by the spring 522 which simultaneously biases the "0" latch 520 to its latching position. Thus, when the "0" latch 520 is rocked to its releasing position by the operation of the arm 530, the latch member 523 is enabled to rock to its latching position, whereupon the shoulder 525 engages the pin 526 and holds the "0" latch in its releasing position. This position is maintained until the very end of the multiplication operation, at which time a restore plate 980 is operated to set all of the pins 491 to 495 and 499 to 497 to their inoperative positions. This plate, in its restoring movement (downwardly), engages a nose 527 on the forward end of each latch 523, thereby rocking the latch (clockwise in Fig. 10) to its releasing position, against the bias of spring 522—which operation permits the "0" latches 520 to return to their latching position. Simultaneously all of the segments 500 are rocked to their "0" positions, so that the "0" latches can engage the lower tip 507 of the segments 500, whereby the latter are latched in their "0" positions.

It can be noted here that, in the present invention, it is highly desirable to maintain the "0" latches 520 disabled throughout the multiplication operation. The individual segments 500 are returned to their "0" positions in order to control the number of cycles in each ordinal position of the carriage. The return of the segment 500 to its "0" position operates a shift control lever 880 to shift both the register carriage 60 and the multiplier carriage 472 one ordinal space to the right. In the case of the multiplier carriage, the shifting of the carriage to the right moves the operative segment 500 to the right of its feed and holding pawls 630 and 640, respectively, so that it is released to return to the value position determined by the associated pins. This is desirable because in many instances the number of cycles of operation in the operative order is modified by the value set in the segment of the adjacent lower order. It will be recalled that when operation in the lower order is in the reverse direction (for a multiplier value of "6" to "9"), there must be an additional cycle of operation in the adjacent higher order, if operation in that higher order is in the selected direction; and that if operation in two succeeding orders is in the reverse direction, it is necessary to delete one cycle of operation in the higher of the two orders in order to secure the proper operation. It is therefore obvious that it is desirable to return each segment to its value position as it is shifted out of its ordinally operative position, so that its position can be sensed in order to control the operation of the mechanism in the adjacent higher order, which, after such shifting, lies in the operative position of the machine.

15. Multiplier carriage escapement mechanism

It has been mentioned previously that the depression of any of the value keys 400 or the "0" key 401 is operative to enable the multiplier carriage 472 to escape to the left one ordinal space, so as to bring the next order of the pin box into alignment with the noses 481 to 485 and 489 to 487 of the operating levers (it being understood that the entry of values into the multiplier mechanism occurs from left to right beginning with the leftmost, or highest, order). The carriage 472 is strongly and resiliently biased toward the left by means of a two-armed lever 550 pivotally mounted on the base plate 56 by any suitable means, such as screw stud 551 (Figs. 7 and 10). A relatively strong spring (not shown herein but shown and described in the multiplier Patents Nos. 2,371,752 and 2,399,917 heretofore mentioned) tensioned between the front end of the lever 550 and the right side of the machine provides the motive force necessary for such biasing. This lever is provided on its rear end with an upstanding end portion, or bracket member, 553, the bifurcated upper end of which embraces the right side frame 475 of the carriage 472.

The carriage is latched against leftward movement by an escapement mechanism shown particularly in Fig. 9. The multiplier carriage 472 is provided with a rack 554 (Figs. 7 and 8) at its forward and upper edge, the teeth of which are seen in cross-section in Fig. 9. Cooperating with the rack 554 are two escapement arms 560 and 561 are pivotally mounted on standitng brackets 564 and 565 formed on the lower frame plate 407 (see also Fig. 8)— the two arms being mounted on pins 562 and 563, respectively. The lower arms of the bellcranks 560 and 561 are connected by a tension spring 566 which resiliently biases each arm in an upward direction. The left-hand arm 560 (toward the right in Fig. 9) is provided on its free end with a nose 567, the outer edge of which normally engages one of the teeth of the rack 554. The right-hand arm 561 (to the left in Fig. 9) is provided with an ear 568 normally lying above the teeth of the rack 554, as shown, and spaced approximately half a tooth space from an adjacent tooth of the rack 554. The two bellcranks 560 and 561 are operated in unison by means which will next be described, but for the moment it should be noted that when the arms are in their raised position shown in Fig. 9, the outer edge of the nose 567 abuts one of the teeth of rack 554 and the ear 568 lies immediately above the adjacent tooth to the left. However, when the arms are depressed, the nose 567 of bellcrank 560 drops out of engagement with its tooth and simultaneously the ear 568 of bellcrank 561 drops down to catch the next tooth in approximately the half-step position. This permits a partial escape of the multiplier carriage 472 to the left on the downstroke of the value key. As the two bellcranks are permitted to rise to the position shown in Fig. 9 (by release of the key), the nose 567 will rise into the path of travel of the next tooth of the rack 554 prior to the release of the tooth to the left by ear 568. By this means the carriage is permitted to take one full ordinal step of movement to the left with each value inserted into the keyboard.

The means for operating the bellcranks 560 and 561 to enable the step-by-step escapement of the multiplier carriage to the left includes a shaft 580 rotatably mounted in bearing brackets 581 formed on the right side of lower plate 407 (see also Fig. 8). The forward end of the shaft carries an arm 582 rigidly mounted thereon, the left-hand, or free, end of which arm underlies the operating bar 540. This arm 582 also underlies the shoulder 420 formed on the "0" key stem 410, whereby the depression of the "0" key 401 is also operative to rock arm 582 and shaft 580. The rear end of the shaft 580 carries an arm 583, as shown in Figs. 8 and 9, which arm is immediately adjacent the bellcrank 561. This arm is provided with a pin 584 which is embraced within the horizontal portion of an L-shaped slot 585 formed in the bellcrank 561. Thus, the rocking of shaft 580 and arm 583 will rock the bellcrank 561 downwardly (clockwise from the position shown in Fig. 9). The free end of the bellcrank 561 is provided with a shoulder 586 which overlies a pin 587 carried by the free end of the arm of bellcrank 560. Thus, the rocking of the bellcrank 561 simultaneously rocks the bellcrank 560 to permit operation of the two portions of the escapement mechanism.

It can be noted that in the preferred form of construction, the pin 587 extends forwardly to also underlie the rearward arm 541 carried by shaft 542 and supporting the operating bar 540. It can also be noted that, in my preferred form of mechanism, the bar 540 extends rearwardly through the rear arm 541 to enter the vertical portion of the L-slot 585. By this means, the tension of spring 566 not only holds the two bellcranks 560 and 561 in their raised positions, but it also holds the operating bar 540 in its elevated, or inoperative, position. The depression of any value key 400 will operate through the medium of the operating bar 540 directly, as well as through arm 582, shaft 580 and arm 583 to rock the escapement bellcranks 560 and 561 to enable a single step of the carriage to the left. The depression of the "0" key 401 operates only through the shaft 580 and arm 583 to operate the escapement mechanism.

It is obvious from what has preceded that the depression of one of the value keys 400 is effective to set one of the selection pins 481 to 485 or 489 to 487; to release the "0" latch 520; and to operate the escapement mechanism just described. The depression of the "0" key 401, on the other hand, operates the escapement mechanism just described, but does not release the "0" latch 520, so the segment 500 of the setting order remains in its "0" position. The operation of the "6" value key rocks shaft 540 about its pivot bar 542 and thereby operates the escapement mechanism and the "0" latch lever 535 and latch 530—but does not set a value pin, for the "6" position of the segment is the extreme position in which it is stopped by a tie rod 570 which doubles as a stop bar.

It should be noted that the nose 567 of the escapement arm has a sloping cam face on its left flank (right side in Fig. 9), so that the carriage can be returned to the right without operating the escapement mechanism when the carriage is moved to the right (by means of the "Multiplier Carriage Shifting Means" described under that heading). The engagement of a tooth 554 with the cam face rocks the arm 560 out of the way, but otherwise has no effect on the escapement mechanism.

16. Segment feed mechanism

It will be recalled that the segments 500 are released by depression of the various value keys 400, and assume an angular position (counter-clockwise from the position shown in Fig. 10) representative of the value of the key depressed. The multiplying operation in the conventional machines is controlled by the differential positioning of these segments, as fully described in the patents to Friden Nos. 2,371,752 and 2,399,917, previously mentioned. This is the mechanism with which my invention is associated, although I control the repeated cycling of the machine from this angular position of the segment in a new and different manner. The preferred means of accomplishing this purpose is to provide the segments 500 with a series of teeth 506 on the rearward peripheral edge thereof. It can be noted that in the form used in the patents above-mentioned, ten teeth were necessary (one tooth for each value and an extra tooth for a check pawl), but that in my form eleven teeth are required (one for each digital value, and the extra one for the check pawl, and an additional tooth to add the extra cycle of operation required when changing from operation in the reverse direction in the adjacent lower order to operation in the selected direction in the operative order). A feed means is provided which feeds the segment 500 back a single step for each machine cycle. A control means (the shift control lever 880) is also provided, which, when the segment returns to its original position, disables the segment feed pawl and initiates operation of a single shift of the carriage 60 to the right.

The segment feeding means preferably utilized with my invention, is the same as that shown in the two patents just mentioned. In this form, it comprises a feed pawl 630 (see Fig. 10) which is pivotally mounted on an arm 631 by any suitable means, such as pin 632. The feed pawl lies in the plane of the lowest order shown in the multiplier window 405 (Fig. 1), and is therefore one order to the left of the highest order of the multiplier carriage when it is in its home position. The feed pawl, therefore, cooperates with the segment of the lowest order in which a value has been inserted. The rear end of the arm 631 is pivotally mounted on a stud, not shown, carried by the frame; and the front end is reciprocated by means of an eccentric crank 633 (see Figs. 4 and 10) mounted on an eccentric 634 affixed to the drive shaft 122, the eccentric crank and arm 631 being connected by a suitable pin 635. Thus, the arm 631 oscillates with each cycle of machine operation. The pawl 630 is resiliently biased forwardly into engagement with the teeth 506 of segment 500 by means of a suitable spring 636 tensioned between the pin 635 and an ear 637 integral with the pawl 630—the ear also forming a stop to prevent overtravel of the pawl 630 as it is rocked by the force of spring 636. In multiplying operations, the pawl 630 is permitted to engage the teeth 506 of segment 500, thereby feeding the segment (clockwise in Fig. 10) a single tooth space for each cycle of machine operation.

However, in other operations the pawl 630 is rocked away from the segment by means of a disabling arm 640 which is rigidly secured to a short shaft 641 extending between, and journalled in bearings in, the left-hand control plate 57 and intermediate plate 67 (see Figs. 4 and 22). Normally, the shaft 641 and consequently the arm 640, are rocked to the position shown in Fig. 10, but are rocked to enable engagement of the pawl 630 with a segment 500 upon the initiation of the multiplication operation. The shaft is returned to the position shown in this figure at the end of each order of a multiplication operation, when the operative segment 500 returns to the "0," or home, position shown, by a means which will be later described. Thereupon, the feed pawl 630 is held out of engagement with the segment for the cycle required for an ordinal shift of the carriages to the next ordinal position. After such a shifting cycle, the shaft 641 is permitted to return to its operative position and the pawl 630 can again engage the segment 500 in its plane of operation—which is the segment to the left of the one previously returned to its "0" position.

It should also be noted that the arm 640 carries an ear 642 which not only is effective to control feed pawl 630, but also operates as a check pawl, the ear 642 engaging the teeth 506, to hold the segments 500 in the position to which they are moved by the feed pawl 630. By means of the operation of feed pawl 630 and check pawl 640, and the cooperation between them, the segments 500 are returned step-by-step to their full-cycle position.

The return of a segment 500 to its full-cycle position causes the upper and rearward end 508 thereof to engage either the ear 618 on the forward end of the interponent 613 or to engage directly the ear 886 carried on the forward end of a shift control lever 880. The rocking of the shift control arm 880 is effective, by means which will be fully described hereafter, to return the computation control shaft 137 and gate 135 to their inoperative, or neutral, position in order to permit a shift of the register and multiplier carriages to the next ordinal position; to rock the shaft 641 to disable the feed pawl 630; to enable the right shift clutch and thereby initiate a single shift of the register carriage 60 to the right; and to enable a mechanism for feeding the multiplier carriage 472 a single step to the right. The multiplier carriage shifting means will now be described.

17. Multiplier carriage shifting mechanism

It is conventional, in machines of the class described, to provide means for shifting the multiplier carriage 472 an ordinal step to the right at the termination of each series of ordinal operations. In the preferred form of my invention, I utilize the carriage shifting mechanisms shown in the patents to Friden Nos. 2,371,752 and 2,399,917, previously mentioned. Briefly, this mechanism comprises a rack 650 with ordinally spaced teeth (see Fig. 4) mounted on the lower and rearward side of the carriage 472 (see Fig. 10), and a shift pawl 651 which is rendered operative at the termination of each series of ordinal operations. It will be noted in Fig. 9 that the nose 567 on the free end of the escapement arm 560 has a sloping cam face on its left flank (to the right when viewed from the rear, as in Fig. 9), so that as the carriage 472 and its escapement rack 554 are moved to the right (to the left in this figure) the arm 560 is cammed downwardly to permit such movement. The shift pawl 651 has a single feed tooth 652 adapted to cooperate with the rack 650, but normally the tooth lies in a plane below the rack, as shown in Fig. 10. This pawl 651 is slidably pivoted on a long pin 653 affixed to a bracket 654 extending upwardly from the base plate 56. The forward end of the pawl 651 is formed as a closed cam follower which embraces an eccentric, not shown, formed on the collar 655. The collar is slidably but nonrotatably mounted on a shaft 656, the lower end of which is journalled in the bracket 654 and the upper end of which is journalled in a second bracket 657 (Figs. 4 and 25). The shaft 656 carries a miter gear 658 (see Fig. 25) at its upper end which meshes with a similar miter gear 659 rigidly secured to the main drive shaft 122. Thus, the shaft 656 rotates in synchronism with the main drive shaft 122, with consequent rotation of the hub 655 and idle oscillation of the pawl 651. Means is provided, however, for shifting the hub 655 upwardly on the shaft 656, whereby the tooth 652 of the pawl will lie in the plane of the rack 650. This shifting is preferably secured by means of a shaft 920 (Figs. 4 and 22) on which is secured, in a plane adjacent the hub 655, an arm 955. The arm 955 is provided with a pin 956 (see also Fig. 10) which engages an annular groove 666 formed in the hub 655. Thus, the rocking of the shaft 920, which is also controlled by the rocking of the shift control arm 880, previously mentioned, is effective to lift the collar, or hub, 655 and pawl 651 into operative position. In this position the tooth will engage the rack 650 and shift the carriage a single step to the right to return it toward its home, or inoperative, position.

18. *Multiplier control keys*

The computation control gate 135, in multiplication operations, is power set by the machine at the proper time. It should be noted that this power setting mechanism, along with other parts of the multiplier mechanism, such as the segment feeding pawl 630 (Figs. 10 and 22), is normally inoperative, even upon depression of a multiplier control key. In the preferred form of the machine, the depression of the control keys 402, 403 or 404, initiates a program including the shifting of the carriage 60 to the extreme left-hand position shown in Fig. 1, followed by the automatic tripping of the multiplication mechanism—so that all multiplication operations are initiated in this extreme carriage position. The operation of the multiplier mechanism, which includes the gate setting lever 750 (Fig. 17) and the segment feed pawl 630, is initiated by the operation of the override pawl 260 (Fig. 5), which occurs during the clearing cycle after the carriage 60 has reached the extreme left-hand position. The rocking of the override pawl and the consequent operation of bail 270 (Fig. 4) have been explained previously. The operation of bail 270 following depression of a multiplier control key, will be effective to trip, or trigger, the multiplication mechanism, as will be described shortly. It is important to note that the operation of a multiplier control key does not directly operate the multiplication mechanism, it only conditions it for operation by the override pawl.

In a multiplication operation, the multiplicand is first set in the main keyboard value keys 80. The operation of these keys sets the selection gears 110 in a differential position to be operated by the actuators 120, whereupon the square, or selection, shaft 112 is given an angular increment of rotation in each cycle of machine operation, depending upon the setting of the keyboard keys 80. Whether this rotation of the square shaft 112 is carried into the accumulator dial 62 depends upon the setting of the digitation control gate 135, which, in turn, depends upon the angular position of the control shaft 137. In multiplication operations, the position of the digitation control shaft 137 is controlled by the multiplier programming mechanism which will shortly be described in detail.

Following the setting of the multiplicand value into the keyboard keys 80, the multiplier value is set into the multiplier value keys 400. These keys are depressed beginning with the highest order value of the multiplier, and are effective to set the multiplier value pins and the related control segments, as previously described. With each operation of a multiplier value key 400, the multiplier carriage 472 is stepped one order to the left through the escapement mechanism heretofore described. Following the insertion of the multiplier value into the multiplier keyboard keys 400, the operator depresses one of the multiplier control keys 402, 403 or 404, depending upon the type of operation desired. If a single product is desired, the operator will depress the multiply key 402. This key initiates a preliminary programming of of the machine to shift the accumulator carriage 60 to its extreme left-hand position and thereupon clear, or zeroize, the accumulator and counter registers by means of the power clearing mechanism heretofore described. if, on the other hand, the operator desires to accumulate products, then the accumulate multiply key 403 is depressed. This key initiates the same preliminary program, with the exception that the power clearing mechanism is disabled. If the operator desires to subtract one product from another, then the negative multiply key 404 is depressed. This key conditions the mechanism for controlling the operation of the digitation control shaft 137 and gate 135 for operation in a subtractive direction, rather than positive, and likewise disables the clearing mechanism in the same manner as that controlled by key 403.

In the preferred embodiment of the present invention, the multiplier mechanism is resiliently biased into a positive, or additive, direction so that both the multiply key 402 and the accumulate multiply key 403 merely initiate machine operation through the shaft and clear programming mechanism previously described and release one of the conventional latches which controls a multiplication operation—there being two conventional latches: the first operated by key depression and the second by the override pawl. The accumulate multiply key also sets a member to disable operation of the clearing mechanism. The negative multiply key 404 likewise releases the first of the multiplier control latches and initiates operation of the preliminary program mechanism, and likewise disables the clearing mechanism; and also sets a mechanism to rock the digitation control shaft in the reverse direction.

These three keys 402, 403 and 404, are latched in an operative position by a latch arrangement which is released by the return of the multiplier carriage 472 to its restoring position, one order to the right of its normal, disabled position. It is seen in Fig. 12 that the forward edge of the key stem 402, which is biased to a raised position by means of a suitable spring, such as 670, carries a forwardly extending projection 671. A latch arm 672 cooperates with the key stem 402, the arm having an ear 673 which is adapted to engage the upper edge of the projection 671, thereby latching the key in its retracted position. The latching arm 672 is rigidly secured to a short shaft 674 which is journalled in, and extends between, the left side control plate 57 and the intermediate plate 59 (see Figs. 12 and 16). The shaft 674, as shown in Fig. 16, carries a second latch lever 675 immediately to the right of the left side control plate 57. The second latch lever is provided with an ear 676 which is adapted to engage projections 677 which extend forwardly from the key stems of keys 403 and 404. The shaft 674 and the two latching arms 672 and 675 are biased to a latching position by a suitable spring 678 tensioned between a seat in the lower arm of the lever 675 and a stud on the intermediate plate 57, as shown in Fig. 16. The lower arm of the lever 675 extends downwardly to adjacent the base plate 56 (see also Fig. 7) where it engages the rear edge of the left end of a bellcrank extension 552 formed on the escapement lever 550 which is connected to the multiplier carriage 472 and biases it to the left. In the normal position of the parts, the arm 552 just engages the forward edge of the lever 675, so that the return of the carriage to its extreme position, one order to the right of its home position, causes its arm to engage the lower end of the lever 675 and rock it (counter-clockwise in Fig. 16 or clockwise in Fig. 7) to release whichever multiply key had been depressed. Thus, in the present instance, the key 402 is latched in its operative position by the latch arm 672 or the keys 403 or 404 are latched by lever 675, the operative key being held latched until the last cycle of the multiplication operation in which the carriage is shifted one order to the right of its home position in order to restore the multiplier mechanisms.

The actual multiplication program is initiated by the tripping of a multiplier control trigger, or lever, 690 mounted on the left side control plate 57 (see Fig. 17). The trigger is held in its inoperative position by means of two latches 634 and 1020—the first operated by the control keys and the second by the override pawl 260. Hence one of the operations performed by the control keys is to release the trigger 690 from any control by latch 684, and this operation will now be described.

For the moment it should be noted that this trigger is spring-biased to an operative position, clockwise of that shown in Fig. 17, and is latched in its inactive position by means of the two latches mentioned. It is seen in Fig. 12 that the key stem 402 is provided with a pin 679 riveted thereon, or otherwise rigidly secured thereto. This pin engages the upper edge of an arm 680 which is rigidly mounted on a shaft 681 which is journalled in, and extends between, the left side control plate 57 and the intermediate plate 59. Thus, one effect of the depression of the key 402 is to rock the shaft 681 (clockwise in Fig. 12 or counter-clockwise in Fig. 17). The left end of the shaft 681 carries a U-shaped lever 682 keyed thereto, or otherwise rigidly mounted thereon. The lower arm of this lever is provided with a pin 683 which overlies the upper edge of the horizontal arm of a bellcrank latch member 684. This latch member is mounted at its elbow upon the left side control plate 57, as by means of screw stud 685. The vertical arm of the bellcrank engages an ear 692 formed on the forward end of the trigger 690. This trigger, which is pivoted upon screw stud 691 affixed to the left side control plate, is strongly biased to an operative position (clockwise from the position shown in this figure) and is latched in the inoperative position shown by two latches, one of which is the bellcrank 684. It is obvious that the depression of the key 402, operating through arm 680, shaft 681, and lever 682 (all three of which rock counter-clockwise in Fig. 17 from depression of the key) is effective to move the latch 684 to its releasing position. The latch is held in the releasing position throughout the multiplication operation, as the key 402 is latched in its depressed position by the latch mechanism just described.

The multiplier control keys 403 and 404 are also effective to move latch 682 to its releasing position. It is seen in Fig. 17 that the accumulate multiply key 403 carries, on the lower end of its stem, a stud 700 embraced within a slot 701 formed in the forward end of a control lever 702. This lever is pivotally mounted on a screw stud 703 at the upper rear portion of the machine. Similarly, the negative multiply key 404 is provided with a stud 704 that is encompassed by a second slot 705 formed in the forward end of the lever 702. The lower edge of the lever 702 engages a pin 686 carried by the upper arm of the U-shaped lever 682. Hence, the depression of either key 403 or 404 rocks lever 702, and it, in turn, rocks the U-shaped lever to release latch 684. It can be mentioned here that the pin 704 of the negative multiply key stem also overlies the forward end of the negative multiply lever 706, which lies immediately adjacent the lever 702 and which likewise is pivoted on stud 703. It can be mentioned at this point, also, that the rocking of the lever 702, by either key 403 or 404, will be effective to initiate machine operation and to disable the register clearing mechanism.

19. *Preliminary shifting and clearing controls*

The preliminary steps of shifting the carriage 60 to the extreme left-hand position and the clearing of the register in conventional multiplication (initiated by depression of key 402) will now be described. This mechanism utilizes the programming mechanism shown in Fig. 6 and previously described. It is seen by reference to Fig. 12 that the multiplier key 402 carries a roller 660 on its lower end. This roller engages a slot 661 in an angular lever 662 which is pivotally mounted on the frame plate 59 by any suitable means, such as stud 663. The arm 662 is provided with a projection upon which is mounted a roller 664, which roller engages the forward edge of arm 665 rigidly secured to the control shaft 290. Thus the depression of the key 402 rocks the arm 662 (counter-clockwise in Fig. 12), to rock arm 665 and shaft 290 (clockwise in Figs. 12 and 6). The rocking of the shaft 290, as previously explained in connection with Fig. 6, causes the engagement of the clutch, the operation of the motor, and, under the power thereby provided, causes the engagement of the left shift and clearing clutches. Thereupon the carriage is shifted to its extreme left-hand position and the registers are cleared.

The depression of the keys 403 and 404 are effective to initiate machine operation and to program it for the leftward shift of the carriage while disabling the clearing mechanism—key 403 causing additive operation of the machine while key 404 causes subtractive operation to provide the complement of the true product. Both keys are effective to rock shaft 290 and thus initiate a shifting operation, and also are effective to disable the clearing clutch so as to prevent erasure of values standing in the accumulator, as will be described in connection with Fig. 17. It is obvious that operation of either key 403 or 404 is effective to rock the arm 702. Lever 702, which is biased to its raised position by a spring 709, has a downwardly extending projection 707, the lower end of which overlies a pin 715 carried by the rearwardly extending end of an arm 716. The arm 716 is keyed to, or otherwise rigidly mounted on, the extreme left-hand end of shaft 290. The depression of either of these control keys, therefore, will be effective, through the rocking of arm 702 to rock shaft 290 and thereby initiate the operation of the power-operated mechanism described in connection with Fig. 6 to provide for an initial shift of the carriage 60 to its extreme right-hand position.

The operation of either of these two keys is also effective to disable the clearing mechanism, as just mentioned. It will be realized that negative multiplication is ordinarily desired only when the operator is subtracting one product from some value previously accumulated in the product register 62. Similarly, the accumulate multiply key 403 is used to add one product to another, so that this key would not be used unless one desired to eliminate the clearing of the register. This operation of blocking, or disabling, the operation of the clear mechanism is readily secured by the rocking of the initiating lever 702, as is conventional in the machine with which my invention is preferably associated. A flat-headed stud 708 is riveted on, or otherwise rigidly secured to, the arm 702 at an intermediate point. This stud 708 is embraced within a slot, or bifurcation, 720 in the upper end of a connecting link 721. The link 721 is pivotally mounted on an arm 722 by any suitable means, such as pin 723. The link is held in a retracted position with respect to lever 702 by any suitable means, such as spring 725 tensioned between the arm 722 and a stud, or spring seat, on the projection 707 of lever 702.

The arm 722 is rigidly secured to a short shaft 724 which extends from the control plate 57 (as shown in Fig. 17) to the intermediate plate 59 (as shown in Fig. 12). The right end of the shaft carries an arm 730 rigidly secured thereto. The arm 730 is provided with a stud 731 which engages the forward edge of a bellcrank 732 pivotally mounted on the shaft 215. The bellcrank 732 is provided with an ear 733 (see also Fig. 4) which underlies the clear clutch pusher link 213. Thus, the rocking of the arm 702 rocks shaft 724 and arm 730 (clockwise in Fig. 12), and pin 731 rocks bellcrank 732 (counter-clockwise), which, in turn, rocks the pusher link 213 (counter-clockwise) away from engagement with the clutch control rod 211. Thus, the subsequent rocking of shaft 215 by the power-operated control mechanism previously described, will not effect a clearing operation. It will be recalled that the clearing operation occurs only when the carriage is in the extreme left-hand position, so there is no danger of a simultaneous operation of the clearing and the shifting mechanisms.

It will be recalled that the trigger mechanism by means of which the multiplication is initiated, that is, the control arm 690 shown in Fig. 17, is latched in its inoperative position by the two latches 684 and 1023, the first of which was released by the depression of one of the three keys themselves. The second latch 1020 is released by operation of the override pawl upon attempted overshifting of the carriage 60, as previously described. The second latch comprises an arm 1020 (Fig. 17) rigidly mounted on the left end of a shaft 1021.

The latch arm 1020 is rocked upwardly (clockwise in Fig. 17) by means of a spring 1023 tensioned between a stud on the control plate 57 and a stud on the rear end of the arm, as shown. The latch arm 1020 is provided with an upwardly extending notch 1024, which normally engages the roller stud 693 mounted on the forward end of the trigger, or control lever 690. When the arm 1020 is in its normal position, the stud 693 engages the shoulder, or notch, 1024 on the upper end of arm 1020, and the trigger 690 is latched in its inoperative position. If the latch 684 has been rocked to its unlatching position (by one of the control keys), then the rocking of shaft 1021 (by operation of the override pawl) causes the notch 1024 to move away from stud 693 and the trigger 690 is enabled to drop to its operative position.

The shaft 1021 extends from the left auxiliary, or control, plate 57 to an intermediate plate 59 (see Fig. 12), and, at its right end, carries an arm 1022 rigidly secured thereto. The upper end of the arm 1022 (Fig. 12) has pivotally mounted thereon, as by means of pin 1025, a rearwardly extending link 1026. This link is resiliently biased (clockwise in Fig. 12) to an engaging position by means of a spring 1027 tensioned between a projection on the link 1022 and a disabling bellcrank 1035. The bellcrank is rotatably mounted on the transverse shaft 215 and its rearward end underlies a pin 1037 riveted on the pusher link 213 that controls the operation of the shift clutch rod 211. This bellcrank 1035 carries, on the lower end of its vertical arm, a pin 1036 which engages a notch 1028 in the link 1026. The left end 274 of the bail 270 (which is operated from the override pawl 260 through the medium of lever 266, bellcrank 268, and link 269, as previously mentioned), underlies the rear end of the disabling bellcrank 1035 as well as bellcrank 732 and link 213. Therefore the operation of the override pawl, among other things, lifts the rear end of this lever at the same time it lifts link 213 to disable the clear clutch. Such rocking of bellcrank 1035 pulls the link 1026 rearwardly. This movement of the link 1026 rocks the arm 1022 and shaft 1021 to which it is affixed (clockwise in Fig. 12 and counter-clockwise in Fig. 17), whereupon the latching arm 1020 is rocked away from its engagement with the stud 693 mounted on the trigger arm 690. Thereupon the trigger 690 is permitted to rock from the force of a strong spring, if the first latch 684 has also been moved to its releasing position.

It will be noted that the latch arm 1020 will be operated upon any attempted shifting of the carriage 60 to the left beyond its extreme terminal position. However, such rocking of the latch 1020 will not be effective unless one of the multiplier keys 402, 403 or 404 have been depressed to release the latch 684. Likewise, release of latch 684 by depression of any of the multiplier control keys, will not release the trigger, or control arm 690, until the override pawl has been operated. By this means the operation of the multiplication mechanism is programmed to follow the shifting and clearing operations. The operation of the multiplier mechanism is initiated by the releasing of trigger 690 by the latch 1020—the rocking of the arm being effective to:

(1) Enable the operation of the segment feed pawl 630; and (2) enable the multiplier control mechanism, which involves the engagement of two program control clutches of the type disclosed in my copending application, S.N. 401,780 mentioned before. The clutches control the sequential operation of the return of the multiplier segments to their shift initiating position while entering the keyboard value into the register in the proper sign character direction and the shifting of the carriage between successive orders of operation. These two operations initiated by the release of trigger 690 will now be described.

(1) *Enable segment feed pawl*

It will be recalled that the segment feed pawl 630 (see particularly Fig. 10) is resiliently biased into engagement with the aligned segment, but normally is held in a disengaged position by means of arm 640 mounted on the transverse shaft 641. This shaft extends through the left control plate 57 (as shown in Fig. 17) and carries an arm 945 rigidly secured to its left end. This arm is biased upwardly (clockwise in Fig. 17) by means of a spring 949 tensioned between a stud on the frame plate and a pin 948 on the outer end of the arm (which biases the shaft 641 and its inner control arm 640 into the operative position in which it releases feed pawl 630 for engagement with the aligned segment 500—clockwise in Fig. 10). Normally, the arm 945 is held in its lowered, or inoperative, position by means of a link 946, the lower end of which is pivotally mounted on a pin 694 that connects the initiating arm, or trigger, 690 with a power arm 838. This link is provided, at its upper end, with a slot 947 that embraces the pin 948. Thus, the latching of the trigger 690 in its inoperative position, by means of link 946, holds the arm 945, shaft 641 and arm 640 in their inoperative positions against the bias of spring 949. However, when the trigger is released and link 946 is premitted to rise, then the arms 945 and 640 rock forwardly (clockwise in Figs. 17 and 10) to enable the feed pawl 630. The link 946 remains in its raised position throughout the multiplication operation, but the feed pawl 630 must be disabled at the end of each ordinal series of operations, so there must be a yield, or lost motion connection, between the link 946 and the check pawl 640. Such a yield is provided by the slot 947 which connects link 946 to arm 945.

(2) *Enable multiplier control mechanism*

The operation of the gate setting mechanism, including the sequential operation of the computation control gate 135, the multiplier feed pawl 649, the carriage shift mechanism, including clutch 231, and multiplier carriage shift pawl 651, are under the control of a programming mechanism shown particularly in Figs. 18 to 22. It should be noted at this point, that this mechanism, which includes the sequentially operated clutches of my copending application S.N. 401,780, previously mentioned, likewise controls the operation of the other elements of the multiplier program mechanism, which include means operated when an operative segment returns to a "0" position for disabling the feed pawl and initiating a shift of the accumulator carriage 60 and the multiplier carriage 472. These mechanisms are under the control of a number of cams, all of which are rotatably mounted on the main drive shaft 122 and which are severally controlled by a pair of two-stage clutches, as will now be described.

The first of these two-stage clutches, indicated generally at 820, is mounted on the left end of the main drive shaft 122 adjacent the left side control plate 57, as shown in Fig. 22, the clutch being shown in phantom in Fig. 21. This clutch comprises a driving ratchet 821 pinned to, or otherwise rigidly secured on, the main drive shaft 122. The driving ratchet has two driving notches, or teeth, 822 and 823 operatively spaced approximately 90° apart. The driven member of the clutch comprises a plate 824 upon which is pivotally mounted an engaging lever 825 having a single tooth 826 adapted to engage either of the notches 822 or 823 and which is resiliently biased into engagement with the ratchet 821 by a suitable spring 827. The plate, or disk, 824 is rotatably mounted on the drive shaft and is normally held against rotating therewith by the engagement of an ear 828, on the engaging lever 825 with a nose 836 extending forwardly (to the left in Fig. 21) on a clutch control lever 835. This clutch control lever 835 is rocked rearwardly to its clutch-releasing position upon the operation of the override mechanism in a multiplication operation. For the moment it can be noted that angular rotation of the driven plate 824, is determined by the engagement or disengagement of the tooth 826 of lever 825 with one or the other of the notches 822 or 823 in the ratchet 821, and that such engagement or disengagement is controlled from the angular position of the clutch control arm 835. Normally the nose 836 on arm 835 serves to maintain the lever 825 disengaged from the two-tooth ratchet, although the clutch may be held in a disengaged position by other means which will shortly be described. The arm 835 is moved to its unblocking, or clutch-engaging, position by the rocking of the multiplication trigger 690, previously mentioned (see Fig. 17). It can be seen from Fig. 21 that the rocking of the arm 835 rearwardly to its operative position (clockwise in this figure) causes the nose 836 to release the ear 828, whereupon the lever 825 can move under the bias of its spring 827 so that the tooth 826 will engage the ratchet tooth 823 and thereby provide for the driving of the clutch 820 and the mechanisms controlled thereby.

The clutch control lever 835 preferably is rigidly mounted on a short shaft 837 extending from the left side control plate 57 to the intermediate bracket 67 (although the latter mounting is not shown in the figures). A bellcrank member 838 (see Fig. 17) is also rigidly mounted on the shaft 837, on the outside of the control plate 57, as shown in this figure. While both the arm 835 and the bellcrank 838 are rigidly mounted on the shaft 837, it is preferred that the two be connected by a bail member 839, which, as shown in Fig. 17, is formed integral with the bellcrank 838, but riveted to the arm 835, as this assembly is subject to considerable stress. The forward end of the horizontal arm of the bellcrank 838 is provided with a slot 840 which embraces the pin 694 riveted to, or otherwise rigidly mounted on, the rear end of the trigger 690. A relatively strong spring 841 tensioned between a stud on the arm 835 and the transverse bar 760, strongly biases the arm to the rear (clockwise in Fig. 21 and counter-clockwise in Fig. 17) with sufficient force to rock the arm 835 to its operative, or clutch-engaging, position and simultaneously rock trigger 690 (clockwise in Fig. 17) as well as other mechanisms controlled thereby.

It can be noted at this point that the trigger 690, and therefore arm 835, are operatively rocked in the first 180° of the overstroke cycle following the return of the carriage to its extreme left-hand position, thereby releasing the clutch pawl 825 to the urgency of its spring 827 at about the midpoint of this overstroke cycle. However, the clutch is not engaged until approximately the 240° point of the overstroke cycle, at which point the tooth 826 is enabled to engage the leading notch 823 to connect the ratchet to the driven plate 824 and impart rotation to the latter. This clutch then remains in engagement for approximately 270° of rotation, i.e., the remaining 120° of the overstroke cycle and the first 150° of the first machine cycle of the multiplication operation proper. Following this 270° of rotation, the clutch is disengaged by means which will now be described.

A bellcrank 850 is pivotally mounted on a stud 851 secured to the inner side of the control plate 57. This bellcrank has a horizontally disposed arm with a nose 852 lying in the plane of the nose 836 and ear 828 on the clutch pawl 825. The nose 852 is normally maintained out of engagement with the peripheral surface of the clutch disk 824 by its depending arm, which abuts against a pin, or stud, 842 carried by the arm 835. A light spring 853 tensioned between a seat in the depending arm of the bellcrank and an ear 843 on the upper end of the arm 835, resiliently biases the bellcrank 850 to its blocking position (counter-clockwise in Fig. 21), when the arm 835 is moved to clutch-releasing position. Thus, it can be seen that the rocking of the clutch control arm 835 to effect engagement of the clutch 820 also serves, through spring 853, to rotate the nose 852 into the path of travel of the ear 828 of clutch pawl 825. When the ear 828 engages the nose 852, the pawl 825 is forced out of engagement with the ratchet 821 so that the clutch 820 is disengaged at approximately the 150° position of the first cycle of the multiplying operation. Incidentally, it can be noted that the clutch remains in this position until the last cycle of the multiplying operation.

Means is provided for preventing backlash, or reverse rotation, of the clutch plate 824 in either disengaged position thereof. For this purpose, a detent wheel 855 (Figs. 21 and 22) is rigidly secured to the clutch plate 820 by any suitable means, not shown. This wheel is provided with two shoulders 858 and 859 angularly disposed in a periphery thereof for cooperative engagement with the end of a detent arm 856, likewise mounted on the stud 851. The detent arm 856 is shaped as a bellcrank and is biased into engagement with the detent wheel 855 by a suitable spring 857 tensioned between the other arm of the detent 856 and a stud on the control plate 57. The arm 856 normally rides on the periphery of the detent wheel 855, under the urgency of its spring 857, and in each disengaged position of the clutch 820 moves into engagement with the respectively positioned shoulders 858 or 859 on the detent wheel 855.

The second program clutch 870 lies immediately to the right of the first one. The face of the clutch is shown in Fig. 20, the clutch being similar in construction to clutch 820, previously mentioned. The clutch comprises a ratchet member 871, in which are formed two diametrically opposed notches, or teeth, 872 and 873 adapted to engage a single tooth 874 formed on the inner edge of the clutch pawl 875. The clutch pawl 875 is pivotally mounted on a pin, not shown in Fig. 20, carried by the driven plate 876. The pawl 875 is biased into engagement with the notches 872 or 873 of ratchet 871 by a suitable spring 877, but is normally held away from such engagement by the engagement of an ear 878 thereon with a nose, or shoulder, 881 of a shift control lever 880. The operation of the shift control lever 880 is under the control of the multiplier segment 500 in the operative order, as will hereinafter be described, but preferably an interlock is provided which prevents the conditioning of this lever for operation so long as the first clutch control lever 875 is in its blocking, or clutch disengaging, position shown in Fig. 21. A very simple interlock can comprise a pin 882, riveted to, or otherwise rigidly secured on, the lower arm of the bellcrank 880, which pin, as shown in Fig. 21, abuts against the forward edge of the arm 835. Thus, while the arm 835 is held in its forward, or clutch-disengaging, position, the pin 882 prevents movement of the shift control bellcrank 880 to disengage its clutch 870. However, when the arm 835 is moved rearwardly, then the pin 882 and consequently the lower arm of the shift control bellcrank 880 is free to move, whereupon the shift control bellcrank 880 is operated solely by the multiplier segment 500 in the operative order of the machine.

The shift control lever 880 is formed as a bellcrank, as shown in Fig. 20, and is hinged at its elbow on a short shaft 883 rigidly mounted between the control plate 57 and the intermediate plate 67 (the latter mounting not being shown).

The lower arm 884 of the bellcrank, lies in a plane adjacent the clutch 870 and extends to a point somewhat below the ear 878, as shown. The horizontal arm 885 is formed (as indicated in Fig. 20), so that an ear 886 on the forward end thereof, lies a considerable distance to the right, in a plane aligned with the operative order (the plane of the feed pawl 630). This ear 886 therefore overlies the ear 618 of the interponent 613 or the upper nose 508 (not visible behind nose 594 in Fig. 20) of the multiplier segment 500 in the first order to the left of the home position of the carriage, which is the same thing as saying that it overlies these elements of the active, or operative, rack in any shifted position of the carriage. When the carriage is in its rightmost position, the ear 886 overlies the shoulder 594 of the interponent 613 associated with the partial segment 590, previously mentioned. As previously noted, this bellcrank 880 is held against rocking movement by its pin 882 engaging the forward edge of the arm 835 when that arm is in its normal, clutch-disengaging, position. Whenever the arm 835 has been rocked to initiate a multiplication operation, the shift control lever 880 is conditioned for operation by the disengagement of the pin 882 from arm 835 and, as will shortly be described, is controlled in its operation by the return of the segments 500 to their shift initiating positions to control the shifting phases of the multiplication operation.

It follows, from the previous description, that the shift control lever 880 is held against operation until approximately the first 180° or the midpoint, of the overstroke cycle, at which time the first clutch 820 is engaged by the rocking of arm 835. The rocking of the arm 835 resiliently biases the shift control bellcrank 880 to its shift controlling position, as by means of a spring 887 tensioned between a pin 888 on the arm 884 and the ear 843 of the lever 835. If a value other than "0" has been entered into the operative order of the multiplier carriage, or if the interponent 613 had been moved rearwardly by the entry of a value of "6" to "9" in the adjacent lower order of the multiplier carriage, then the shift control lever 880 is free to rock (clockwise in Fig. 20) under the force of the spring 887. However, if the value of the operative segment 500 stands at "0" and the interponent 613 is in its forward position shown, then the ear 886 will engage the ear 618 of the interponent, whereby the rocking of the shift control bellcrank 880 is prevented.

When the shift control lever 880 rocks, the shoulder 881 is removed from beneath the ear 878 of the clutch pawl 875, thereby enabling the clutch for rotation and conditioning the machine for digitation in that order. However, if a "0" stands in the operative order, or whenever the shift control lever 880 is rocked (counterclockwise) by the return of the operative segment 500 to its shift operating position, the clutch is either held disengaged, or is disengaged, as the case may be. In that situation, the machine is conditioned for a carriage shift. It will be seen from the above, that when the clutch is in the position shown in Fig. 20, the machine is conditioned for a shifting operation. It should be mentioned further, that the clutch is a two-position clutch determined by the two notches 872 and 873 in the ratchet wheel 871 and that the clutch will rotate to the 180° position and there be latched out until the shift control lever 880 is returned to its normal position shown.

To initiate a multiplication operation after a value has been set in the multiplier carriage 472, each of the clutch pawls 825 and 875 of the respective clutches 820 and 870 are released at approximately the midpoint of the overstroke, or resetting, cycle. At approximately the 240° position of this cycle, the pawl tooth 826 of clutch 820 engages the leading notch 823 of the associated ratchet wheel to impart rotation to the driven plate 824 and the cams attached thereto. After about 30° further rotation, that is, about 270° position of the overstroke cycle, the tooth 874 of pawl 875 (clutch 870) engages the leading notch 872 of the associated ratchet wheel 871 to drive the cams which are secured to the driven plate 876. The remaining 90° of the overstroke cycle is effective, through clutch 870 and cams attached thereto, to adjust the digitation control shaft 137 and gate 135 for positive or negative registration in the accumulator. Simultaneously, with the setting of the gate 135, and consequently the plus or minus gears 133 and 134, into operative position, the second clutch 870 is disengaged by means which will next be described, whereas the first clutch 820 is driven to approximately the 150° position of the next ensuing, or first multiplication, cycle in which it is stopped by nose 852 (Fig. 21) engaging ear 828 to cause disengagement of the clutch.

Following approximately 90° of rotation (which occurs in the last quarter of the overstroke cycle), clutch 870 is disengaged when the ear 878 of the clutch pawl 875 (Fig. 20) engages a nose, or shoulder, 895 formed on the forward end of a bellcrank 896 which is pivoted on a stud 897 riveted on, or otherwise firmly affixed to, control plate 57. The bellcrank 896 is also provided with an upright arm formed to lie immediately adjacent the lower end of the bellcrank 880. The bellcrank 880 is provided with a pin, or stud, 898 rigidly mounted thereon, which pin is adapted to engage the rearward edge of the bellcrank 896. The bellcrank 896 is resiliently biased into such engagement (counterclockwise in Fig. 20) by a spring 899 tensioned between a pin and one of the pins 782 upon which the setting plate 755 is mounted. It can thus be seen that, upon rocking of the bellcrank 880 to its clutch-engaging position (clockwise in Fig. 20), the spring 899 is enabled to rock the bellcrank 896 (counterclockwise), whereupon the shoulder 895 catches the ear 878 and disengages the clutch after 90° of rotation (at the full-cycle position of drive shaft 122 or the 90° position of the driven plate 875). Conversely, when the shift control bellcrank 880 is returned to its clutch-engaging position, through the engagement of its ear 886 by the operative segment 500, it rocks the bellcrank 896 to its disengaging position (clockwise in Fig. 20), whereupon the shoulder 895 releases the ear 878. When this happens, the pawl 875 engages its ratchet 871 and the clutch 870 can rotate to its full-cycle position (shown in Fig. 20), in which position it is stopped by the shoulder 881 of the shift control bellcrank engaging the ear 878. A rebound of the clutch 870 is prevented in either disengaged position of the clutch in a manner similar to that described in connection with clutch 820. This means is conventional and is shown in Fig. 24. Briefly, it comprises a detent wheel 900 having two shoulders adapted to drop behind the end of a detent arm 901 which is spring-urged into engagement with the periphery of the detent wheel.

20. Computation control mechanism

It has been mentioned that, in most of the commercial machines now available, automatic multiplication is repeated addition or subtraction. In the preferred form of machine illustrated in the multiplier patents above-mentioned, the computation controls are power-set in accordance with the multiplier control keys 402, 403, or 404 manipulated by the operator. In such machines, the power setting is effective to set the control for the full multiplying operation, it only being necessary to move the digitation control gate to neutral for the ordinal shifting cycles. In shortcut multiplication, however, it is necessary to set these controls for only one order at a time, for the machine may be operated in addition in one order, and subtraction in the next. In the preferred form of machine illustrated herein, I prefer to use the program controls of the type shown in my copending application, S.N. 401,780, filed January 4, 1954. These controls are shown primarily in Figs. 17 to 22, and will now be briefly described.

The multiplier mechanism, in the preferred form of the present invention, is normally biased to operation in a positive sign character direction, as when operation is initiated by depression of either multiplier key 402 or accumulate multiply key 403, and the multiplier value is "1" to "5." In the present invention, control means can be shifted for a negative registration, as when negative multiply key 404 is depressed, and the multiplier value is "5" or less, or if the other two keys are operated and the multiplier value is "6" to "9." It is also necessary to provide a third position which will also give additive operation of the digitation mechanism, which is required when the negative multiply key 404 is depressed and the multiplier value is from "6" to "9." In each case, the sign character of the complete multiplication operation is determined by the use of the multiplier control keys 402, 403, or 404. However, the direction of operation in each particular order is either in the selected direction or in the reverse direction, as determined by the setting of the multiplier segments 500, and particularly the intermediate arms 611 which assume one angular position when the multiplier value in the related order is "1" to "5," and another angular position when that value is "6" to "9," as previously described. It should be remembered, however, that neither of the additive multiply keys 402 or 403 affect any setting of the multiplier mechanism, for, as mentioned above, the machine is biased for additive operation, but can be reversed when required by the necessities of the problem as determined by the various ordinal multipler values, as well as by the negative multiply key 404.

The digitation setting mechanism for the multiplier is shown particularly in Figs. 17 and 19. It will be noted that the sign character control shaft 137 is provided on its left-hand end with a two-armed lever 750. The extremeties of the two arms are each provided with a pin 751 and 752, respectively. Associated with the lever 750 is a pair of setting links, 753 for additive operation and 754 for subtractive. Both of these links are pivotally mounted on a setting member, or plate, 755 to which they can be affixed by any suitable means, such as stud 756. The positive control arm is provided with an arcuate slot 757 extending transversely of the link 753, which slot is adapted to engage the pin 751 on the upper end of the two-armed lever 750 when the lever is in its neutral position. This arm 753 is biased to an inoperative position (counter-clockwise in Fig. 17) by a spring 758 tensioned between a seat in the rear end of the arm and a stud on the frame plate, as shown—the arm being held in the position shown by the abutment of a stop arm 759 engaging a transverse bar 760. Similarly, the subtractive control arm 754, which is provided with a downwardly and transversely extending projection 761, is provided at its outer end with an arcuate slot 762 and with a stop bracket 763, which likewise abuts against the bar 760. This arm is likewise biased to an inoperative position (the counter-clockwise position shown in Fig. 17) by a suitable spring 764 tensioned between a seat in the lower end of the arm, and a stud on the frame plate. It is thus obvious that the two control links 753 and 754, respectively, are normally biased to an inoperative position by their respective springs, but can be rocked against the force of these springs by mechanism to be described in the next paragraph. It can be noted, however, that when either of these arms are lifted, its slot 757 or 762, as the case may be, will engage the associated pin 751 or 752, respectively, whereupon the rocking of the lever 750 and the digitation control shaft 137 is under the control of the link.

The positioning of one or the other of the control interponents 753 or 754 is under the control of an operating member 780 which extends substantially vertically between the two interponents 753 and 754. This interponent, or operating member, is pivotally mounted at its lower end upon a stud 787 carried by a cam follower lever 781. The lever is pivotally mounted on a short transverse stud 782 that is mounted on the left-hand control plate 57, as shown in Fig. 18. The forward end of the cam follower 781 (the left-hand end in Fig. 18) carries a roller 783 which is adapted to engage the periphery of a cam 784 rotatably mounted on the drive shaft 122 and adapted to be clutched to the drive shaft by the second clutch 870, just described. The follower lever 781 is resiliently biased (clockwise in Fig. 18) by a spring 785 which holds the roller 783 against the periphery of the cam 784. In the full-cycle position of cam 784, the roller 783 lies in a depression on the periphery of the cam, in which position of the cam and follower the operating interponent, or member, 780 is in its lower, or inoperative, position. It will be noted that the follower arm 781 will be rocked (counter-clockwise in this figure) to its fully operated position after the start of a cycle of operation of clutch 870, and will be held in that position until the cam returns to its full-cycle position.

It has been mentioned that the operating interponent 780 is pivotally mounted on the rear end of the cam follower arm 781. This interponent extends substantially vertically to an elevation approximately even with the upper edges of the two control links 753 and 754 and is held in the position shown by a spring 790 (Fig. 19) tensioned between a stud 791 on the interponent and a stud 792 on a negative control arm 793. The control arm 793 is pivoted on the frame plate 67 by means of a suitable stud 794. The arm 793 is normally biased to the inactive position shown in Fig. 17 by means of a spring 795 tensioned between a stud on the arm and a seat in a bracket member, as shown. A link 796 is pivotally mounted on the stud 792, which also serves as a seat for the spring 790, extending rearwardly therefrom. This link is provided with a slot 797 which embraces the pin 791 on the operating interponent 780. By this construction, the operating interponent 780 is resiliently biased, by the spring 790, to the normal, or additive, position shown; and is prevented from overthrow beyond this position by the pin 791 abutting against the forward end of the slot 797. Rocking of the interponent 780 can be caused by either the depression of the negative multiplication key 404 or by the multiplication control, as will be described hereafter. It should be noted, however, that if the interponent is given one step, or angular increment of motion, it will move to the subtractive position, and if given two such steps, it will move to a second additive position.

The upper end of the operating interponent 780 is provided with three studs, as shown in Figs. 4, 17 and 19. The first and third of these studs 801 and 803 extend to the left, as shown in Fig. 4, while the second, or intermediate, stud 802, extends to the right. In the normal position of the parts, the first stud 801 lies below an ear 765 (Figs. 4 and 17) on the additive control link 753. When the negative control arm 793 is operated, or when the multiplier mechanism operates in a reverse direction for a value of "6" to "9," the operating interponent 780 is moved a single step rearwardly (counter-clockwise in Fig. 17 or clockwise in Fig. 19). In this position, the second stud 802 underlies an ear 766 formed on the subtractive link 754. If the arm 793 is given two increments of motion, then the operating interponent 780 is likewise given two increments of motion; and, in that position, the third stud 803 underlies the ear 765 of the additive link 753.

It will be recalled that the cam follower arm 781 is rocked (clockwise in Fig. 17 or counter-clockwise in Figs. 18 and 19), in the last quarter of the overstroke cycle, immediately after clutch 870 connects the cam 784 to the drive shaft 122. This clutching takes place at the end of this cycle of operation, so that prior to digitation in the first multiplication cycle the follower arm 781, and consequently the operating interponent 780, will be rocked to its operative position. The lifting of the interponent 780 will lift one or the other of the arms 753 or 754 into operative engagement with its respective pin 751 or 752 carried by the control lever 750, thereby placing the digitation control shaft 137 under the control of the proper link. Immediately thereafter, the setting plate 755 is shifted rearwardly, as will now be described; which shifting translates the link 753 and 754 rearwardly to rock the lever 750 to its additive or its subtractive position, depending upon which arm is in engagement with its associated pin.

It is seen in Fig. 19 that the setting plate 755 is mounted for longitudinal movement in the machine, as by the pin-and-slot connections, including slots 810 and a plurality of transverse rods, or shafts, such as 782. The forward end of the power actuator plate 755, has a hooked end 811, shaped as shown in Fig. 19 to encompass a cam 812. The plate 755, and projection 811 thereof, carry a pair of cam follower rollers 813 and 814 which lie substantially diametrically of the cam 812. The cam 812 is a complementary cam having a fixed diameter in any angular displacement of the cam, so that the rotation of the cam will move the power plate 755 rearwardly and forwardly. The cam 812 is secured to the second clutch 870 so that the two setting cams 784 and 812 rotate in unison—the first rocking the follower arm 781 and consequently operating interponent 780 to raise one or the other of the links 753 or 754 into operative engagement with their respective pins 751 or 752, and cam 812 then rocking the power plate 755 rearwardly to set the lever 750 and consequently digitation control shaft 137 in one of its operative positions.

It should be mentioned here that the clutch 870 to which both cams 784 and 812 are attached, is engaged at the end of each shifting cycle between the ordinal series of operation—so that cam 784 rocks cam follower 781 to lift the operating member 780 to its operative position, and thereafter cam 812 shifts setting plate 755 rearwardly to set lever 750 and control shaft 137 at the end of each ordinal shift. The clutch is then disengaged in the part-cycle position, so that both the cam follower 781 and setting plate 755 are held in their operative positions throughout the next ordinal series of operations. Finally, in the last cycle of each ordinal series, the multiplier segment 500 returns to its shift controlling position to operate shift control lever 880, which, among other things, re-engages the clutch to return both follower lever 781 and setting plate 755 to their inoperative positions shown, in preparation for a shift cycle.

Irrespective of the multiplier control key depressed, the multiplying operation proceeds in the same manner, once the mechanism is enabled by the overstroke of the shift mechanism upon return of the carriage to the left end position, in a manner substantially like that disclosed in my copending application S.N. 401,780, previously mentioned. However, there is this difference between operation therein described and that of the present invention: in the present case, the digitation control mechanism is enabled at the start of each ordinal series of operations, and disabled at the termination thereof, for the sign character of the registration depends, in part, upon whether value in the operative segment stands at a value of "5" or below, or "6" or above. It will be recalled that upon the overstroke, the multiplication trigger 690 (Fig. 17) is unlatched and is moved to its operative position by the force of spring 841 acting upon integral arms 838 and 835. Such movement of the control arm 835 and consequent rocking of shift control bellcrank 880 (see also Figs. 20 and 21) is effective to enable the engagement of the clutch 870 for positively conditioning the desired setting arm and consequently engaging drive gears 133 or 134 with the accumulator gears 131.

The active rack 500 (Fig. 20) is returned step-by-step towards its operating, or shift initiating, position (toward "0"), from the oscillation of the enabled feed pawl 630 (Figs. 10 and 22). During its last step of movement (to the "0" or "0 plus 1" position in the case of values of "1" to "5," or to the tens-complement position or "1" less than the tens-complement in the case of values "6" to "9") the operative segment engages the shift control bellcrank 880, rocking it to its effective position (counterclockwise to the position shown in Fig. 20 from the position which it assumes upon engagement of the clutch 870). Such rocking of the bellcrank 880 is effective to return the digitation control shaft 137 to its neutral position, thereby terminating registration in that order; and to initiate a shift of the accumulator carriage 60 and the multiplier carriage 472 a single order to the right, the movement of the multiplier carriage being effective to move the next higher order segment 500 into the active, or operative, position. The means by which these two operations are secured will now be described.

It will be obvious that the rocking of the shift control bellcrank 880, from its position clockwise of that shown in Fig. 20 to the position as shown in Fig. 20, will move the shoulder 881 into the path of travel of the ear 878 on the clutch pawl 875. Simultaneously, the engagement of the rearward edge of the upper arm of the bellcrank 896 with stud 898 on the arm 884 of control bellcrank 890, rocks the bellcrank 896 to the disengaging position shown in Fig. 20. Such rocking of the bellcrank moves the nose 895 away from its engagement with the ear 878, thereby releasing clutch pawl 875 and consequently clutch 870 for part-cycle rotation, or until the ear 878 engages the shoulder 881. Clutch 870 thus became effective to return cam follower 781 and setting plate 755 to their normal positions (by rotating cams 784 and 812 back to the positions shown in Fig. 19) and thus restore the digitation control spool 132 to its neutral position at the end of the cycle. This return of the clutch 870 to its original position is also operative to enable the right shift mechanism for the accumulator and also to enable the right shift mechanism for the multiplier carriage. A latching means is provided for maintaining the shift control lever 880 in the shift initiating position shown in Fig. 20, upon movement thereto by the operative segment 500, thereby retaining the ear 886 out of engagement with the rack segments during the shifting operation. A bellcrank latch lever 905 (see particularly Figs. 18 and 22) is pivotally mounted on the intermediate plate 67 by any suitable means, such as screw stud 906. The rearwardly extending arm of the bellcrank 905 is offset, as at 907 (Fig. 22), and is provided at its rear end with a fishtail latch member 908 (see also Figs. 20 and 21) having a rearwardly flaring V-notch 909. The fishtail, or V-notch, is adapted for camming engagement with a pin 844 riveted on, or otherwise carried by, the control arm 835. This portion of the bellcrank 905 is also provided with a latching shoulder 910 adapted to engage an ear 889 formed on the lower end of the substantially vertical arm 884 of bellcrank 880 (see particularly Fig. 20). In the normally inoperative position of arm 835, the pin 844 carried thereby engages the upper edge of the V-notch 909 of the fishtail latch, camming the latch upwardly out of engagement with the ear 889 as shown in Fig. 19, against the urgency of its spring 911 (Fig. 18) which resiliently biases the fishtail latch 905 downwardly into engagement with the ear 889. However, upon the initial movement of the control arm 835 to its operative position, the pin 844 releases the V-notch 909, thereby enabling the latch member 905 to rock downwardly toward its engaging position under the urgency of its spring. However, the movement of arm 835 has also, and simultaneously, released the shift control lever 880 and enabled it to rock (clockwise from the position shown in Fig. 20) so that its ear 889 has moved behind the shoulder 910. At this stage, the rear portion of the fishtail 908 will be riding upon the ear 889, at a point intermediate the shoulder 910 and the V-notch 909. However, as soon as the shift control lever 880 is rocked back to its blocking position shown in Fig. 20, by the return of the operative segment 500 to its operating position, the ear 889 moves forwardly of shoulder 910 and is therefore latched by it (for the latch 905 is operating under the control of its spring 911). The shift control arm 880 is therefore latched in its blocking position shown for the shift cycle and will be released by a latch releasing means operated at the end of the shifting cycle, as will now be described.

It has been mentioned that the latch member 905 is shaped as a bellcrank, and is pivotally mounted at its elbow. The downwardly extending arm of this bellcrank is provided with a pin 912 (see Fig. 22) which is embraced within a slot, not shown, formed in the downwardly extending end 913 of a laterally extending arm of a bellcrank 914. This bellcrank 914 lies in a horizontal plane, with the exception of a downward extending bracket 913, and is pivotally mounted at its elbow on a pin, or screw stud, 915 carried by a substantially horizontally extending bracket extending to the right from the left-hand frame plate 51 (see Fig. 4). It will be obvious that when the rear end of the latch arm 905 is in its elevated position, the bellcrank 914 is rocked to the clockwise position shown in Figs. 4 and 22. In that position, the forwardly extending arm of the bellcrank lies immediately to the left of the path of rotation of a stud, or pin, 667 mounted on the upper face of the hub 655. However, when the rear end of the latch 905 drops into latching engagement with the associated ear 889 of lever 880, the bellcrank 914 is rocked counter-clockwise from the position shown in Figs. 4 and 22 and, in that event, the forward end of the bellcrank lies in the path of travel of the pin 667. Shortly before the end of the shift cycle, the pin 667 engages the forwardly extending arm of the bellcrank 914, rocking the bellcrank 914 clockwise, and consequently rocking the latching bellcrank 905 (counter-clockwise when viewed from the right as in Fig. 18) to release the shift control lever 880. If a value stands in the multiply segment 500 which has just been moved under the ear 886 by the shifting operation, then the shift control lever 880 can rock clockwise to clutch-engaging position. If, however, the segment stands at "0," then the shift control lever 880 is held in the blocking position shown in Fig. 20 by the elevated segment and another shifted cycle is instituted.

The shifting operation, for both the accumulator carriage 60 and the multiplier carriage 472, is controlled by a transverse shaft 920 (Fig. 4) which is journalled in, and extends between, the left side auxiliary control plate 57 and the right side frame 52. The angular position of this shaft, in turn, is controlled by a cam follower yoke 921 (shown particularly in Figs. 4 and 22), which yoke is pinned to, or otherwise rigidly secured on, the shaft. Preferably this yoke is formed of two sections: a left-hand section 922 (Figs. 21 and 22) and a right-hand section 923 (Figs. 20 and 22), which sections are rigidly secured one to the other by any suitable means, such as rivets 924. The left-hand member 922 is offset toward the left (as shown particularly in Fig. 22) and carries at its upper end a roller 925 which is adapted to engage the periphery of a cam 926 affixed to the first clutch 820. The profile of this cam 926 is shown in Fig. 21 and comprises a single high point 927 with an angular extension of approximately 30°. When the multiplication mechanism is in the inactive, or normal, position shown in the figures, the roller 925 engages the high point 927 of the cam 926— the yoke 921 being biased into engagement with the cam by a suitable tension spring 928 (as shown in Fig. 20). However, the operation of clutch 820 (caused by the rocking of the control arm 835 to release the clutch pawl 825 and engage clutch 820) is effective to rotate the cam 826 approximately 270° from its full-cycle position. At this point, the high point 927 of the cam has rotated completely away from the roller 925 and the follower yoke 921 is free to rock rearwardly (to the right in Fig. 21), insofar as the first clutch and its cams are concerned. It can be noted that in the rocked position just mentioned, the segment feed pawl 930 is disabled and the shifting mechanisms are enabled, but that in most cycles of operation, the yoke 921 is held forwardly by the right-hand section 923, as will be described in the next paragraph.

For the moment, it should be recalled that the driven side of the first clutch 820 rotates the 270° just mentioned, and remains in that position until the completion of the multiplication operation.

The right-hand section 923 of the yoke is offset toward the right, and at its free upper end carries a roller 929. This roller is adapted to engage the periphery of a cam 930, the profile of which is shown in Figs. 20 and 24. This cam comprises a high 931 of an angular extent of approximately 135°, a low 932 of the same extent and gradual rises connecting the two. In the normal position of the parts, when the multiplier mechanism is at rest, the cam 930 lies in the angular position shown in these two figures, the yoke 921 being held forwardly and away from the periphery of the cam because of the engagement of the roller 925 with the high 927 of cam 926. When the clutch 870 is engaged, the cam 930 will be rotated approximately 90° from the position shown (counter-clockwise in Fig. 20), and in that position the roller 929 engages the high 931 of the cam 930. It will be recalled that this clutch, and the cams connected thereto, rotate through an angle of approximately 90°—the distance between the shoulder 881 on the shift control lever 880 and the shoulder 895 on the bellcrank 896. Thus, at the end of the cycle in which the register is cleared and the multiplication trigger 690 is released (commonly called the override cycle), both clutches have been engaged to rotate cams 926 and 930 approximately 270° and 90°, respectively. The rotation of the cam 926 has released the section 922 of yoke 921 from control by that cam and has placed it completely under the control of cam 930. If a value stands in the lowest order operative segment 500, the shift control arm 880 will assume the inoperative position (clockwise of that shown in Fig. 20), and in that event the cam 930, which has been rotated as above-described, holds the yoke 921 forwardly in the multiplying position shown. However, if no value stands in that order, the shift control lever 880 is held in its operative position by engagement of ear 886 with the ear of interponent 613, in which event the shoulder 895 of lever 896 releases the clutch pawl 875 and it rotates through an angle of approximately 270° back to the position shown in Fig. 20. In that event, the yoke follower 921 is free to rock (counter-clockwise in Fig. 20) to initiate a shifting operation.

Thus, the follower yoke 921 is enabled to rock under the force of its spring 928 whenever the shift control lever 880 is rocked to its operative position shown in Fig. 20. Such rocking of the yoke, among other things, disables the operation of the segment feed pawl 630, this feed pawl being enabled insofar as the yoke is concerned, when the yoke it is in the forward position shown in Figs. 20 and 21. This control is secured by means of an arm 940 pinned to, or otherwise rigidly secured on, the pawl control shaft 641 (see Fig. 22). A link 941 connects the arm 940 to the yoke 921, one end of the link being pinned to the arm 940 by any suitable means such as pin 943 (Fig. 21), and to the yoke section 922 by a pin-and-slot connection, including a pin 942 carried by the section 922 and a slot 944 in the rearward end of the link.

The shaft 641 is also under the control of the trigger 690, as by the mechanism shown in Fig. 17, and already described. This control includes the arm 945 rigidly secured to the shaft 641 and connected to the trigger 690 by means of a link 946. Prior to the operation of the trigger 690, this assembly, including the check pawl 640, holds the feed pawl 630 inoperative. The release of the trigger 690 releases the shaft 641 from control by that means, thereby placing the feed and check pawls directly under the control of the yoke 921. When the yoke is in the forward position shown in the figures, the check pawl 640 releases the feed pawl 630 and it is effective to return the segments step-by-step to their shift operating positions. However, the release of the clutch 870 from the intermediate position determined by the bellcrank 896, causes rotation of the cam 930 (counter-clockwise in Figs. 20 and 24), thereby enabling the follower yoke 921 to rotate rearwardly (counter-clockwise in these figures) to pull the arm 940 and consequently the check pawl 640 rearwardly (counter-clockwise if viewed from the left, as in Fig. 10) to disable the feed pawl 630.

As previously described, following the rocking of arm 835 and lever 880, and at approximately the 240° point of the override cycle, the clutch 820 is engaged. After approximately 30° rotation thereof, the high point of cam 926 (Fig. 21) is moved from engagement with roller 925. Thereupon, insofar as cam 926 and arm 922 are concerned, the follower yoke 921 would be free to rock rearwardly (clockwise in this figure) from the force of spring 928. However, it will be remembered that the clutch 870 is engaged (and cam 930 attached thereto is rotated approximately 90°) substantially simultaneously with clutch 820, so the yoke is held in the normal position shown. Incidentally, the clutch 820 is rotated a total of 270°, approximately, until the nose 852 engages the ear 828 of the clutch pawl to maintain the clutch disengaged until near the end of the last cycle of the multiplication operation. Similarly, the driven side of the second clutch 870 (Fig. 20) is initially rotated 90° in the override cycle, whereupon the ear 878 of the clutch pawl 875 engages the shoulder 895 of bellcrank 896 to disengage the clutch. The driven side of the second clutch 870 is maintained in this 90° position until the restoration of the operative multiplier segment 500 actuates the shift control lever 880 to re-engage the clutch for a right shift operation.

Upon re-engagement of the clutch 870, which is caused by the rocking of shift control lever 880 by operation of the aligned segment 500 (at approximately the 120° position of the last digitation cycle in that order), the cam 930 is again rotated. After approximately 75° of rotation, the roller 929 passes from the high 931 and the spring 928 becomes effective to rock the yoke 921 rearwardly (counter-clockwise in Fig. 20 or clockwise in Fig. 21). The rocking of yoke 921 is effective to simultaneously disable segment feed pawl 630 and enable the shifting mechanism for both the register carriage 60 and the multiplier, or pin, carriage 472. It will be recalled that the yoke is connected to shaft 641 by means of link 941 and arm 940, so that blocking arm 640 is directly rocked (counter-clockwise in Fig. 10) to its disabling position.

The rocking of the yoke 921 rocks the shaft 920 to which it is affixed (clockwise when viewed from the right, as in Fig. 21). The shaft 920, as shown in Fig. 22, carries the arm 955 pinned thereon, or otherwise rigidly secured thereto, in a plane adjacent the periphery of the hub 655 of the shift pawl 652. The rocking of the shaft 920 (clockwise if viewed from the right) rocks the arm 955 (counter-clockwise in Fig. 10). As shown in Figs. 10 and 22, the forward and upper end of the arm 955 is provided with a pin 956 which lies within an annular groove 666 formed in the hub 655, so that the rocking of the arm is effective to lift the hub on its shaft 656. When this occurs, the feed pawl lies in the plane of the feed rack 650. At this time the cyclic eccentric rotation of the feed pawl becomes effective, through its engagement with rack 650, to shift the multiplier carriage 472 one order to the right.

The shaft 920 also carries an arm 960 rigidly mounted thereon, which arm is mounted in a plane adjacent that of the right shifting mechanism, including the clutch control rod 233, the arm 240, and the pusher link 239, as shown on the right-hand side of Fig. 4. The forward and free end of this arm carries a long pin 961 which engages a slot, not shown, in an arm 962 which is slidably and rotatably mounted on the shaft 920. The arm 962 is biased to the left by a compression spring 963 which embraces the right end of shaft 920. The arm is normally blocked against movement to the left from the force of the spring by means of a slide 964 loosely mounted on the shaft 920, the left end of which engages a portion of a multiplier carriage 472. It is, therefore, necessary that the carriage be shifted to the left before the arm 962 can move to the left under the force of its spring 963. When so shifted to the left, the arm 962 lies in front of a pin 965 carried by an arm 966 loosely mounted on the shaft 238—the pin lying against the forward end of the clutch control rod 233, and between the rod and the shoulder, not shown, on the control link 239. Thus, when the arm 962 is shifted to the left, its rear edge lies in front of the pin 965. Thereafter, when the shaft 920, and consequently arm 960, are rocked (clockwise if viewed from the right), the arm 962 is rocked to force the pin 965 rearwardly, thereby pushing the clutch control link 233 rearwardly to its clutch-engaging position. Thus, the right shift clutch 231, 249 is engaged and the accumulator carriage is shifted one space to the right.

It will be understood that the shaft 920 will be released for rocking when the cam 930 releases the roller 929. At this point, the machine is operating in a digitation cycle and the conventional interlocks, not shown, will hold the digitation mechanism in its operative position until the end of the cycle and will prevent the operation of the shifting mechanism until the end of the cycle. Similarly, the shift mechanism, once the shift cycle is initiated, will be locked in its operative condition and the digitation mechanism will be held in its neutral, or ineffective, position until substantially the end of the shift cycle. However, at the end of the cycle in which the shift control arm 880 is operated, the digitation control gate 135 will be returned to its neutral position so that the drive gears are disengaged from the accumulator gear 131. In the meantime, the clutch 870 (Fig. 20) has rotated to its full-cycle position, in which position it is disengaged by the engagement of ear 878 with shoulder 881, as previously described. As pointed out above, during the last step of the movement of the multiplier segment 500 to operate the shift control lever 880, the control lever 880 is locked in the position shown by the fishtail latch 905. When in this position, the latch lever 905 (Fig. 22) has rocked the bellcrank 914 so that the forward arm thereof lies in the path of rotation of stud 667 on collar 655. Immediately following a shifting movement of the next higher order rack, or segment, 500 into active position, i.e., actually after approximately 240° of rotation of the collar 655, the stud 667 engages the bellcrank 914 to release the latch lever 905, thereby releasing the shift control lever 880. At this point, the shift of the multiplier carriage 472 one step, or order, will have been completed, so that when the shift control arm 880 is released by the fishtail latch 905, it is free to rock (clockwise from the position shown in Fig. 20) to again release the clutch pawl 875 for engagement of the clutch. If the value in the operative segment is "0," then the shift control arm 880 cannot rock and the clutch 870 is held in shifting position so that both the accumulator carriage 60 and the multiplier carriage 472 are shifted an additional step. If, on the other hand, a value other than "0" stands in the aligned segment, then the shift control arm 880 can rock to its ineffective position, thereby releasing clutch pawl 875 and enabling the clutch 870 to rotate approximately 90° until again caught on the shoulder 895 of the bellcrank 896. When the clutch is so permitted to rotate, of course cam 930 rotates with it, thereby rocking the follower yoke 921 forwardly to disable both shifting mechanisms and to re-enable the feed pawl 630 through the rocking of the shaft 641 and check pawl 642. It will be understood that after each shifting movement of the multiplier carriage 472, it is held in its newly adjusted position by means of the escapement mechanism described in connection with Fig. 9.

From the above description, it is seen that at the end of each ordinal multiplication operation, the multiplier carriage 472 is shifted one step to the right simultaneously with the shifting of the accumulator carriage 60 in the same direction. This brings the accumulator dials 62 into a new decimal position with respect to the actuating mechanism, and also brings the next higher order multiplier segment 500 into the active, or operative, position. The foregoing sequence of operations continues until each active segment has been restored to its "0" position. At this point, the control arm 835 is restored to its normal position, as will be described under the heading "Restoring Mechanism."

21. *Shortcut operation controls—General*

In order to more readily understand the mechanism of the present invention and to understand why the various controls are provided, it is probably worthwhile to pause briefly for a consideration of the conditions which must be met. In this connection it must be remembered that the present invention is designed to operate by the shortcut method in either additive or subtractive multiplication, and is, therefore, more complicated than those former machines which operated for additive multiplication only. It would also be well to remember that the present invention is primarily an improvement over the mechanism shown in the patents to Friden, Nos. 2,371,752 and 2,399,917, as modified by my copending application S.N. 401,780 and Patent No. 2,824,695, and that the present invention can be most easily understood if considered on the basis of the machine of these patents and applications, with particular emphasis on those mechanisms which differ therefrom. The mechanism of the present invention must meet the following situations:

A. Computation in normal shortcut multiplication involves two situations, both of which are straight-forward operations:

(1) When the multiplier values are from "1" to "5," operation is normal, i.e., operation is in the selected direction in that it is repetitive addition for normal multiplication and repetitive subtraction for negative multiplication.

(2) When the multiplier value is "6" to "9," inclusive, operation is in the reverse direction for a number of cycles equal to the tens-complement of the multiplier value: that is, in normal multiplication, operation is subtractive, and in negative multiplication it is additive. Incidentally, this reverse direction of operation is determined by the angular position of the segment 500 of the operative order.

B. When operation is in the reverse direction in one order (subtraction in normal multiplication or addition in negative multiplication) and operation in the next higher order is in the selected direction, there must be an additional cycle of operation in the higher order. That is, if the multiplier factor is "19," in normal additive multiplication, the operation in the first order will be a single subtraction operation followed by a shift of the carriage and two additive cycles in the higher order— the equivalent of multiplication by "20−1."

This result is secured in the present invention by providing the interponent 613 controlled by the angular position of the intermediate arm 611 (see Fig. 14) and hence indirectly from the angular position of the multiplier segment 500 of the adjacent lower order. It should be noted in this connection that a "0" must be considered as a positive factor, so that when operation is in the reverse direction in the lower order and a "0" appears in the higher order, then one cycle of operation must be given in the "0" order, such operation to be in the selected direction.

C. When operation is in the reverse direction in two successive orders, the number of cycles of operation in the higher of those two orders will be one less than the tens-complement of that number. Thus, for conventional (additive) multiplication, if the multiplier factor is "189," the operation in the lowest order will be a single subtractive cycle, a single subtractive cycle in the second, or tens, order (one less than the tens-complement of "8," which is "2"), followed by two cycles of operation in the selected direction in the third, or hundreds, order. It will be understood that if the negative multiplication key had been depressed for this operation, then the operation would have been additive in the first two orders, one cycle of operation in each; and subtractive in the third order in which two cycles were taken. This result is controlled by the joint operation of the arm 611 of the operative order and the arm 611 of the adjacent lower order, both of which act upon a sensing arm 1100.

D. When the multiplying operation terminates with an operation in the reverse direction (subtraction in normal multiplication or addition in negative multiplication) in the highest order of the multiplier factor, means must be provided for automatically shifting the carriage an additional step and multiplying a single time in the selected direction. That is, if the multiplier value is "89," then in an additive multiplication, there will be a single cycle of subtraction in the lowest order, a single cycle of subtraction in the higher order, then an automatic shifting, and finally a single addition in the order above the highest order of the multiplier; and if the machine is operated negatively, then there will be positive operation in the two lower orders and a single subtractive operation in the third order. This result can be accomplished readily by means of the auxiliary segment 590 which lies to the left of the highest order segment, and its cooperation with the interponent 613 positioned by the intermediate arm 611 of the highest order segment. It is conventional, in the machine above-mentioned, to shift the multiplier carriage one order to the right following termination of operation in the highest order, in order to return the carriage to its home position, and then shift it an additional step to the right to restore the setting pins to their inoperative position (after which it is released to return to the left to its home position as the machine operation terminates). In the present invention, I provide means for initiating the necessary correction cycle at the end of the first of these shifting steps, and prior to the final one in which the multiplier pins are restored to their "0" positions.

E. It will be noted that the appearance of zeros in the multiplier factor creates several problems. A "0" is treated normally when it appears in an order immediately above one in which operation is in the selected direction, i.e., for the values "1" to "5," inclusive; but when the operation in the next lower order is in the reverse direction, i.e., for values "6" to "9," inclusive, the "0" must be treated as a positive value and requires a corrective cycle in the selected direction. For example, if the multiplier factor is "809," there will be a single subtractive cycle in the lowest order (in additive multiplication), a single additive cycle in the second order, two subtractive cycles in the third order, and a single additive cycle in the fourth order.

However, when the operation in multiplication is in the reverse direction in one order and the next two higher orders of the multiplier factor are "0," it is necessary to take the extra cycle on the lower of the two zeros, but not on the higher. Thus, if the multiplier factor is "9008," the operation in the first, or lowest, order will be two cycles in the reverse direction (i.e., subtractive in normal multiplication or additive in subtractive multiplication), followed by a single cycle in the selected direction in the second order, which, in turn, is followed by a shifting of the carriage over the third order without a registration in that order, a single operation in the reverse direction in the fourth order, and finally, by a single cycle of operation in the selected direction in the fifth order.

In each instance, the necessary control is afforded by the interponents 613 controlled by the value position of the segment of the adjacent lower order. The single cycle required in the tens-order in each example is initiated by the displacement of the interponent lying in that order—which displacement results from the rocking of the intermediate arm 611 by the setting in the units order segment 500. The segment of the second order, however, has not been changed, so that operation in the third order will be entirely under the control of the segment of the third order.

The various means for conditioning the machine for the various operations noted, will now be described, with attention directed first to the means for setting the additive or subtractive interponent 753 or 754 to its operative position required under item "A" above.

A. *Normal operating controls*

It will be recalled that the positioning of the computation control gate 135 is normally under the control of the additive interponent 753 or the subtractive interponent 754. It will also be recalled that it was mentioned earlier that operation from the lower values ("1" to "5," inclusive) will be in the selected direction, i.e., additive in positive (or additive) multiplication for the accumulation of true products, or negative in subtractive multiplication for the accumulation of the complements of products; and that operation from the higher values of "6" to "9," inclusive, are in the reverse direction—subtractive in additive multiplication, or additive in negative multiplication. Thus, the control interponents 753 and 754 must be controlled automatically to take care of four operative situations, in addition to neutral in which neither interponent is operative, which operative situations are determined by the two factors: operation controlled by a lower value ("1" to "5," inclusive) or by a higher value ("6" to "9," inclusive); and the selected direction of operation (additive or subtractive). Specifically, in normal multiplication (initiated by depression of the multiply key 402 or the accumulate multiply key 403) operation is additive for the lower values and will be subtractive for the higher values and, conversely, in complemental multiplication (initiated by depression of the negative multiply key), the operation is subtractive for the lower values and will be additive for the higher ones. In addition, both interponents must be held in a neutral position during the shifting cycle. The actual selection is secured by operating either the additive interponent 753 or the subtractive interponent 754 by means of the operating member 780 which is lifted by cam follower 781 operating under control of cam 784 (Figs. 18 and 19), and which is returned to its inoperative position at the end of each ordinal series of operations. Whether the operation of the operating member 780 is effective to lift the additive interponent 753 or the subtractive interponent 754 depends upon the angular position of the interponent 780—if a pin 801 or 803 lies below the ear 765 on the additive interponent 753, the additive interponent will be operated, while if the pin 802 lies under the ear 766 of the subtractive interponent, then the subtractive interponent will be operated. The operating member 780 can assume any one of three positions: (1) the normal forward position shown in Figs. 17 and 19 in which the rearward pin 801 underlies ear 765 of additive link 753; (2) the minus position in which pin 802 underlies ear 766 of subtractive link 754; and (3) the second additive position in which pin 803 underlies the ear 765 of additive link 753. The member 780 is normally biased into the first position by the spring 790 tensioned between the member and subtractive interponent 793. The operating member 780 is moved to the second position by either the depression of the negative multiply key 404 which rocks subtractive interponent 793 (clockwise in Fig. 17 or counter-clockwise in Fig. 19), or by the reverse direction control resulting from the registration of a higher value in the operative segment. The third position of the operating member results from the sequential operation of both the operation of the subtractive interponent (which moves the interponent one step to a negative position) and the reverse direction control (which moves it a second step).

The first of these negative controls has already been mentioned in connection with the negative multiply key 404 but will be briefly summarized here. It will be recalled that the depression of the subtractive multiply key 404 rocks the multiply lever 706 and the negative interponent, or arm, 793 (Figs. 17, 19 and 21). A link 796, pivotally mounted on the lower end of this arm, has a pin-and-slot connection with the operating member 780. Therefore, the rocking of the subtract lever 706 (clockwise in Fig. 17) rocks the subtract arm 793 (likewise in a clockwise direction in this figure) to push the operating member 780 a single step toward the rear. Such operation places the subtract pin 802 under the ear 766 (Fig. 19), so that the subtractive interponent 754 will be lifted by operation of the operating member 780.

Means is provided for latching the subtractive control arm 793 in either its normal or its adjusted position, on the first partial cycle operation of the first clutch 820. This latching means comprises a two-armed lever 1125 (Figs. 17 and 21) pivotally mounted on a stud 1126 carried by the auxiliary plate 57. This lever, or latch, is provided with two latching shoulders 1127 and 1128 adapted to engage a pin 798 carried by the arm 793. The shoulders are spaced, one from another, a distance equivalent to the setting of the arm 793 in either its normal position shown in Fig. 17 or in its subtractive position in which it is rocked around its pivot 794 (clockwise in Fig. 17, or counter-clockwise in Fig. 19). This latch lever 1125 is operated by a cam 1129 rigidly secured to the clutch 820. The periphery of this cam engages a roller 1130 carried by the forward end of the latch 1125 (as shown in Fig. 21). The cam has a single depression 1131 in which the roller lies when the clutch and cam are in the full-cycle position shown. The latch lever is biased into engagement with the periphery of the cam by any suitable means, such as a spring 1132; which obviously biases the rear end of the arm away from the associated pin 798. However, the partial rotation of the clutch and cam at the beginning of the multiplication operation, rocks the latch lever 1125 (counter-clockwise in Fig. 21) to cause engagement of the shoulders 1127 or 1128 with the pin 798, thereby latching the subtractive arm 793 in its normal or its adjusted position. It will be recalled that this clutch 820 has a partial rotation in the first cycle of a multiplication operation (which partial rotation occurs in the cycle in which the override pawl is operated and in the first part of what can be considered the first cycle of a multiplication operation). Therefore, the cam 1129 is rotated for a distance and then held in that position until the termination of the multiplication operation—whereby the latch arm 1125 holds the subtractive interponent 793 in one or the other of its positions until the multiplication operation is completed.

The second control means just mentioned is operated by a means which senses whether the segment 500 of the operative order (the one aligned with the feed pawl 730 and the ear 886 of the shift control bellcrank 880) stands at a lower value or a higher value. This is best shown in Figs. 13, 14 and 15, but is also shown to some extent in Fig. 10. It is seen in these figures that an inverted Y-shaped interponent 1050 is suspended by the base of its stem from the forwardly extending arm of the shift control bellcrank 880. This interponent 1050 is rotatably mounted on the lever 880 by any suitable means, such as screw stud 1051. The interponent has a forwardly and downwardly extending arm 1052, on the forward end of which is an ear 1053. This ear lies adjacent to, and in the plane of, the operative segment 500. In other words, the ear 1053 is in the same plane as the ear 886 on the shift control bellcrank 880 and the feed pawl 630. Furthermore, the ear 1053 is so located that it will engage the rear edge of the operative segment, when it is resiliently biased forwardly in a sensing operation, if a lower value stands in the operative segment. This is illustrated in Fig. 13, in which the segment 500 stands at a value of "5," and in which is seen that the ear 1053 will engage the rear edge of the upper end of the segment 500. On the other hand, if a higher value has been entered into that segment, then the segment will have passed beyond the path of travel of the ear 1053, as is illustrated in Fig. 14, which shows the segment in the "9" position (which is one step beyond the "5" position, in the preferred form of my invention). When the operative segment is in this position, the arm 1050 can be rocked forwardly (counterclockwise in these figures) to lie above the upper end of the operative segment 500, to the position 1053a (Fig. 14). In that event, the feeding of the segment toward its "0" position will cause the upper end 508 of the segment to engage the ear 1053 and thereupon lift it, and the forward end of the shift control lever 880, in the same manner as if the upper end 508 of the segment or the interponent ear 618 had engaged the ear 886 directly. Thus, in operation in the reverse direction, the shift control lever 880 will be operated by means of the interponent 1052, when the segment has taken a sufficient number of steps to engage the ear 1053. The number of steps of such movement must be the complement of the value—one step for "9," etc. It is for this reason that the angular position of the higher values is reversed with respect to those of the lower values, so that the value pins and the dial segment run from "1" to "5," inclusive, and from "9" to "6."

The sensing arm 1050 is resiliently rocked (counter-clockwise in these figures) from the operation of a cam 1060, the profile of which is shown in Fig. 23. This cam is rigidly secured to the driven plate 876 of the clutch 870, preferably lying between the program cam 930 and the digitation setting cams 784 and 812, as shown in Fig. 22. Associated with the cam 1060 is a cam follower bellcrank 1061, hinged at its elbow on stud 1066. A roller 1062 is mounted on the forward end of the horizontal arm of this follower, which roller engages the periphery of the cam 1060. The cam is shown in its full-cycle position in Fig. 23, and the direction of rotation is indicated by the arrow. It is obvious that immediately after the initiation of rotation of the cam assembly connected to the second clutch 870 from its full-cycle position, the follower roller 1062 reaches an abrupt drop, or shoulder, 1063 in the periphery of the cam, whereupon the follower 1061 is free to rock (clockwise in Figs. 20 and 23). The circumference of the cam maintains a substantially constant radius from the point of shoulder 1063 through an angle of approximately 180°, so that the follower 1061 will remain in the rocked position throughout the quarter-cycle which sets the machine for digitation (and throughout the succeeding digitation cycles which occur with the clutch 870 and the associated cams in the part-cycle position). During the shift cycle of the machine in which the cam plate 876 and its associated cams are returned to their full-cycle position, the cam has a gradual rise to return the follower roller gradually to the disabled position. The cam follower 1061 is resiliently biased into engagement with the periphery of the cam by a suitable spring 1064 tensioned between a long pin 1065 and a stud on the control plate 67 (shown in Figs. 19 and 22).

The pin 1065 extends to the right from the upper arm of the follower 1061, as shown in Figs. 20 and 22, and its right end lies within an angularly disposed cam slot 1054 formed in the intermediate section of the sensing arm 1050. Thus, the rocking of the follower 1061 (clockwise in Fig. 20), through the camming effect of pin 1065 on slot 1054, rocks the interponent, or sensing arm, 1050 forwardly (counter-clockwise in Fig. 20). If the ear engages the multiplier segment 500 in the operative order, the rocking of the sensing arm is blocked and the follower roller 1062 will be held away from the cam. If, on the other hand, the aligned segment 500 registers a higher value, then the ear 1053 will pass above the upper end of the segment. In that event, the return of the segment to the complementary position, in which the upper end 508 of the segment engages the ear 1053, is effective to rock the shift control arm 880 and initiate a shifting operation.

The rocking of the sensing arm 1050 is also operative to control the selection of the additive interponent 753 or the subtractive interponent 754 for operation in each particular order. The mechanism for this selection is shown primarily in Figs. 18 and 19. It will be noted in Fig. 18 that the sensing arm 1050 has a downwardly extending projection 1055 at its rear side, which projection is provided with a slot 1056. The sensing arm 1050 acts upon a rocker 1070 rotatably mounted on the intermediate frame plate 67 by some suitable means, such as screw stud 1071. The upper end of the rocker carries a pin 1072 which is embraced within the slot 1056, so that the rocker 1070 rotates (counter-clockwise in Fig. 18) whenever the sensing arm 1050 is free to move forward to sense a larger value position of the associated segment. The lower end of the rocker carries a long pin 1073 extending leftwardly through an opening in the frame plate. A setting arm 1080 (Fig. 19) is rotatably mounted on the left end of the pin 1073, being held from the rocker 1070 by a suitable sleeve, or spacer, 1081. The arm 1080 has a bellcrank extension 1082, the rearward edge of which engages the pin 844 carried by the control arm 835. Thus, whenever the control arm 835 is in its forward position shown in Fig. 19, the pin 844, through its engagement with the extension 1082, rocks the arm 1080 upwardly to an inoperative position (counter-clockwise in Fig. 19). However, when the control arm 835 is rocked rearwardly to initiate a multiplication operation, the pin 844 moves away from the extension 1028, thereby permitting the arm 1080 to drop under the influence of a spring 1083 tensioned between an ear on the arm and a stud on the frame plate, as shown. The arm 1080 is provided with a pair of rearwardly directed shoulders 1084 and 1085 adapted to engage a pin 788 on the operating member 780. In the normal position of the parts, in additive multiplication, the shoulder 1084 will engage the pin 788; while in subtractive operation, the rocking of subtractive control arm 793 and consequent rearward rocking of interponent 780, will cause the shoulder 1085 to engage the pin. In any event, the rocking of the sensing arm 1050 when sensing a higher value in the aligned segment, and consequent rotation of the rocker 1070 (counter-clockwise in Fig. 18), translates the arm 1080 rearwardly. In that event, the shoulder (the additive shoulder 1084 in normal additive multiplication or the subtractive shoulder 1085 in subtractive) will engage the pin 788, thereby rocking the operating member 780 rearwardly (to the right, or clockwise in Fig. 19), a single step. Thus, if the interponent 780 had been set for additive multiplication, the rocking of the interponent 1080 will move additive pin 801 to the rear of its associated ear 765, and the subtractive pin 802 will then underlie the ear 766 on the subtractive interponent 754. On the other hand, if the interponent had been set for subtraction, the movement of arm 1080 will move subtractive pin 802 rearwardly of its associated ear 766 and move the normally inoperative pin 803 under the additive ear 765 of additive interponent 753. Thus, the movement of the sensing arm determines, not only whether the operation of the shift control bellcrank 880 will be from shoulder 508 engaging ear 886 or ear 1053, but also determines whether the additive or the subtractive interponent will be operative in the particular order.

It can be noted at this point, that the subtractive arm 793, which is operated by the subtractive lever 706 to move the operating member 780 to the subtractive position by means of the link 796, previously described, also is effective to set the link 1080 in a proper angular position. It is seen in Fig. 19 that the arm 793 is extended downwardly to a point below the link 1080, and at its lower end carries a pin 799 adapted to engage a contact face 1086 on the lower edge of the link 1080. When the mechanism is set for subtractive multiplication to accumulate the complement of the true product, the pin 799 moves rearwardly, away from the contact edge 1086, thereby enabling the rear end of the link to drop below the plane shown in Fig. 19. In that event, the operating interponent 780 has been moved rearwardly (clockwise in this figure), so that pin 788 will then lie to the rear of the shoulder 1085, the subtractive pin 802 then lying below the ear 766. Thereafter, whenever the sensing arm 1050 senses a higher value in the operative multiplier segment, the link 1080 is translated rearwardly as before; and in that event, the shoulder 1085 engages the pin 788 and shifts the interponent 780 one further step towards the rear (to the right in Fig. 19), so that the pin 803 will then underlie the ear 765 on the additive interponent 753. Thus, regardless of whether the machine is set for additive or subtractive multiplication, the sensing arm 1050, and consequently the link 1080, will be operative to shift the interponent 780 for operation in the reverse direction whenever the operative segment 500 has been rotated to a higher value position.

B. *Extra cycle mechanism*

It has already been mentioned that when the machine is operating in a selected direction, no change in the program of operation is required in the cycles of the adjacent higher order. That is, when operation in any order is in the selected direction, the termination of operation in that order causes the accumulator carriage 60 and the multiplier carriage 472 to shift to the next ordinal position and the machine is operated in the new ordinal position the exact number of times determined by the control mechanism. However, when the machine has been operating in the reverse direction, it is sometimes necessary to provide an additional count, or cycle of operation, in the next higher order, and in all other instances to provide one less count, or cycle of operation in the higher order. The first situation occurs when operation in the reverse direction in any order is followed by operation in the selected direction in the next higher order, or when the multiplier digit in the next higher order stands at "0." In such circumstances, it is essential to provide means for securing an extra cycle of computation in the high order, in addition to the cycles determined by the angular position of the multiplier segment 500, in order to correct the product resulting from the reverse operation in the adjacent lower order. This mechanism, in the instant invention, is under the control of the intermediate arms 611 which have already been described, and the operation of which has already been suggested. This mechanism is shown primarily in Figs. 10, 13, 14 and 20, and will now be described.

There is one of these intermediate arms 611 between each pair of ordinal multiplier segments 500, and between the highest order segment and the auxiliary segment 590. The intermediate arms are rotatably mounted on a common shaft 612. Each arm is provided at its lower end with a pin 610 which is embraced within a cam slot 600 formed in the segment 500 to the right thereof (in the lower order). These slots have a section 601 of a length corresponding to the angular position of the segment for the lower values, described about the axis of rotation with a constant radius; a second section 602 of a length corresponding to the angular positions of the higher values, described around the axis of rotation with a different radius; and a short camming section 603 connecting the two arcuate portions. Thus, the intermediate arms 611 will assume one angular position when a lower value is registered in the adjacent lower order segment and another position when a higher value is registered in that segment. The upper end of each of the intermediate arms 611 carries an interponent member 613 pivotally mounted thereon and carrying an ear 618 on its forward end, which ear lies in the plane of the nose 508 of the adjacent higher order segment. This ear is so positioned that when the arm is located in the first angular position, determined by a lower value being registered in the adjacent lower order segment, the ear 618 lies immediately below ear 886 on the shift control bellcrank 880 and operates as an interponent between that ear and the upper shoulder 508 of the operative segment 500. However, when the intermediate arm 611 assumes the other angular position, the interponent, and particularly the ear 618, is withdrawn from the path of travel of the operative segment or the ear 886, so that the shift control bellcrank 880 is operated only by the upper shoulder 508 of the operative segment. It will be understood that the ear 618 has a vertical extension equal to the spacing of the teeth 506 on the ordinal segments, so that a single additional step of movement of the segment is required whenever the arm 611 is rocked to withdraw the interponent from between the segment and the shift control arm.

The ear 618 of the interponent extends to the left from its associated intermediate arm 611, and normally lies against the upper edge of the segment of the adjacent higher order (see Fig. 15). Thus, the position of the interponent, and particularly the ear 618, is determined by the angular position of the segment lying in the first order to the right of the operative order. Whether or not an additional count is required in the operative order will depend upon the angular position of the segment in the first order to the right of the operative order. This control obviously is effective, regardless of whether a value or a "0" stands in the segment in the operative order, and no additional means is required to provide for the additional count when the operative order registers a "0."

C. *Cycle reducing mechanism*

It will be remembered that when operation in two consecutive orders is in a reverse direction (i.e., multiplier values in both orders are from "6" to "9," inclusive) the number of cycles of operation in the second, or higher, order must be reduced by one. For example, if a multiplier value is 189, we have a single cycle of operation in the reverse direction in the lowest order, a single cycle of operation in the reverse direction in the second order, and two cycles of operation in the selected direction in the third order. This is equivalent to multiplying by 200—10—1, as 189=200—11. We therefore, have the rule that whenever the multiplier value in two successive orders calls for reverse operation, it is necessary to reduce the number of cycles of operation in the second of those orders by "1." This is readily secured by the mechanism shown in Fig. 13 and also in Figs. 10 and 20, as will now be described.

It is seen in these figures that the shift control bellcrank 880 carries a second sensing arm 1100 depending from the forward arm thereof. This second sensing arm is pivotally mounted on any suitable stud, such as screw stud 1101 on the right side of the forward arm of the shift control bellcrank, being spaced one order of the multiplier unit to the right of the arm 1050 by a suitable spacer 1102, as shown in Fig. 15. The lower end of the sensing arm is provided with a long ear 1104, which is of sufficient extension laterally of the machine to engage two successive arms 611 (as shown in Fig. 15). This ear is provided with a cam face 1105 on its left end to easily cam the ear and the arm rearwardly out of sensing engagement as the multiplier carriage is shifted to the right. The ear is also provided with a horizontally extending flange, or ear, 1106, which is adapted to overlie the upper shoulder 508 of the operative segment 500, which is the segment lying between the two arms 611 with which the ear 1104 is associated (the arm 611 of the operative order and the first adjacent order to the right). This flange is spaced below the ear 1053 on the first sensing arm 1050, one tooth space of the rack, or segment, 500, so that it will be engaged, if rocked to the forward position (counter-clockwise in these figures), one cycle before the ear 1053 of the operative order would be engaged.

The second sensing arm 1100 is resiliently biased in a forward (counter-clockwise in these figures) direction by a suitable spring 1110 tensioned between an ear 1057 on the first sensing arm 1050 and an ear 1111 on the second sensing arm. Normally, in other than the multiplication operations, the second sensing arm 1100 is held away from the segments 500 by the latching of the control arm 835 in its forward position. This arm carries a pin 845 (see also Fig. 21) adjacent its upper end. This pin is embraced within a slot 1112 formed in an arm 1113. The arm 1113 is rotatably mounted on the pin 794 which also supports the subtraction control arm 793. At its upper end, the arm 1113 has a laterally offset arm 1114 which is provided with a diagonal cam nose 1115 (Figs. 18 and 20). This cam nose is associated with a pin 1107 riveted to, or otherwise rigidly mounted on, a rearwardly extending projection of the second sensing arm 1100. By this means, the second sensing arm 1100 is held away from the segments 500 whenever the machine is at rest or is operating in other programs, but is released for sensing movement whenever the machine is operating in multiplication.

It will be seen (Figs. 10, 13, 14 and 20) that each of the arms 611 is provided with a rearwardly extending projection 625, located a radial distance from the pivot 621 of the arms to engage the ear 1104. These projections extend beyond the periphery of the teeth 506 of the segments and, of course, are located between successive segments. However, when the interponent arms 611 are rocked (counter-clockwise in these figures) by the rotation of the segment 500 controlling them to the higher value position (shown in Fig. 14), this projection extends only to the periphery of the segment. It will be recalled that the ear 1104 has a lateral extension to engage two arms 611 (the one associated with the operative segment and the one associated with the segment in the adjacent lower order). Thus, the sensing arm 1100 is held rearwardly in its inoperative position if the segments in either the operative order or the first adjacent lower order register a lower value, and can rock forwardly to its operative position only when both segments register higher values. In the latter event, the sensing arm 1100 rocks forwardly (counter-clockwise in these figures), so that the bracket portion 1106 lies above the upper shoulder 508 of the segment of the operative order (which, of course, lies between the two control arms 611 which control the rocking of the sensing arm). In that event, the return of the segment toward the shift controlling position will cause the upper shoulder 508 thereof to engage the ear 1106 on the sensing arm 1100 one cycle before it would engage the ear 1053 on the first sensing arm 1050. The rocking of the segment is then effective to rock shift control bellcrank 880—the arm 1100 acting as an interponent to lift the bellcrank 880 and initiate the shifting program above-described.

D. Final corrective cycle mechanism

It will be recalled that when the last ordinal operation is in the reverse direction, which occurs when the values in the highest order in the multiplier factor are of the higher values of "6" to "9," it is necessary to follow this last cycle of set operation by a single cycle in the selected direction in the order above the highest order of the factor. It will also be recalled that the multiplier carriage normally lies one order to the right of the ordinally operative position, and is shifted to the operative position by the entry of a value into the multiplier unit.

It is conventional in the machine illustrated in the drawings, not only to shift the carriage from the last operative position one step to the right to its normal inoperative position (which restores the multiplier carriage to its original position), but to attempt a further shift an additional step to the right. This final step is an idle one, in that there is no escapement latch in this position of the carriage, so, the carriage returns to the left to the normal inoperative position at the end of the idle shifting cycle. This idle shifting cycle is important, however, for it is utilized to restore the setting pins 491 to 495, inclusive, and 499 to 497, inclusive, to their normal inoperative positions and to relatch the segments 500 in their "0" positions. This restoring operation will be described very briefly here, as it is described in detail in my copending application and patent above-mentioned. This cycle is also utilized to release the control key latches 672 (Fig. 12) or 675 (Fig. 16), as the shifting of the carriage beyond the normal inoperative position rocks the bellcrank 552 to rock the arm 675 (counter-clockwise in Fig. 16) to its releasing position. The multiplier keys are thereupon released and returned to their inoperative positions by the force of their individual springs 670.

When the carriage is shifted to its normal, or home, position in the first of the above-mentioned shift cycles, the highest order of the multiplier factor lies one order to the right of the ear 886 formed on the forward end of the shift control bellcrank 880 and one order to the right of the segment feed pawl 630. In former machines, it was conventional for this ear to become engaged by a complementary ear formed on the upper edge of the left frame plate, thereby rocking the shift control bellcrank to a shift position. In the present machine, this ear on the carriage frame plate is replaced by the auxiliary segment 590 (see Fig. 10). This segment has an upper nose 594 that lies in the same horizontal plane as the upper edges of the segments 500 when they are in their "0" positions. There is an intermediate arm 611 associated with the highest order segment 500, which arm carries the regular interponent 613. Therefore, if the highest order segment registers a lower value, and the intermediate arm 611 is not rocked, the ear 618 of the highest order interponent 613 will lie between the nose 594 of the auxiliary segment 590 and the ear 886 on the front end of the lever 880. In that event, the shift control arm will be held in the shift initiating position when the carriage is shifted to its normal, or home, position. In that event, the second of the shift cycles follows immediately. On the other hand, if the higest order segment 500 registers a higher value, then the arm 611 associated with that segment will be rocked to withdraw the interponent 613 from between the nose 594 and the ear 886. In that event, the shift control bellcrank 880 is free to rock (clockwise in this figure) to control a digitation operation in that order. In this siutation, the feed pawl 630 will engage the bellcrank extension 593 of the auxiliary segment 590, thereby rocking the latter to cause the nose 594 thereof to engage the ear 886 and rock the shift control bellcrank 880 to initiate the final shifting cycle.

It will be seen in Fig. 25 that the right frame plate 475 is provided with a projection, or face, 1140 which is adapted to engage the ear 1104 whenever the multiplier carriage is in the extreme left-hand position. It is obvious that if there were a higher value in the lowest order of the multiplier, means must be provided to prevent the sensing arm 1100 from moving forward to enable operation one step short of the tens-complement. In the higher orders of the multiplier unit, this is controlled by the segment to the right, so if a factor does not exhaust the capacity of the unit, then the segment to the right of the factor furnishes the necessary control. However, when the factor does exhaust the capacity of the unit, it is desirable to have the carriage frame 475 provide the necessary block to prevent operation of the sensing arm 1100 in the first ordinal series of operations. By this means it is impossible to eliminate a cycle in the lowest order, even though the lowest order segment registered a higher value.

Similarly it is desirable to provide the left-hand frame plate 475 with an ear 1141 (see Fig. 25) which engages the ear 1053 on the forward end of arm 1050, and thereby blocks operation of the sensing arm when the carriage is in its home position. It will be recalled that whenever the highest order segment 500 registers a higher value, it is necessary to provide a single cycle of operation in the selected direction in the order to the left, or above, the highest order of the multiplier factor. The extra cycle of operation is provided by the auxiliary segment 590, the operation of which has already been explained. This cycle of operation is always in the selected direction, so that some means should be provided to prevent operation of the sensing arm 1050 during this cycle. This control is most easily secured by providing the left side frame plate 475 with the ear 1141—which acts as a block for arm 1050 whenever the carriage 472 is in its home, or extra cycle, position.

It is also desirable to provide an inoperative interponent aligned with the lowest order segment 500, as operation in this order never requires the extra cycle of operation required when the segment ordinally below the operative order registers a higher value. This could be secured by altering the shape of the lowest order segment to enable its shoulder 508 to directly engage ear 886 of the shift control lever 880. However, it is much easier to mount an ordinary interponent on the right frame plate, as upon stud 1142 carried by the right frame plate 475 (see Fig. 25). The interponent is held in its operative position by any suitable means, such as spring 1143, and is prevented from overthrow by the stud 1144 which also serves as a spring seat.

E. *Successive zeroes in a multiplier factor*

It was noted above, that in some mechanisms the appearance of successive zeroes in a multiplier factor creates a problem which involves complicated mechanisms. In the present invention, there is no particular problem from the appearance of successive zeroes in the multiplier factor. In the lowest order of these zeroes, operation will be controlled from the value position of the adjacent lower order segment 500 and its effect upon the intermediate arm 611. If that segment registers a higher value, the segment will have been rocked to withdraw the interponent 613 from below the ear 886. In that event, a single cycle of operation is required to cause the segment to engage the ear rather than the interponent. However, on all of the higher orders of zeroes, the segments of the adjacent lower orders will not be rotated and therefore the interponents will be in their normal positions. In such a case, the shift control arm 880, at the end of each shifting cycle, will engage the ear of the interponent, and if that cannot be rocked due to the latching of the segment in the "0" position, another shift will be initiated. It is therefore unnecessary to provide any complicated mechanism for handling successive zeroes in a multiplier factor.

22. *Restoring mechanism*

The shift of the multiplier carriage 472 to the order to the right of its normal right-hand, or home, position initiates the operation of a mechanism which restores each of the value pins 491 to 495 and 499 to 497, respectively, to their ineffective positions and relatches the various segments 500 in their "0" positions. At the same time, the shifting of the multiplier carriage to this position is effective to release the operated multiplier control key by the means previously described. The mechanism for restoring the pins and segments to their inoperative positions will now be described.

It is believed to be obvious that the holding of the shift control lever 880 in its rocked, or operative, position by the normal positioning of the interponent 613, or the rocking of the lever 880 by the auxiliary arm 590 when the interponent is withdrawn, is effective to initiate another shift of the multiplier carriage 472. It will be recalled, however, that the accumulator carriage shifting mechanism, under the control of the yoke 921 and shaft 920, is operative only when the multiplier carriage has escaped to the left. Therefore, this last shifting step of the multiplier carriage 472 is not accompanied by a shift of the accumulator carriage 60, for the latter remains in the position to which it was shifted at the time of shifting from the highest order segment 500 to the auxiliary segment 590 following the idle shifting movement of the pin carriage. The escapement mechanism illustrated in Fig. 9 is ineffective to retain the carriage in the extreme position to which it is moved during the idle shifting movement, so it is returned to its normal, or home, position by the spring which powers the escapement arm 550. In other words, the final shifting of the multiplier carriage 472 moves it to a position approximately one order to the right of its normal position, but the carriage returns to its normal position, for the escapement mechanism shown in Fig. 9 is effective only to the normal position and not beyond it.

The mechanism for restoring the pins and segments is shown primarily in Fig. 25. A pin restoring plate 980 normally engages the lower face of the lower frame plate 474 of the pin carriage. This plate is provided with apertures aligned with those of the lower frame plate, so that the respective pins 491 to 495 and 499 to 497 extend through both plates, as shown in this figure and in Fig. 10. Each of the pins 491 to 495 and 499 to 497 is provided with a toe, or shoulder 981 of sufficient length to re-engage the restore plate 980, upon movement of the latter away from the plate 474, thereby restoring the pins to the normal position shown in the figures. The restore plate 980 is provided at either end with an upright arm 982, preferably formed integral with the plate 980, so that the plate and the two arms form a U-shaped member which is mounted for reciprocatory movement within the framework of the pin carriage 472. This member is biased to its raised position in which plate 980 abuts plate 474 by suitable springs, such as 990. In order to maintain the plate 980 in a parallel plane relative to the bottom plate 474, each arm 982 is provided with a pair of pin-and-slot connections with the respective carriage frame plates 475. Only one of these pin-and-slot connections is shown in the figure, the other being hidden by intervening mechanisms. The one connection shown comprises the roller 983 on the arm 982, which engages a slot 984 in the frame plate. Associated with the rollers 983 are operating bellcranks 985, keyed to, or otherwise rigidly secured on, the transverse shaft 501—there being one such member at each end of the shaft. These members include three operating portions: a snail cam section 986 adapted to engage the rollers 983 and, when operated, to move the assembly including the arms 982 and connecting plate 980 downwardly; a gear segment 987 formed with a constant radius about the axis of shaft 501; and a bellcrank arm 988. The bellcrank arms 988 support a rod 989 which extends between the two operating members 985 to form a bail which is adapted to engage spokes of the multiplier segments 500. It is thus obvious that the rocking of the operating members 985, both of which are secured at the opposite ends of the shaft 501, will be effective to return all of the segments 500 to their "0" positions from the engagement of bar 989 with the spoke of the segment; and to move the restore plate in a reciprocatory path away from the bottom plate 474 and back thereto, from the engagement of cam 986 with roller 983.

The members 985 are given the necessary rotational movement by a drive cam 995 mounted on the short transverse shaft 97 immediately adjacent to connecting shaft 656 (see also Fig. 4). The profile of this cam is seen in Fig. 25 and comprises a section of short radius extending through approximately an angle of 180°, followed by a sharp rising snail cam section 996. This cam rotates constantly when the machine is in operation, for it is directly connected with the main drive shaft 122 through the miter gearing shown in this figure. When the multiplier carriage is in its extreme right-hand position, one order to the right of the normal inoperative position of the carriage, this cam is adapted to engage an ear 997 formed on the rearward side of a gear segment 998. The gear segment 998 is rotatably mounted on a pin 999 riveted to, or otherwise rigidly mounted on, the right hand frame plate 475. An idler gear 1005 is adapted to connect the gear segment 998 with the gear portion 987 of the operating member 985. This gear 1005, which can be mutilated as shown in this figure, is rotatably mounted on a stud 1006 carried at the upper end of an arm 1007. The arm 1007 is rotatably mounted, preferably on the pin 999 which also rotatably supports the gear segment 998. This arm is normally held against a stop pin 1008 by a spring 1009 tensioned between studs on the upper end of the arm and the operating member 985, as shown.

Normally, the operation of the cam 995 will, in the second portion of the final shift cycle, engage the ear 997 to rock gear segment 998. This occcurs after this final shift has taken place, as the shift occurs in the first part of the shifting cycle. The rotation of the gear member 998 obviously will always rotate the multilated gear 1005. If the arm 1007 is in the normal position shown, the rotation of gear segment 1005 will also rotate the operating elements 985 through the meshing of the gear with the gear section 987. Such rocking of the segments will be effective to restore the pins to their normal, or inoperative, position and to rock the segments 500 back to their "0" positions.

Preferably, the mechanism of the present invention will be provided with a repeat multiplier mechanism of the type disclosed in my copending application Patent No. 2,824,695, issued February 25, 1958, and S.N. 406,228, filed January 26, 1954. As the repeat mechanism is not a part of the present invention, and serves no particular function in connection with the operation of the present invention, it will not be described. It can be noted, however, that the arm 1007 is provided with a cam ear 1010. A rocker 1012 is pivotally mounted on the frame plate 51, normally assuming the position shown in Fig. 25. The rear end of the rocker carries a roller 1011 normally lying intermediately above, and to the right of, the ear 1010. However, when the rocker 1012 is rotated to the repeat position (clockwise in this figure), the roller 1011 lies in the path of travel of the ear 1010, as the multiplier carriage moves to the extreme position. Consequently, the shifting of the carriage to the right to the extreme position, when set for repeat operation, causes the ear to engage the roller 1011, consequently rocking the arm 1007 (clockwise in this figure) about its pivot 999 and against the tension of its spring 1009. Such rocking of the arm 1007 disengages the gear segment 1005 from the gear segment 987, so that the operation of the cam 995 and resultant oscillation of gear segments 998 and 1005 is ineffective to clear the multiplier mechanism.

It will be recalled that simultaneously with the setting of the value pins 491 to 495, and 499 to 497 and the operation of the escapement mechanism shown in Fig. 9, the "0" latch arm 530 (see Fig. 10) was operated to cause the ordinally related "0" latch 520 to release the segment of that order. It will also be recalled that these "0" latches 520 were latched in their unlatching position, against the tension of their individual springs 522 by means of the shoulder 525 on the ordinal arranged latching arms 523. This is done in the present invention in order to permit the various segments to return to their value positions as they are shifted from the operative ordinal position to the right. This disabling of the "0" latches is obviously necessary in the present invention because the position of these segments is utilized to assist in the control of operation in the operative order.

The various latches 523 are provided with noses 527 which lie in the path of travel of the restore plate 980. Therefore, the reciprocation of that plate to restore the various pins to their inoperative position, engages all of the latches 523 and rocks them (clockwise in Fig. 10 or counter-clockwise in Fig. 25) to their releasing positions. Thereupon the ordinal "0" latches 520 are biased by their springs 522 to their latching positions in which they hold the respective segment in the "0" position.

It can be noted that when the multiply key 402 is released by its latch 672, or the keys 403 or 404 are released by their latches 675, the keys are free to return to their normal raised position from the force of their respective springs, such as 670. The return of the keys to their normal position releases the control shaft 290. This shaft is normally biased to its inoperative position by means of a spring, not shown, so that the release of the shaft by the keys is effective to release the motor switch and clutch to terminate the machine operation. The machine is provided with conventional interlocks which prevent such termination from taking effect before the end of the operating cycle, which, in this instance, is the last shift of the multiplier carriage 472 one order to the right of its normal position.

23. Operation

It is believed that the operation of the mechanism of my present invention will be readily understood from the preceding description of the elements thereof. However, it can be briefly summarized by noting that the mechanism of the present invention is normally biased to additive operation. This occurs because the operative element 780 lies in its forward position (counter-clockwise position shown in Fig. 19), in which the pin 801 lies below the ear 765 on the additive interponent 753. The operative member 780 can be rocked a single increment rearwardly to place the pin 802 under the ear 766 of the subtractive interponent 754, and is so operated by either the depression of the negative multiply key 404 and consequent rocking of the subtractive multiplication lever 706 and arm 793 or, when the machine is set for additive operation, by the rocking of the first sensing arm 1050 and its translation of the link 1080. Also, when the operating member 780 is rocked to the subtractive position by the negative multiply key, it can be given an additional increment of motion to place the pin 803 under the ear 765 of the additive interponent 753, by the operation of the sensing arm and the link 1080, as required for operation in the reverse direction when the operative segment registers a higher value.

Operation in each order is determined by the angular position of the segment 500 in the operative order, as illustrated by the segments shown in Figs. 13 and 14. When a lower value is registered in this segment, the sensing arm 1050, when rocked to sensing, or engaging, position, is blocked by the engagement of its ear 1053 with the rear edge of the associated segment 500, as shown in Fig. 13. In that event, the segment is returned step-by-step towards its "0" position in which the upper shoulder 508 will be effective, either directly or through the interponent 613, to rock the shift control arm 880. If, on the other hand, the segment registers a higher value, as illustrated by the position of the segment in Fig. 14, then the sensing arm 1050 is free to rock and the ear 1053 will lie, after operation of arm 1050, above the upper shoulder 508 of the segment 500, as indicated by the dotted line 1053a. In that event, the segment is returned towards its "0" position only as many steps as are necessary for it to engage the ear 1053. Such engagement causes the rocking of the shift control lever 880 after a number of steps which constitute the complement of the value inserted into that segment.

Whenever a higher value has been registered in the lower one of a pair of segments, the higher value position of the segment, as illustrated in Fig. 14, is effective to rock the intermediate arm 611 and thereby withdraw the interponent 613 from between the segment of the operative order and the ear of the shift control lever. This requires an additional cycle of operation to return the segment the additional distance to rock the shift control lever, if the higher segment is in a lower value position.

Finally, if higher values are registered in two successive orders of a multiplier factor, the second sensing arm 1100 comes into play and is allowed to rock forwardly because the intermediate arms 611 of both the operative order and the first adjacent lower order are in their forward positions. In that event, the bracket 1106 moves forwardly to engage the upper edge of the operative segment 500 one cycle before it would engage the ear 1053 on the first sensing arm. This mechanism provides for the necessary cycles of operation, which is one less than the tens-complement of the value registered in the segment of the operative order, when the operative order is preceded by operation in the reverse direction.

The operation of the first sensing arm, through the linkage shown in Figs. 18 and 19, is effective to move the link 1080 one step to the rear to rock the operative member 780 one step to the rear (right in Fig. 19) of its previous setting, and thereby reverse the direction of operation in the operative order.

I claim:

1. In a calculating machine for performing multiplication operations, said machine containing an accumulator, a cyclically operable actuating means therefor, means for shifting the accumulator with respect to said actuating means, means for controlling the sign character of operation of the said accumulator by said actuating means, and a manual means for selecting the sign character of a multiplication operation and for initiating machine operation, the combination which comprises a plurality of ordinally arranged and sequentially operative multiplier value elements for registering the digits of a multiplier value, said elements being differentially settable to represent multiplier digits of lower value equal to or less than a predetermined value and differentially settable in inverse degree for multiplier digits of higher value from a shift initiating position, means for returning an operative one of said elements incrementally from a set position toward its shift initiating position concurrently with operation of the actuating means, means for adjusting the operative ordinal relationship between said elements and said returning means for causing said returning means to return said elements in ordinal sequence, means operated by an operative one of said elements upon return to shift initiating position to terminate operation of said actuating means and initiate operation of said adjusting means and said shifting means, cycle augmenting and diminishing means selectively settable to cause an operative one of said elements to operate said terminating and initiating means upon return of said element to a position one increment before or one increment beyond said shift initiating position, means for sensing the lower value position or the higher value position of the operative one of said elements and the adjacent lower order element, means controlled by said sensing means for selectively setting said cycle augmenting and diminishing means, setting means jointly controlled by the said sensing means and said manual means for setting said sign character controlling means, and holding means associated with said setting means for maintaining said setting means in a set position.

2. In a calculating machine for performing multiplication operations, said machine containing an accumulator, actuating means therefor, means for shifting the accumulator with respect to said actuating means, means for controlling the sign character of operations of the said accumulator by said actuating means, and a manual means for selecting the sign character of a multiplication operation and for initiating operation of said actuating means, the combination which comprises a plurality of ordinally arranged and sequentially operative multiplier value elements for registering the digits of a multiplier value, said elements being differentially settable to represent multiplier digits of predetermined lower digital values and differentially settable in inverse degree for the other digital values from shift initiating positions, means for incrementally returning the element of an operative order from an adjusted position toward its shift initiating position concurrently with the cyclic operation of said actuating means; a shift initiating member operated by said operative element upon return to its shift initiating position for terminating operation of the returning means and for operating the shifting means and initiating operation of said actuator under control of the next element, a first sensing means for sensing the lower value position or the other value position of the element in the operative order, a second sensing means for sensing the lower value position or the other value position of the element in the adjacent lower order, setting means controlled by the said first sensing means and said manual means for setting said sign character controlling means, cycle augmenting and diminishing means selectively settable to cause the operative one of said elements to operate said shift initiating member upon return of the said operative one of said elements to a position one increment before or one increment beyond said shift initiating position, and means jointly controlled by said sensing means for operating said augmenting and diminishing means.

3. In a calculating machine for performing multiplication operations, said machine containing an accumulator, a cyclically operative actuating means therefor, means for shifting the relative ordinal positions of the accumulator and actuating means, means for controlling the sign character of operation of the accumulator by the actuating means, and a manual means for selecting the sign character of a multiplication operation and for initiating operation of said actuating means, the combination which comprises ordinally arranged and sequentially operative multiplier value elements for registering the digits of a multiplier value, said elements being differentially settable to represent multiplier digits of a predetermined group of lower digital values and differentially settable in inverse degree to represent the other digital values from a shift initiating position, cyclically operable feed means for returning an operative one of said elements from an adjusted position toward its shift initiating position with each cycle of operation of said actuating means, program means operated by said operative element upon return to its shift initiating position for terminating operations of the feed means and for operating the shifting means and for instituting a second series of cyclic operations of said actuating means under control of an adjacent element, setting means jointly controlled by the lower or other value position of the operative element at the beginning of its ordinal series of operations and the manual means for setting said sign character controlling means, cycle augmenting and diminishing means selectively settable to cause the operative one of said elements to operate said program means upon return of said operative element to a position one increment before or one increment beyond said shift initiating position, means controlled by the other value position of the element ordinally below the operative element for setting said augmenting and diminishing means to cause operation by said operative element one increment beyond said shift initiating position and thereby increase by "1" the number of cycles required by said operative element to operate said program means, and means jointly controlled by the other value position of said operative element and the other value position of the adjacent lower order element for setting said augmenting and diminishing means to cause operation by said operative element one increment before said shift initiating position and thereby decrease by "1" the number of cycles required by said operative element to operate said program means.

4. In a calculating machine having an accumulator, cyclically operable actuating means for said accumulator, means for controlling the sign character of operation of said accumulator by said actuating means, means for shifting the relative ordinal positions of the accumulator and the actuating means, and power driven means for operating said actuating means: multiplication mechanism comprising multiplier selection means having a plurality of ordinally arranged settable members for controlling multiplying operations, means for setting said members from a "0" value position differentially to a position corresponding to the various digital values of lesser magnitude and to the tens-complement position of the digital values of greater magnitude, means for incrementally restoring the member in an operative order to its "0" value position simultaneously with the cyclic operation of said actuating means, mechanism for shifting the relative ordinal positions of said restoring means and said settable members, program means operated by the member in the operative order upon restoration to its "0" position for operating the shifting means and the shifting mechanism, manual means for selectively determining the sign character of a multiplication operation, for enabling said power driven means, and for enabling said restoring means, means jointly controlled by said last-mentioned means and lesser or greater magnitude position of the member in the operative order for operating said sign character controlling means and thereafter initiating repeated cycles of operation of said actuating means, normally inoperative cycle augmenting means settable to cause the member in the operative order to operate said program means upon return of said element to a position one increment beyond said "0" position, means controlled by the greater magnitude position of the member in the order below said operative order for setting said augmenting means and thereby increase the number of cycles of operation of said actuating means in the operative order by "1," normally inoperative cycle diminishing means settable to cause the member in the operative order to operate said program means upon return of said element to a position one increment before said "0" position, and means controlled jointly by the greater magnitude position of both the member in the operative order and the member in the adjacent lower order for setting said diminishing means and thereby decrease the number of cycles of operation of said actuating means in the operative order by "1."

5. In a calculating machine for performing shortcut multiplication having an accumulator, differential actuating mechanism including a reversing means for reversibly operating said accumulator, means for shifting said accumulator relative to said differential actuating mechanism, sign character control means for setting the reversing means to cause said differential actuating mechanism to operate said accumulator in either sign character direction, and power driven means for cyclically operating said differential actuating mechanism and said shifting means, the combination which comprises a multiplier storage mechanism having a plurality of ordinally arranged settable elements shiftable ordinally as a unit for controlling multiplying operations, means for setting said elements differentially to represent multiplier digits of lower value less than a predetermined value and differentially in inverse degree to represent multiplier digits of higher value at least equal to said predetermined value from a shift initiating position, means for returning the element in an operative ordinal position from its set position incrementally to its shift initiating position concurrently with each cycle of operation of said computing mechanism, mechanism for shifting said differentially settable elements to bring successive elements into operative position, program means operated by the element in the operative ordinal position upon return to its shift initiating position to terminate operation of the accumulator by the differential actuating mechanism and to operate said shifting means and said shifting mechanism, means for setting said sign character control means to a selected sign character position or alternately to a reverse sign character position, control means for positioning the setting means to a selected sign character position whenever the element in the operative ordinal position is set to represent a lower value digit and to a reverse sign character position when positioned to represent a higher value digit, cycle augmenting and diminishing means settable to cause the element in the operative ordinal position to operate said program means upon return of said element to a position one increment before or one increment beyond its shift initiating position, means controlled by the element in the order below the operative ordinal position for setting said cycle augmenting means to cause operation of said program means by the element in the operative ordinal position upon return one increment beyond its shift initiating position whenever the adjacent lower order element is positioned to represent a higher value digit and the element in the operative ordinal position is positioned to represent a lower value digit, means controlled jointly by the element in the operative ordinal position and the element in adjacent lower order for setting said diminishing means to cause operation of said program means by the element in the operative ordinal position upon return one increment before its shift initiating position whenever both orders are positioned to represent a higher value digit, manual means for selecting the algebraic character of the multiplication operation for enabling said power driven means and for enabling said restoring means, and power operated means jointly controlled by said manual means and said control means for operating said setting means.

6. In a calculating machine having an accumulator, actuating means for said accumulator, means for controlling the sign character of operation of said accumulator by said actuating means, means for shifting relative ordinal positions of the accumulator and the actuating means, and power driven means for cyclically operating said actuating means: a multiplication mechanism comprising an ordinally arranged multiplier storage mechanism for controlling multiplying operations, a plurality of ordinally arranged settable elements in said storage mechanism each settable from an initial "0" position to positions representative of the various digital values, a component connected to each of said elements and positionable in one position by the related element being positioned differentially to represent values of a lower range of magnitude and in another position by the related element being positioned differentially in inverse degree to represent values of a higher range of magnitude, feed means for incrementally returning an element in an operative ordinal position toward its "0" position simultaneously with cycles of operation of said actuating means, a program member normally operated by the element in the operative ordinal position upon its return to its "0" position, means for shifting the relative ordinal positions of the program member and the multiplier storage mechanism, means operated by the program member for terminating operation of the actuating means and the feed means and for operating both shifting means and reinitiating operation of said actuating means and said feed means in the adjacent ordinal position, a cycle augmenting means settable to cause the member in the operative ordinal position to operate said program means upon return of said element to a position one increment beyond said "0" position, means controlled by the component connected to the adjacent lower order element when positioned to represent a value of the higher range of magnitude for setting the augmenting means, a cycle diminishing means settable to cause the member in the operative ordinal position to operate said program means upon return of said element to a position one increment before said "0" position, means controlled jointly by the components connected to the member in the operative ordinal position and the member in the adjacent lower order position when both are positioned to represent a value of the higher range of magnitude for setting the diminishing means, manual means for selecting the sign character of a multiplication operation and for initiating a multiplying operation, and setting means jointly controlled by the element in the operative ordinal position and said manual means for selectively setting said sign character controlling means.

7. In a calculating machine for performing multiplication operations having an accumulator, a cyclically operative actuating means therefor, means for shifting the relative ordinal positions of said accumulator and said actuating means, means for controlling the sign character of operation on said accumulator by said actuating means, normally inactive adjustable means for setting said sign character controlling means, operating means for moving said inactive setting means into operative position relative to said sign character controlling means, and power-driven means rendered effective by said operating means upon operation thereof for actuating said setting means, the combination which comprises manual means including a positive multiply key and a negative multiply key for selecting the sign character of a multiplication operation, sequentially operative multiplier value elements settable differentially and differentially in inverse degree from an original position for registering a multiplier digit of a first magnitude and the tens-complement of a multiplier digit of a second magnitude, respectively, feed means for incrementally returning an operative one of said elements toward its original position simultaneously with operation of said actuating means, mechanism for shifting the relative ordinal position of said elements and said feed means, a program member normally operated by the operative one of said elements upon return to its original position to terminate operation of said actuating means and said feed means and to operate said shifting means and said shifting mechanism, means controlled by said elements and said manual means jointly for adjusting the setting means in accordance with the sign character determined by said keys whenever the operative one of said elements registers a digit of said first magnitude and for adjusting the setting means in the opposite sign character whenever said element registers a digit of said second magnitude, a positionable control member connected to each of said elements, said control members having one position indicative of a digit of said first magnitude and a second position indicative of a digit of said second magnitude, an interponent associated with each element having one position in which it is interposed between its element and the program member and another position in which it is not so interposed, means controlled by the control member of the adjacent lower order for positioning said interponents thereby varying the operation of said program member by the operative one of said elements to operate said program member upon its return to its original position or upon return of said element to a position one increment beyond said original position, a sensing means for sensing the magnitude positions of the control members connected to the operative one of said elements and the adjacent lower order element, and means operated by said sensing means when sensing a second magnitude position in both of said control members for causing operation of said program member by the operative one of said elements upon return of said operative element to a position one increment before said original position.

8. In a calculating machine for performing multiplication operations, the combination which comprises an accumulator, actuating means therefor, means for shifting the relative ordinal positions of said accumulator and said actuating means, means for controlling the sign character of registrations on said accumulator by said actuating means, normally inactive adjustable means for setting said sign character controlling means, operating means for moving said inactive setting means into operative position relative to said sign character controlling means, power-driven means rendered effective by said operating means upon operation thereof for actuating said setting means, manual means including a positive multiply key and a negative multiply key for selecting the sign character of a multiplication operation, ordinally arranged multiplier value elements for registering a plural digit multiplier value, said elements being differentially positionable from an original position to represent the digits of a range of a first magnitude and differentially positionable in inverse degree from said original position to represent the tens-complement of a range of digits of a second magnitude, means for incrementally restoring an operative one of said elements from its adjusted position toward its original position in each successive ordinal series of operations, mechanism for shifting the relative ordinal position of said elements and said restoring means, a program member normally operated by the operative one of said elements upon return to its original position for terminating operation of said actuating means and said restoring means and operating said shifting means and said shifting mechanism, positionable control means connected to said elements having one position indicative of a value of the first magnitude and a second position indicative of a value of the second magnitude, means controlled by the operative one of said elements and the operated one of said keys jointly for adjusting the setting means in accordance with the sign character determined by said key whenever the said element registers a value of said first magnitude and for adjusting the setting means in the opposite sign character whenever said element registers a value of said second magnitude, cycle augmenting means for causing operation of said program member by the operative one of said elements upon return of said element to a position one increment beyond its original position whenever the positionable control means associated with the first element ordinally below the operative one of said elements assumes its second position indicative of a value within the range of the second magnitude in the said lower order element, and cycle reducing means for causing operation of said program member by the operative one of said elements upon return of said element to a position one increment before its original position whenever the positionable control means associated with the operative one of said elements and with the element ordinally therebelow assume their second positions indicative of values within the range of the second magnitude in both of said elements.

9. In a calculating machine for performing multiplication operations having an accumulator, a cyclically operative actuating means therefore, means for ordinally adjusting the relative decimal relationship of the accumulator and the actuating means, means for controlling the sign character of operations of the said accumulator by the said actuating means, a plurality of ordinally arranged multiplier value elements for registering a multiplier value, each settable differentially or differentially in inverse degree from an original value position to positions representative of the lesser or greater magnitude, respectively, of the various multiplier digits, restore means for incrementally restoring the one of said multiplier value elements in a predetermined operative ordinal position toward its original value position concurrently with the cyclic operation of said actuating means, means for ordinally adjusting the relative ordinally operative positions of said restore means and the multiplier value elements, a multiplier control member adapted to be operated by the said multiplier value element in the predetermined operative ordinal position and effective when operated to terminate operation of said restore means and said actuating means, to operate both adjusting means and to reinitiate the operation of the said actuating means and the said restore means in their adjusted positions, and manual means for selecting the sign character of a multiplication operation and for initiating plural cycle operation of said actuating means, the combination which comprises a settable component operatively connected to each element and assuming a lower value position when its respective element registers a multiplier digit of lesser magnitude and assuming a higher value position when its respective element registers a multiplication digit of greater magnitude, a first sensing means for sensing the lower value position or the higher value position of the component connected to the value element in the predetermined operative position, a second sensing means for sensing the lower value position or the higher value position of the component in the adjacent lower order, setting means jointly controlled by the manual means and the first sensing means for setting said sign character controlling means, increment augmenting means controlled by said second sensing means when sensing a higher value position in the adjacent lower order element for causing operation of said control member by the element in the operative ordinal position upon return of said element to a position one increment beyond said original value position, and increment reducing means jointly controlled by both sensing means when sensing higher value positions of their respective components for causing operation of said control member by the element in the predetermined operative ordinal position upon return of said element to a position one increment before said original value position.

10. In a calculating machine for performing multiplication operations having an accumulator, cyclically operable actuating means therefor, means for adjusting the relative ordinal relationship of the accumulator and the actuating means, means for controlling the sign character of operations of the said accumulator by the said actuating means, and manual means for selecting the sign character of a multiplication operation and for initiating operation of said actuating means, the combination which comprises a plurality of ordinally arranged multiplier value elements for registering a multiplier value, each settable to differential positions representative of a multiplier digit of a lower magnitude and to an inversely differential position representative of the tens-complement of a multiplier digit of a higher magnitude, a multiplier control member, means for relatively advancing said control member and a said multiplier element in an operatively related order incrementally with each cycle of operation of said actuating means to cause engagement of said control member and element normally after a number of cycles of operation of said actuating means corresponding to the value position of said member, means for adjusting the relative ordinal relationship of said control member and said elements, means operated by said control member upon engagement with said operative element and effective when operated to terminate operation of said actuating means and to operate both of said adjusting means and to reinitiate the operation of the said actuating means in the new relative positions, a first sensing means for sensing the lower magnitude position or the higher magnitude position of the operative ordinal one of said elements, a second sensing means for sensing the lower magnitude position or the higher magnitude position of the element in the adjacent lower order, setting means controlled by the first sensing means and the manual means jointly for setting said sign character controlling means, cycle augmenting means controlled by said second sensing means when sensing a higher magnitude position in the adjacent lower order element to cause said multiplier control member to engage the operative ordinal one of said elements in a position one increment beyond the normal engaging position, and means jointly operated by both sensing means when sensing higher magnitude positions in their respective elements to cause said multiplier control member to engage the operative ordinal one of said elements in a position one increment before the normal engaging position.

References Cited in the file of this patent

UNITED STATES PATENTS

| 1,205,481 | Rechnitzer | Nov. 21, 1916 |
| 1,409,575 | Rechnitzer | Mar. 14, 1922 |
| 1,913,973 | Britten | June 13, 1933 |
| 1,922,971 | Mez | Aug. 15, 1933 |
| 1,968,201 | Hamann | July 31, 1934 |
| 2,081,008 | Hamann | May 18, 1937 |
| 2,170,406 | Hamann | Aug. 22, 1939 |
| 2,309,240 | Chase | Jan. 26, 1943 |
| 2,374,333 | Crosman | Apr. 24, 1945 |
| 2,379,877 | Britten | July 10, 1945 |
| 2,611,539 | Toorell | Sept. 23, 1952 |
| 2,706,082 | Lydfors | Apr. 12, 1955 |

FOREIGN PATENTS

| 509,747 | Great Britain | July 20, 1939 |

UNITED STATES PATENT OFFICE
CERTIFICATE OF CORRECTION

Patent No. 2,886,238                                      May 12, 1959

Gilman Plunkett

It is hereby certified that error appears in the printed specification of the above numbered patent requiring correction and that the said Letters Patent should read as corrected below.

Column 6, line 19, for "opeartion" read -- operation --; line 72, for "mulipler" read -- multiplier --; line 73, for "muliplier" read -- multiplier --; column 7, line 57, after "register" insert a comma; column 8, line 6, for "stool" read -- stood --; line 43, for "lateer" read -- latter --; column 17, line 48, strike out "that"; column 20, line 9, after "on" insert a comma; line 73, after "segment" insert -- is --; column 22, line 6, for "operative" read -- inoperative --; column 23, line 51, after "561" insert -- which --; line 52, for "standitng" read -- standing --; column 27, line 64, strike out "of"; line 69, for "if," read -- If, --; column 28, line 10, for "shaft" read -- shift --; column 31, line 12, after "control" insert a comma; line 61, after "arm" insert a comma; same line, after "690" strike out the comma; column 35, line 16, strike out "ditioned for operation by the disengagement of the pin"; column 36, line 39, after "875" insert -- again --; column 42, line 52, strike out "it"; column 54, line 51, for "siutation" read -- situation --; column 56, line 29, after "shoulder" insert a comma; line 70 for "97" read -- 297 --; column 57, line 35, after "application" insert -- S. N. 401,780, filed January 4, 1954 and --; lines 36 and 37, strike out "and S.N. 406,228, filed January 26, 1954." column 64, line 54, for "therefore" read -- therefor --; column 65, line 9, for "multiplication" read -- multiplier --.

Signed and sealed this 15th day of March 1960.

(SEAL)
Attest:

KARL H. AXLINE
Attesting Officer

ROBERT C. WATSON
Commissioner of Patents